United States Patent
Wang et al.

(10) Patent No.: US 9,352,328 B2
(45) Date of Patent: *May 31, 2016

(54) OVERBURDEN/TAILINGS MIXTURES FOR ENGINEERED TAILINGS DEPOSIT CONTROL

(71) Applicant: SYNCRUDE CANADA LTD. in trust for the owners of the Syncrude Project as such owners exist now and in the future, Fort McMurray (CA)

(72) Inventors: Nan Wang, Edmonton (CA); Ron Cleminson, Fort McMurray (CA); Randy Mikula, Edmonton (CA)

(73) Assignee: SYNCRUDE CANADA LTD, in trust for the owners of the Syncrude Project as such owners exist now and in the future, Fort McMurray (CA)

(*) Notice: Subject to any disclaimer, the term of this patent is extended or adjusted under 35 U.S.C. 154(b) by 0 days.

This patent is subject to a terminal disclaimer.

(21) Appl. No.: 14/014,249

(22) Filed: Aug. 29, 2013

(65) Prior Publication Data

US 2014/0119833 A1    May 1, 2014

Related U.S. Application Data

(63) Continuation-in-part of application No. 13/661,599, filed on Oct. 26, 2012, now Pat. No. 8,985,901.

(51) Int. Cl.
*B09B 1/00* (2006.01)
*B02C 19/00* (2006.01)

(52) U.S. Cl.
CPC ............... *B02C 19/0056* (2013.01); *B09B 1/00* (2013.01)

(58) Field of Classification Search
None
See application file for complete search history.

(56) References Cited

U.S. PATENT DOCUMENTS

| | | | | | |
|---|---|---|---|---|---|
| 3,978,673 | A | * | 9/1976 | Schleede | 405/129.1 |
| 4,875,998 | A | * | 10/1989 | Rendall | 208/390 |
| 5,413,433 | A | * | 5/1995 | Davies | 405/129.2 |
| 6,048,133 | A | * | 4/2000 | Williamson et al. | 405/129.2 |

OTHER PUBLICATIONS

BGC Engineering Inc. Review of Reclamation Options for Oil Sands Tailings Substrates. Oil Sands Research and Information Network, University of Alberta, School of Energy and the Environment. 2010. OSRIN Report No. TR-2.
Chapman, D., et al. Hydrogeology of South Bison Hill. 7th International Conference on Acid Rock Drainage (ICARD). 2006.
Chapman, D.E. Hydrogeologic Characterization of a Newly Constructed Saline-Sodic Clay Overburden Hill. University of Saskatchewan Thesis. 2008.

(Continued)

*Primary Examiner* — John Kreck
(74) *Attorney, Agent, or Firm* — Bennett Jones LLP

(57) ABSTRACT

A process for enhancing the solidification of tailings is provided comprising providing overburden having a moisture content ranging from about 15 wt % to about 25 wt % and comminuting the overburden to a first size; providing tailings having a solids content ranging from about 1 wt % to about 70 wt %; adding the tailings to the first sized overburden to form treated overburden and comminuting the treated overburden to a second size; and depositing the second sized treated overburden to produce a substantially solidified deposit.

16 Claims, 40 Drawing Sheets

(56) References Cited

OTHER PUBLICATIONS

Isaac, B.A., et al. Characterization of the Lower Cretaceous Overburden for Oil Sands Surface Mining Within Syncrude Canada Ltd. Leases, Northeast Alberta, Canada. Proceedings 4th Congress International Association of Engineering Geology. 1982. New Delhi, India.

Lord, E.R., et al. Geotechnical Investigations of Dredged Overburden at the Syncrude Oil Sand Mine in Northern Alberta, Canada. Canadian Geotechnical Journal. 1989. pp. 132-153. vol. 26.

Lord, E.R.F., et al. Codisposal of Fine Tails and Overburden Utilizing Pipelining Techniques. Proceedings of the Fourth International Symposium on Mine Planning and Equipment Selection. 1995. pp. 973-987. Calgary, Canada.

Mellon, G.B., et al. Geology of the McMurray Formation. Research Council of Alberta, Report No. 72. 1956.

Mimura, D.W. Shear Strength of Hydraulically Placed Clay Shale. University of Alberta Thesis. 1990.

Mimura, D.W., et al. Oil Sand Fine Tails Absorption into Overburden Clay Shales—A Dry Landscape Alternative. Petroleum Society of CIM and AOSTRA. 1991. Paper No. 91-128.

Morgenstern, N.R., et al. Oil Sand Geotechnique. Geotechnical News, Special 1997. pp. 102-109.

Terzaghi, K., et al. Soil Mechanics in Engineering Practice, 3rd Edition. 1996. pp. 161-187. John Wiley & Sons, Inc., New York.

* cited by examiner

OVERBURDEN/TAILINGS MIXTURES FOR ENGINEERED TAILINGS DEPOSIT CONTROL

FIELD OF THE INVENTION

The present invention relates to a process for enhancing the solidification of tailings. In particular, tailings and overburden are combined in a process involving overburden crushing to form a suitable deposit for disposal and/or further environmental desiccation.

BACKGROUND OF THE INVENTION

Oil sand generally comprises water-wet sand grains held together by a matrix of viscous heavy oil or bitumen. Bitumen is a complex and viscous mixture of large or heavy hydrocarbon molecules which contain a significant amount of sulfur, nitrogen and oxygen. The extraction of bitumen from sand using hot water processes yields large volumes of fine tailings composed of fine silts, clays, residual bitumen and water. Mineral fractions with a particle diameter less than 44 microns are referred to as "fines." These fines are typically clay mineral suspensions, predominantly kaolinite and illite.

The fine tailings suspension is typically 85% water and 15% fine particles by mass. Dewatering of fine tailings occurs very slowly. When first discharged in ponds, the very low density material is referred to as thin fine tailings. After a few years when the fine tailings have reached a solids content of about 30-35%, they are referred to as fluid fine tailings which behave as a fluid-like colloidal material. The fact that fluid fine tailings behave as a fluid and have very slow consolidation rates significantly limits options to reclaim tailings ponds. A challenge facing the industry remains strengthening the oil sand tailings deposits so that they can be reclaimed and no longer require containment.

Recently, the present applicant developed a process for dewatering oil sands tailings by treating the tailings with coagulant and flocculant prior to dewatering by centrifugation (see U.S. patent application Ser. No. 13/594,402, incorporated hereto by reference). The centrifugation process is particularly useful with, but not limited to, fluid fine tailings. Dewatering the tailings by centrifugation enables reclamation of tailings disposal areas and recovery of water for recycling. However, one challenge faced by the applicant is disposal of the resultant centrifuge cake. Cake properties are a function of the solids content and water chemistry. It was discovered that, while the addition of gypsum improved the conveyability of the cake from the centrifuge, typically, the produced cake from the centrifugation process still only had a solids content of about 50 to 55% by weight (about 31% by volume) and a shear strength of about 0.5 to 2.0 kPa. Thus, further strengthening of the centrifuge cake is desirable.

Accordingly, there is a need for an improved method to treat fine tailings to strengthen same and reduce their water content in order to reclaim the land on which fine tailings are disposed.

SUMMARY OF THE INVENTION

The current application is directed to a process for enhancing the solidification of tailings by combining tailings and overburden in a process involving overburden crushing to form a suitable deposit for disposal and/or further environmental desiccation. The present invention is particularly useful with, but not limited to oil sands tailings such as fluid fine tailings (FFT, formerly known as MFT—Mature Fine Tailings), oil sand tailings centrifuge cake, process affected water, water (aqueous) fluid wastes such as water treatment brine, oil sand tailings thickener underflow, flue gas desulfurization gypsum slurry, and the like (hereinafter collectively referred to as "oil sands tailings"). However, it is understood that the present invention can be used with any mining tailings, slurry and the like. It was surprisingly discovered that by conducting the process of the present invention, one or more of the following benefits may be realized:

(1) Tailings are combined with overburden. The average lump size is controlled by a crushing process to yield a deposit which easily solidifies, absorbs process-affected water, and exhibits properties suitable for reclamation.

(2) A deposit having a tailings:overburden mixture ratio of at least 0.2:1.0 (bulk volume, i.e., the volume of the overburden after the overburden has been excavated from the mining face) exhibits an undrained shear strength greater than 5 kPa which complies with regulatory requirements.

(3) Compaction further increases the undrained shear strength of a deposit having low tailings content and overburden having high plasticity, low moisture content, and composed of fine lumps. The reduction in the tailings moisture content and associated increase in the tailing solids content increases the undrained shear strength of the deposit.

(4) Centrifuge cake obtained from the centrifugation of treated FFT and overburden co-mixing reduces the footprint used to confine centrifuge cake by about $1/8^{th}$ and substantially reduces the time (i.e., to almost zero) to achieve trafficable deposit mass strength of 25 kPa. For example, it would likely only require a deposition site having dimensions of 450 m×800 m×40 m to contain/sequester approximately 5-6 million dry tons of fines.

(5) Field tests confirm that centrifuge cake and overburden can be mixed using pre-determined ratios and nearly 100% liquid phase absorption occurs within 24 hours without significantly changing the volume of the deposit.

(6) 25-50 kPa initial mass strength deposits are achievable by controlling the mix ratio of overburden to cake at about 1.5 BCM (bank cubic meters, i.e., the volume prior to excavation) to about 1 $m^3$ cake (~75% solids concentration).

(7) A substantially solidified deposit is formed which can be reclaimed into dry landscape in about a one year cycle.

Thus, use of the present invention enables reclamation of tailings disposal areas.

In one aspect, a process for enhancing the solidification of tailings is provided, comprising:
  providing overburden having a moisture content ranging from about 15 wt % to about 25 wt % and comminuting the overburden to a first size;
  providing tailings having a solids content ranging from about 1 wt % to about 70 wt %; and
  adding the tailings to the first sized overburden to form treated overburden and comminuting the treated overburden to a second size to produce a substantially solidified deposit.

In one embodiment, the treated overburden is further comminuted to a third size to produce the solidified deposit. In another embodiment, the tailings are oil sands tailings. In another embodiment, the oil sands tailings are fluid fine tailings (FFT). In another embodiment, the oil sands tailings are centrifuge cake.

In another aspect, a process line for enhancing the solidification of tailings is provided comprising:
  a first comminution device for comminuting overburden to a first size;

an overburden preparation apparatus for contacting the overburden with incoming tailings to form treated overburden;

a second comminution device for comminuting the treated overburden to a second size to produce a substantially solidified deposit.

In one embodiment, the process line further comprises a third comminution device for further comminuting the second sized treated overburden to a third size. In one embodiment, the comminuting devices are sizers such as two roll crushers, four roll crushers, and the like. In one embodiment, the first comminution device comminutes the overburden to a first size of about 600 mm. In another embodiment, the second comminuting device comminutes the treated overburden to a second size of about 200 mm. In yet another embodiment, the third comminuting device comminutes the second sized treated overburden to a third size of about 100 mm.

BRIEF DESCRIPTION OF THE DRAWINGS

Referring to the drawings wherein like reference numerals indicate similar parts throughout the several views, several aspects of the present invention are illustrated by way of example, and not by way of limitation, in detail in the figures, wherein.

DETAILED DESCRIPTION OF THE PREFERRED EMBODIMENTS

Figure 1:
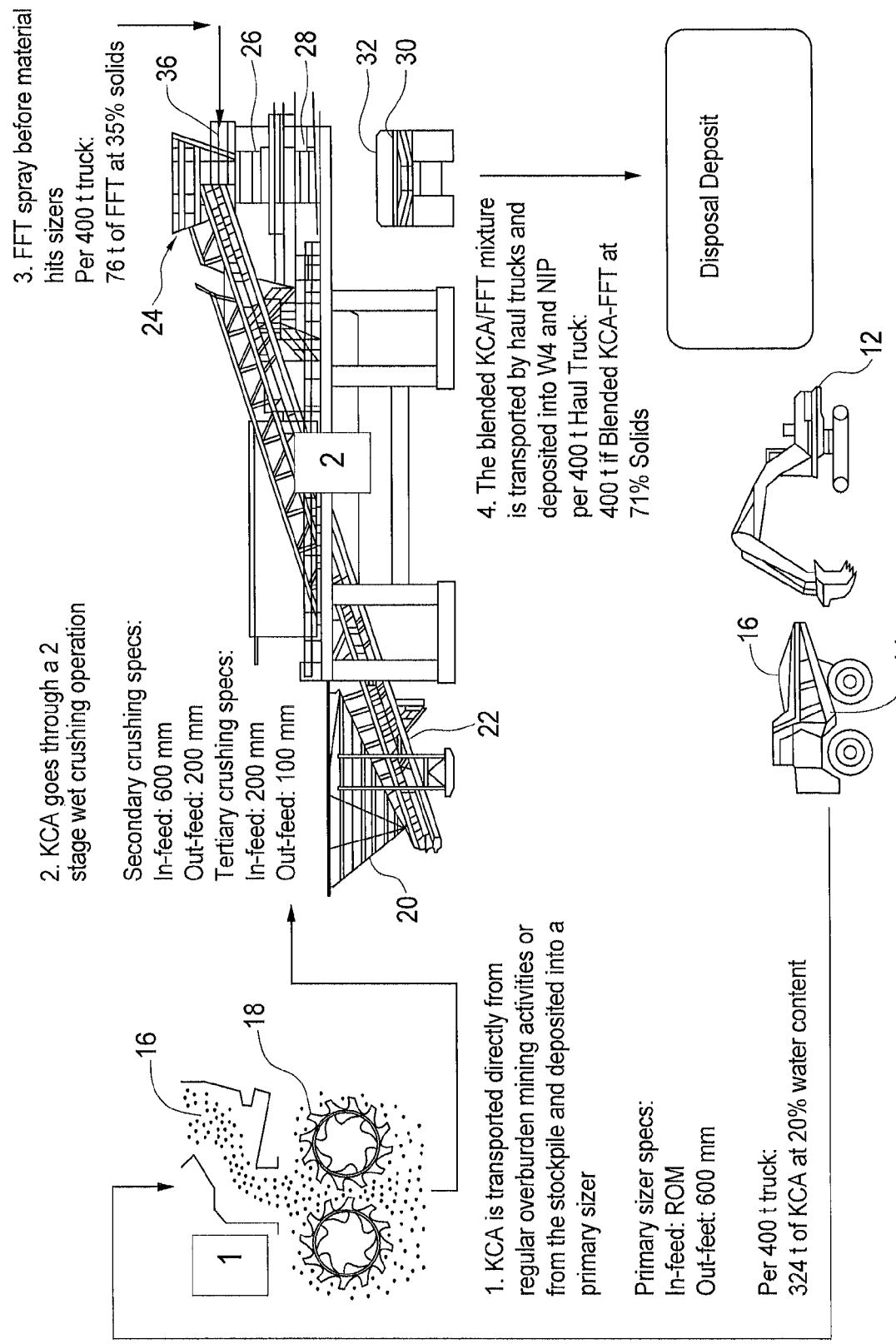
FIG. 1 is a schematic showing one embodiment of a process line in accordance with the present invention.

The detailed description set forth below in connection with the appended drawings is intended as a description of various embodiments of the present invention and is not intended to represent the only embodiments contemplated by the inventor. The detailed description includes specific details for the purpose of providing a comprehensive understanding of the present invention. However, it will be apparent to those skilled in the art that the present invention may be practiced without these specific details.

The present invention relates generally to a process for treating tailings derived from oil sands extraction operations and containing a fines fraction. Combining tailings and overburden in a process involving overburden crushing forms a suitable deposit for disposal and/or further environmental desiccation. As used herein, the term "tailings" means tailings derived from oil sands extraction operations and containing a fines fraction. The term is meant to include fluid fine tailings (FFT) from tailings ponds and fine tailings from ongoing extraction operations (for example, thickener underflow or froth treatment tailings) which may bypass a tailings pond.

In one embodiment, the tailings are primarily FFT obtained from tailings ponds given the significant quantities of such material to reclaim. The tailings stream from bitumen extraction is typically transferred to a tailings pond where the tailings stream separates into an upper water layer, a middle FFT layer, and a bottom layer of settled solids. The FFT layer is removed from between the water layer and solids layer via a dredge or floating barge having a submersible pump. In one embodiment, the FFT has a solids content ranging from about 10 wt % to about 60 wt %. In one embodiment, the FFT has a moisture content of about 60%. The FFT may be passed through a screen to remove any oversized materials.

In one embodiment, the screened FFT may be pumped into an agitated feed tank for combining with a suitable additive. The preferred additive may be selected according to the tailings composition and process conditions. However, optimum additives such as, for example, coagulants and flocculants, have been identified for the effective dewatering of tailings and production of amenable recycle water. As used herein, the term "coagulant" refers to a reagent which neutralizes repulsive electrical charges surrounding particles to destabilize suspended solids and to cause the solids to agglomerate. Suitable coagulants include, but are not limited to, gypsum, lime, alum, polyamine or any combination thereof. As used herein, the term "flocculant" refers to a reagent which bridges the neutralized or coagulated particles into larger agglomerates, resulting in more efficient settling. Flocculants are characterized by molecular weights ranging between about 1,000 kD to about 50,000 kD, and various charge densities (i.e., anionic, nonionic, or cationic). Suitable natural polymeric flocculants may be polysaccharides such as dextrin, starch or guar gum. Suitable synthetic polymeric flocculants include, but are not limited to, charged or uncharged polyacrylamides, for example, a high molecular weight polyacrylamide-sodium polyacrylate co-polymer having a medium charge density (about 20-35% anionicity).

Other useful polymeric flocculants can be made by the polymerization of (meth)acrylamide, N-vinyl pyrrolidone, N-vinyl formamide, N,N dimethylacrylamide, N-vinyl acetamide, N-vinylpyridine, N-vinylimidazole, isopropyl acrylamide and polyethylene glycol methacrylate, and one or more anionic monomer(s) such as acrylic acid, methacrylic acid, 2-acrylamido-2-methylpropane sulphonic acid (ATBS) and salts thereof, or one or more cationic monomer(s) such as dimethylaminoethyl acrylate (ADAME), dimethylaminoethyl methacrylate (MADAME), dimethydiallylammonium chloride (DADMAC), acrylamido propyltrimethyl ammonium chloride (APTAC) and/or methacrylamido propyltrimethyl ammonium chloride (MAPTAC). The preferred flocculant may be selected according to the FFT composition and process conditions.

As used herein, the term "overburden" means a layer of rocky clay-like material which overlies an oil sand deposit. In one embodiment, the overburden comprises consolidated clay-shale material. In one embodiment, the overburden has a moisture content ranging from about 15 wt % to about 25 wt %. In one embodiment, the overburden has a moisture content of about 20 wt %.

The run of mine overburden is transported from a surface mine or stockpile, and deposited into a sizer. As used herein, the term "sizer" means a crushing apparatus capable of comminuting the overburden into granular material and crushing oversized rock and other large lump materials into a granular material. In one embodiment, the overburden is fed through rotors having teeth. As the overburden falls into the crushing chamber, the teeth grip the overburden. The pressures created by the narrow gap and the force of the teeth rip the overburden apart into granular material having a reduced, more manageable lump size. In one embodiment, the granulated overburden has an average lump size of about 600 mm. The granular overburden is expelled from the underside of the sizer and transported to a processor bed.

In one embodiment, the processor bed has a frame supporting rotating elements and may be oriented with respect to horizontal to provide a horizontal surface or incline. The processor bed is operable as a sizer to crush the granular overburden in a wet process. The FFT and granular overburden are combined together by spraying the FFT onto the granular overburden prior to entering one or more sizers. In one embodiment, the FFT-to-overburden ratio ranges from about 0.2:1.0 (bulk volume) to about 0.4:1.0 (bulk volume). Preferably, the FFT-to-overburden ratio is about 0.2:1.0 (bulk volume). In one embodiment, two sizers are used. The first sizer decimates the overburden/FFT mixture from an average lump size of about 600 mm to about 200 mm. The second sizer decimates the overburden/FFT mixture from an average lump size of about 200 mm to about 100 mm. The product yielded from crushing the overburden/FFT mixture will hereinafter be referred to as the "deposit."

Turning now to the specific embodiment shown in FIG. 1, the overburden 16 is excavated using a mobile shovel 12. The shovel 12 dumps the as-mined overburden 16 into a truck 14 for transport to the first comminuting stage 1. In this embodiment, first comminuting device comprises a double roll crusher 18 (also referred to as a primary sizer). The crusher 18 comminutes the as-mined overburden to a first size, for example, to about 600 mm. The first sized overburden is delivered to a surge bin 20. One or more apron feeders 22 extend into the base of the surge bin 20 for removing the first sized overburden at a slow, controlled, sustained mass flow rate. The apron feeder 22 is upwardly inclined and transport and feed the first sized overburden to the upper end of an overburden preparation unit 24.

Overburden preparation unit 24 comprises inlet 36 having nozzles for spraying the overburden with FFT, for example, having 35 wt % solids. In one embodiment, the FFT has been pre-treated with a coagulant and/or a flocculant. The overburden preparation unit further comprises a secondary sizer comprising a four roll crusher 26 designed to reduce the particle size of the overburden to approximately 200 mm (the second size). In this embodiment, overburden preparation unit 24 further comprises a tertiary sizer comprising a four roll crusher 28 designed to reduce the size of the overburden to approximately 100 mm. The blended overburden/FFT mixture (treated overburden) is the transported by trucks (not shown) to a deposition site. The resultant blended overburden/FFT with have a solids content of about 70 wt % or higher.

It will be appreciated by those skilled in the art that other methods may be used to combine the FFT and granular overburden to yield a solidified deposit. In one embodiment, hydraulic fracturing may be used, whereby the FFT may be injected at high pressure into layers of overburden stored in a waste dump.

As used herein, the term "shear strength" means the magnitude of the shear strength which a material can sustain. The term "undrained shear strength" means the shear strength of the material when pore water has not been drained from the material. The term "liquid limit" means the moisture content at which a material begins to behave as a liquid. The undrained shear strength of FFT alone is low since the moisture content is substantially higher than the liquid limit. The undrained shear strength of FFT centrifuge cake is also fairly low, typically less than 2 kPa. In contrast, the undrained shear strength of overburden is high because the moisture content is below the liquid limit. The overburden/FFT deposit exhibits an undrained shear strength greater than the undrained shear strength of the FFT alone. Similarly, the overburden/centrifuge cake deposit exhibits an undrained shear strength greater than the undrained shear strength of centrifuge cake alone. In one embodiment, the overburden/FFT deposit has an undrained shear strength greater than about 5 kPa. In one embodiment, the overburden/FFT centrifuge cake deposit has an undrained shear strength greater than about 25 kPa. In one embodiment, the overburden/FFT centrifuge cake deposit has an undrained shear strength between about 25 kPa to about 50 kPa.

Without being bound by any theory, the greater undrained shear strength of the overburden/FFT deposit is attributed to the moisture transfer from the FFT to the overburden within the mixture. The moisture transfer and greater undrained shear strength thus facilitate handling and disposal of both overburden and tailings.

In one embodiment, the overburden/FFT deposit and/or the overburden/FFT centrifuge cake deposit has a solids content of at least about 70 wt %. In one embodiment, the overburden/FFT deposit and/or the overburden/FFT centrifuge cake deposit has a moisture content which approaches optimum moisture content. As used herein, the term "optimum moisture content" means the percentage of moisture in a material at which the material can be compacted to its greatest density. An overburden/FFT deposit having a moisture content close to its optimum moisture content results in a higher undrained shear strength than that of a deposit having a moisture content exceeding the optimum moisture content. A deposit approaching optimum moisture content can thus achieve an appreciable level of compaction. As used herein, the term "compaction" means a process in which stress is applied to the deposit to cause densification as air is displaced from the pores among the solids. In one embodiment, the deposit may be compacted before disposal or dewatering.

Figure 2:
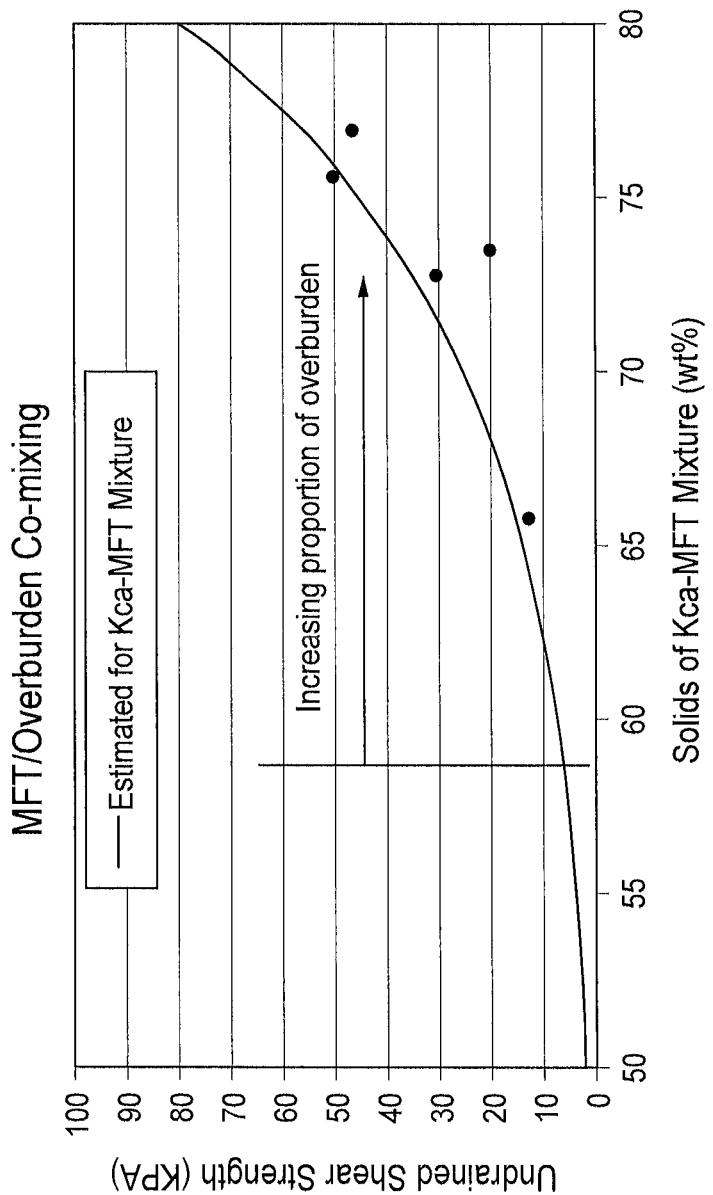
FIG. 2 is a plot of the increase in undrained shear stress (KPA) of the overburden/FFT mixture versus the weight percent of the solids in the overburden/FFT mixture.

FIG. 2 shows the increase in undrained shear stress (KPA) of the overburden/FFT mixture (i.e., treated overburden) versus the weight percent of the solids in the treated overburden.

It can be seen in FIG. 2 that increasing the proportion of overburden (i.e., increasing the wt % of solids) resulted in a significant increase in undrained shear strength.

The overburden/FFT deposit may be collected and transported via a conveyor, pump or transport truck to a disposal area. At the disposal area, the overburden/FFT deposit is stacked to maximize dewatering by natural processes including consolidation, desiccation and freeze thaw via 1 to 2 m, or greater than 2 m thick annual lifts to deliver a trafficable surface that can be reclaimed.

Figure 3:
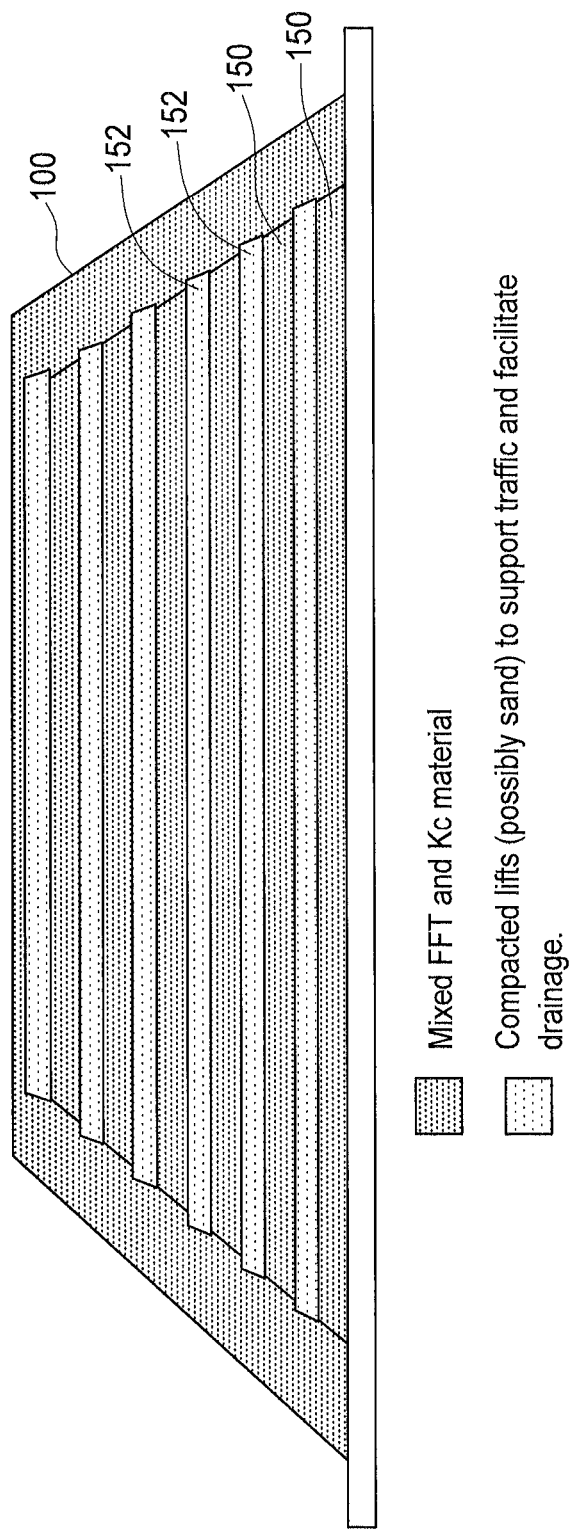
FIG. 3 shows a schematic of poldering which incorporates alternating layers of mixed overburden/FFT and sand.

In another embodiment, the overburden/FFT deposit may be placed in layers which alternate with layers of compacted lifts. In one embodiment, the compacted lifts comprise sand. Such a configuration of layers not only delivers a trafficable surface but also facilitates drainage. In another embodiment, poldering can be used. A polder is a low-lying tract of land enclosed by embankments (barriers) known as dikes that forms an artificial hydrological entity. FIG. 3 shows a schematic of poldering which incorporates alternating layers of mixed overburden/FFT and sand. A dike 100 is built and layers of overburden/FFT 150 placed in the dike with alternating layers of sand 152.

Exemplary embodiments of the present invention are described in the following Examples, which are set forth to aid in the understanding of the invention, and should not be construed to limit in any way the scope of the invention as defined in the claims which follow thereafter.

EXAMPLE 1

Materials

The Clearwater Formation constitutes the majority of the overburden (75-85 m thick) overlying the McMurray Formation oil sands (Alberta, Canada) and is formed of several layers. The base layer, Kcw, is shallow marine glauconite with sand interbeds and some clay shale, with an average clay content of 23%. High water retention is observed in the Kcw clay due to its low permeability and high porosity. The Kcw is 3-5 m thick and contains traces of bitumen. The Kca unit is 3-5 m thick, with an average clay content of 50%. With increasing depth, the composition of the unit changes from silty clay to dark grey clay silt. The Kca is characterized as a weak and highly plastic unit. The Kcb unit is 4.5-6 m thick, with an average clay content of 60%, of which the majority is low density smectite. The Kcc unit is 21-23 m thick. Six siltstone layers interspersed with light grey clay silt compose the layer such that the clay content varies from 18-70%. High porosities (36-50%) result in a high potential for expansion and swelling. The Kce and Kcf units are typically present in thick overburden that is not traditionally surface mined. The Kcd unit is the uppermost unit for surface mining but is not always encountered due to glacial scouring.

Samples of Kca, Kcb, Kcc, and Kcw were tested (i.e., four 20 L buckets of split 3-inch core samples of Kca and Kcw facies and three 20 L buckets of split 3-inch core samples of Kcb and Kcc facies). Twelve buckets of FFT and two buckets of recycled mine water (each 20 L buckets) were also used. Shale samples were broken manually into lumps about 5 mm in size and filtered through a US #4 sieve (4.75 mm). All material passing the sieve was retained and set aside, while material retained on the sieve was re-processed until all material passed. The procedure was repeated using a US #10 sieve (2 mm), but care was taken to ensure that half of the shale was retained on the sieve and half passed through the sieve. Coarse (2-4.75 mm) and fine (less than 2 mm) shale lump sizes were used. Processing was performed rapidly to maintain the insitu moisture content, and all processed material was sealed in containers covered with plastic wrap.

EXAMPLE 2

Index Testing of Individual Materials

Index tests were performed to assess various properties of the shale facies and the FFT (Tables 1 and 2). Bitumen content was not assessed, but included as part of the liquid phase.

TABLE 1

| Test | Shale | FFT |
|---|---|---|
| As-Received Moisture Content | X | X |
| Atterberg limits (with recycled mine water) | X | X |
| Atterberg Limits (with distilled water) | X (tests performed on selected samples) | |
| Specific Gravity | X | X |
| Organic Content | X | X |
| Particle Size Analysis (Sieve-Hydrometer) | X | X |
| Consolidation | | X |
| Surface Area | X | |
| Methylene Blue Index (MBI) | X | |
| X-Ray Diffraction (XRD) | X | X |
| Energy Dispersive X-Ray Spectroscopy (EDX) | X (tests performed on selected samples) | |
| Dean Stark Testing | | X |
| Bulk Density | X | |
| Recycled Mine Water (RCW) Testing | N/A | N/A |

TABLE 2

| | | Atterberg Limits [1]Samples tested with recycled mine water [2] Samples tested with distilled water | | | | |
|---|---|---|---|---|---|---|
| Sample | Moisture Content [%] | LL [%] | PI [%] | LI [%] | Specific Gravity | Organic Content [%] |
| Kca-1 | 23.9 | 117.4 | 92.7 | −0.9 | 2.80 | 3.1 |
| Kca-1a | N/A | 115.0 | N/A | N/A | N/A | |
| Kca-2 | 16.6 | 138.8 | 116.9 | −4.5 | 2.82 | |
| Kca-2a | N/A | 130.7 | N/A | N/A | N/A | |
| Kca-3 | 15.1 | 121.3 | 97.8 | −8.6 | 2.78 | |
| Kca-3a | N/A | 120.8 | N/A | N/A | N/A | |
| Kcb-1 | 30.8 | 123.9 | 97.9 | 4.9 | 2.80 | 2.1 |
| Kcb-1a | N/A | 120.6 | 95.3 | N/A | N/A | |
| Kcb-2 | 29.7 | 152.4 | 128.9 | 4.8 | 2.77 | |
| Kcb-2a | N/A | 117.8 | 90.1 | N/A | N/A | |
| Kcb-2b | N/A | 164.1 | N/A | N/A | N/A | |
| Kcb-2c | N/A | 130.3[2] | 106.7[2] | N/A | N/A | |
| Kcb-3 | 25.0 | 81.5 | 63.8 | 11.4 | 2.74 | |
| Kcb-3a | N/A | 82.1 | 63.2 | N/A | N/A | |
| Kcc-1 | 21.7 | 60.7 | 41.4 | 5.8 | 2.77 | 2.7 |
| Kcc-2 | 19.6 | 63.8 | 45.0 | 1.8 | 2.74 | |
| Kcc-3 | 19.1 | 78.8 | 60.7 | 1.6 | 2.76 | |
| Kcc-3a | N/A | 77.0 | 57.7 | N/A | N/A | |
| Kcw-1 | 13.8 | 64.5 | 47.1 | −7.6 | 2.78 | 2.9 |
| Kcw-2 | 14.3 | 65.2 | 49.7 | −2.4 | 2.79 | |
| Kcw-3 | 16.3 | 40.2 | 25.3 | 5.5 | 2.68 | |
| Kcw-3a | N/A | 50.6 | 34.8 | N/A | N/A | |
| FFT-1 | 132.3 | 70.8 | 48.2 | 227.6 | 2.35 | 14.4 |
| FFT-2 | 132.2 | 72.8 | 50.5 | 217.6 | 2.36 | 14.1 | i. Moisture Content

Three samples of each shale facies and two samples of the FFT were tested. Moisture content is defined as:

$$w = m_w/m_s \times 100 \qquad (1)$$

where w=moisture content; $m_w$=mass of water; and $m_s$=mass of solids. The lowest moisture content was observed in Kcw (average of 15%), with the highest noted in Kcb (average of 29%), The average moisture contents of Kcb, Kca, and Kcc were 29%, 19%, and 20%, respectively. The average moisture content of the FFT was 132%.

ii. Atterberg Limits

Three samples of each shale facies and two samples of the FFT were tested for Liquid Limit (LL) and Plastic Limit (PL). The Plasticity Index (PI) is defined as:

$$PI = LL - PL \qquad (2)$$

Since initial tests on some of shale facies indicated significant variability in the LL and the PL, subsequent tests were performed. With the exception of one sample, all tests were performed using recycled mine water. The test on Kcb-2c was performed using distilled water, and the results for Kcb-2c fell within the range of plasticity values observed on the recycled mine water samples (Kcb-2, Kcb-2a, Kcb-2b), indicating that distilled water does not significantly impact the plasticity of the shale facies.

Figure 4:
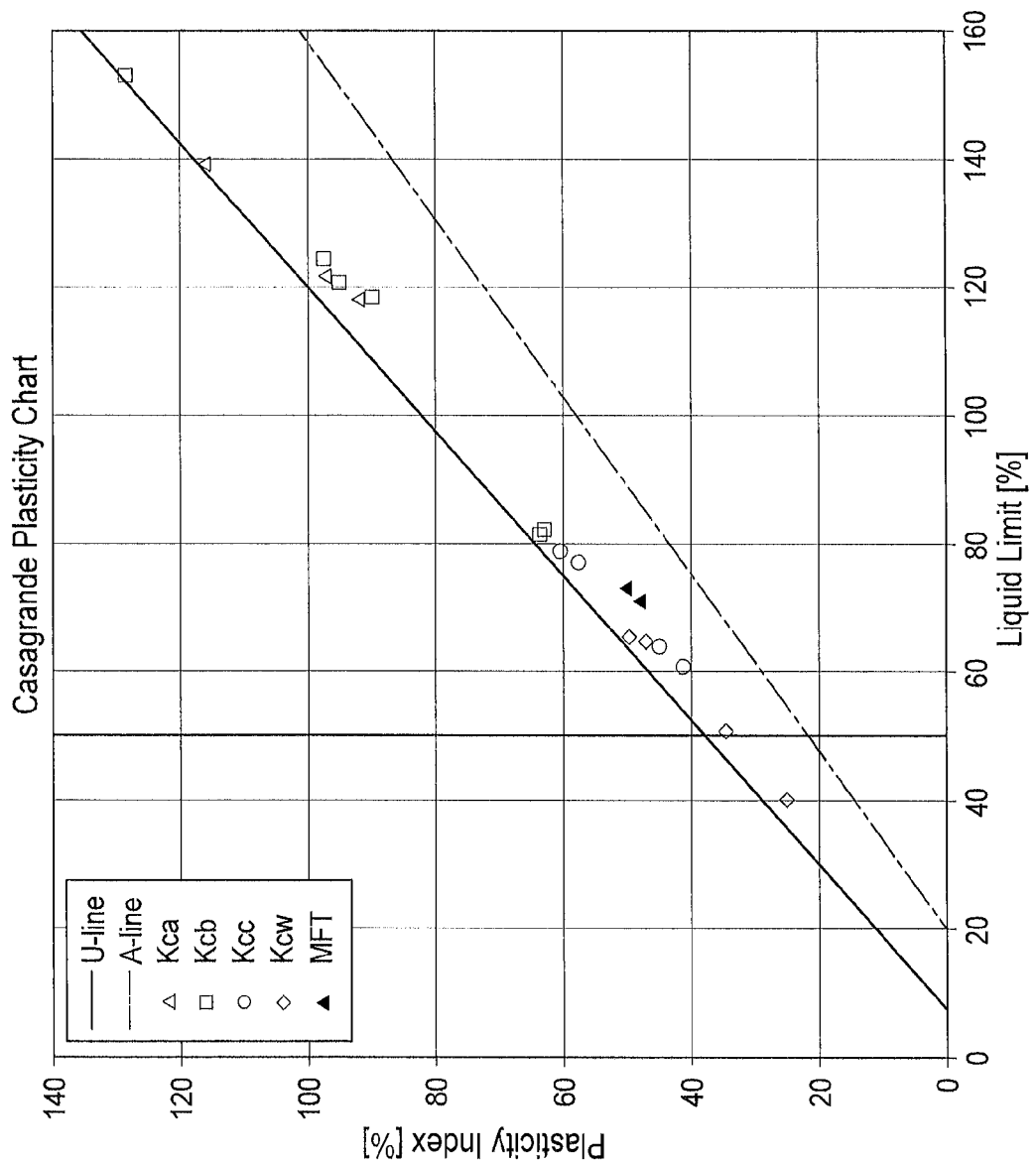
FIG. 4 is a Casagrande plasticity chart plotting the liquid limit against the plasticity index.
Figure 5:
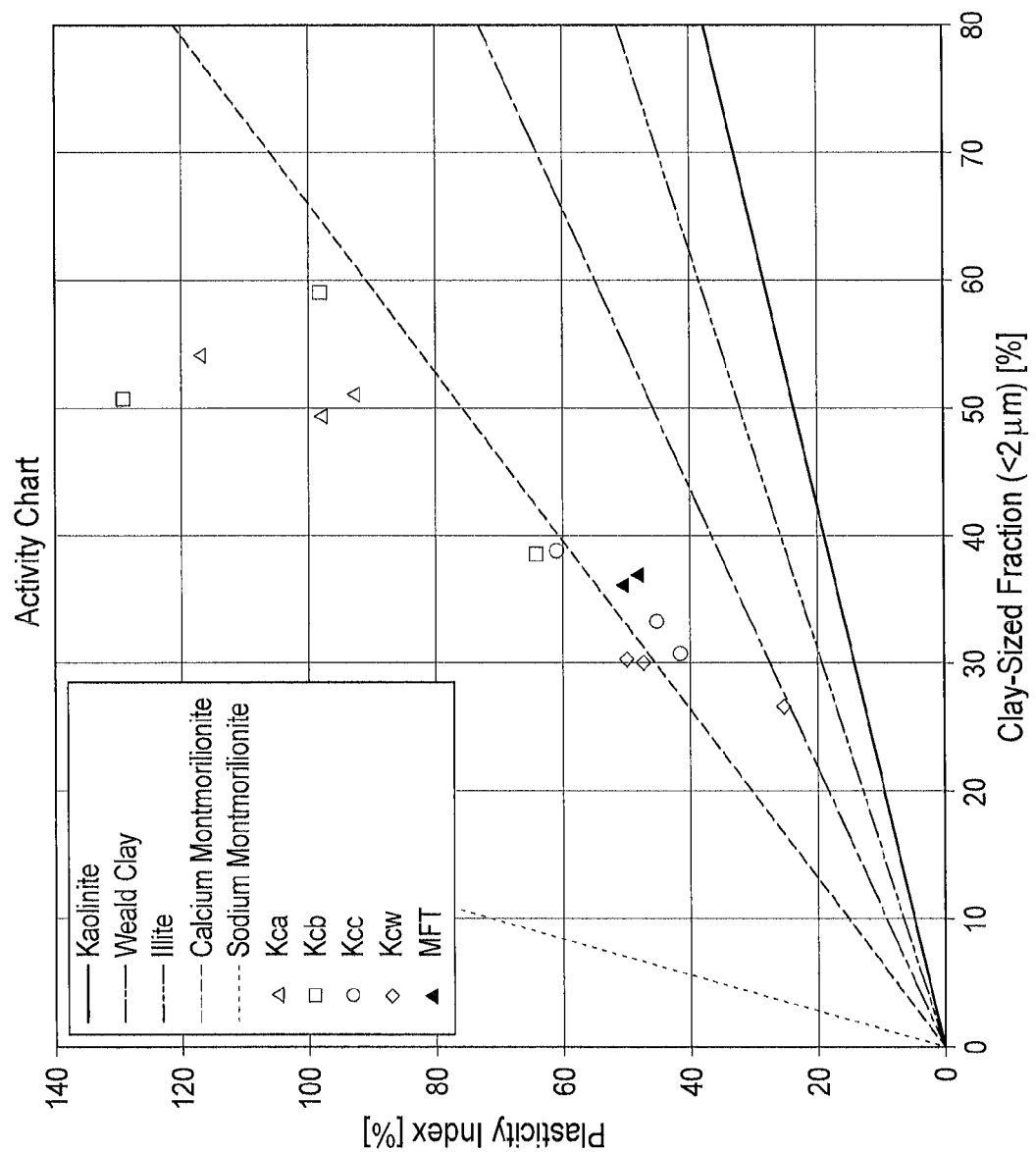
FIG. 5 is an activity chart plotting the clay-sized fraction against the plasticity index.
Figure 6:
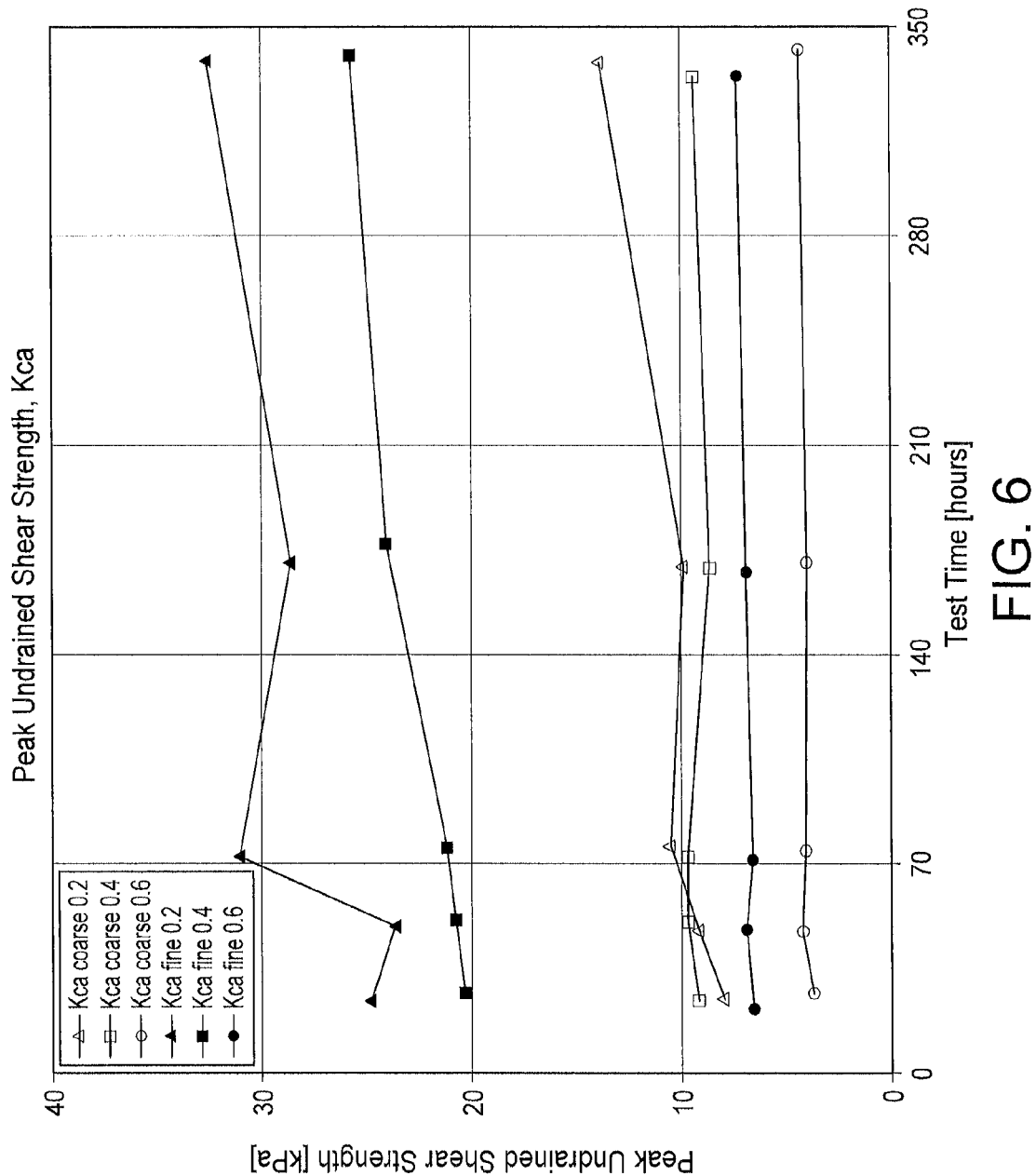
FIG. 6 is a graph showing the peak undrained shear strength over time for fine and coarse samples of the Kca facies.
Figure 7:
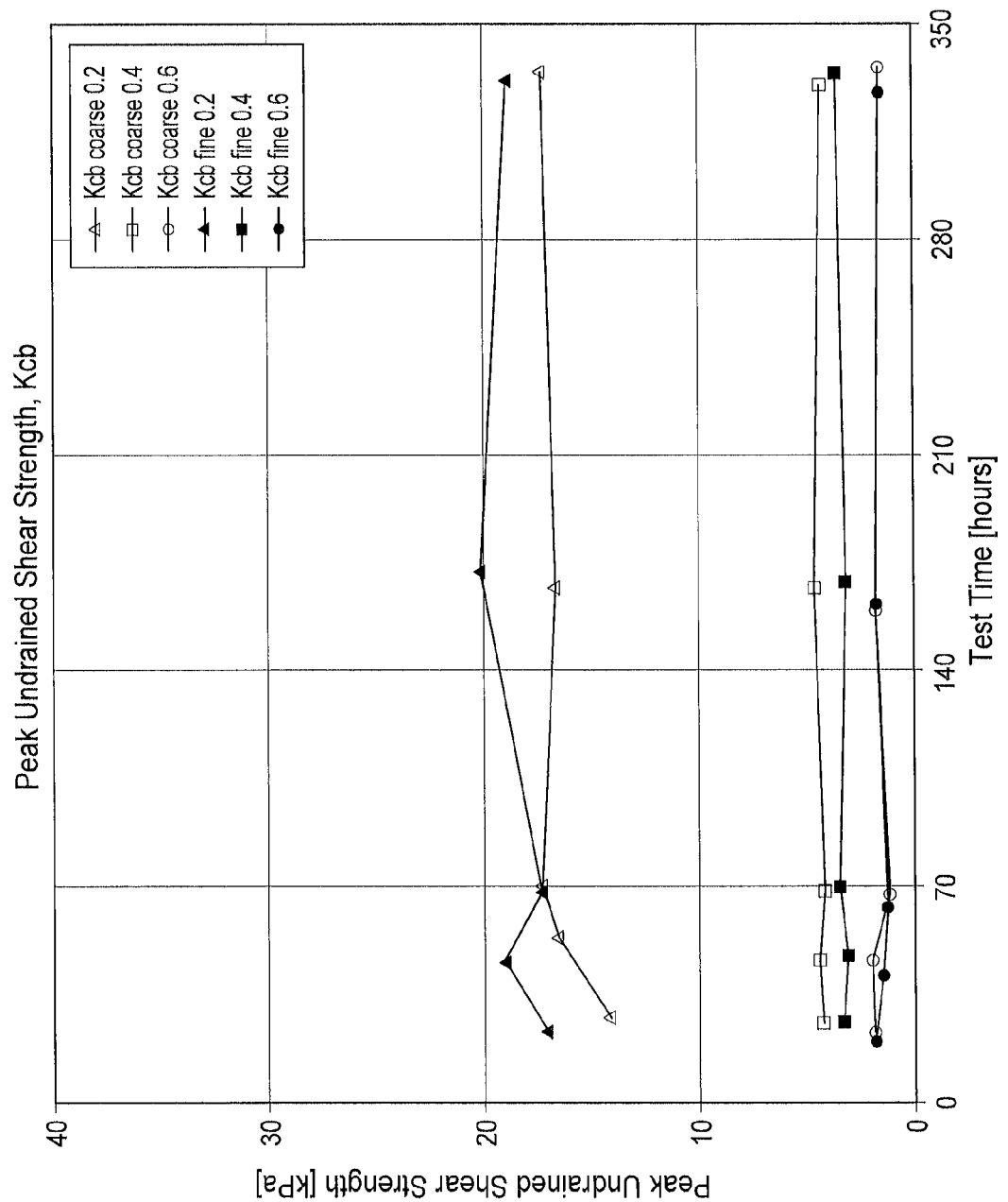
FIG. 7 is a graph showing the peak undrained shear strength over time for fine and coarse samples of the Kcb facies.
Figure 8:
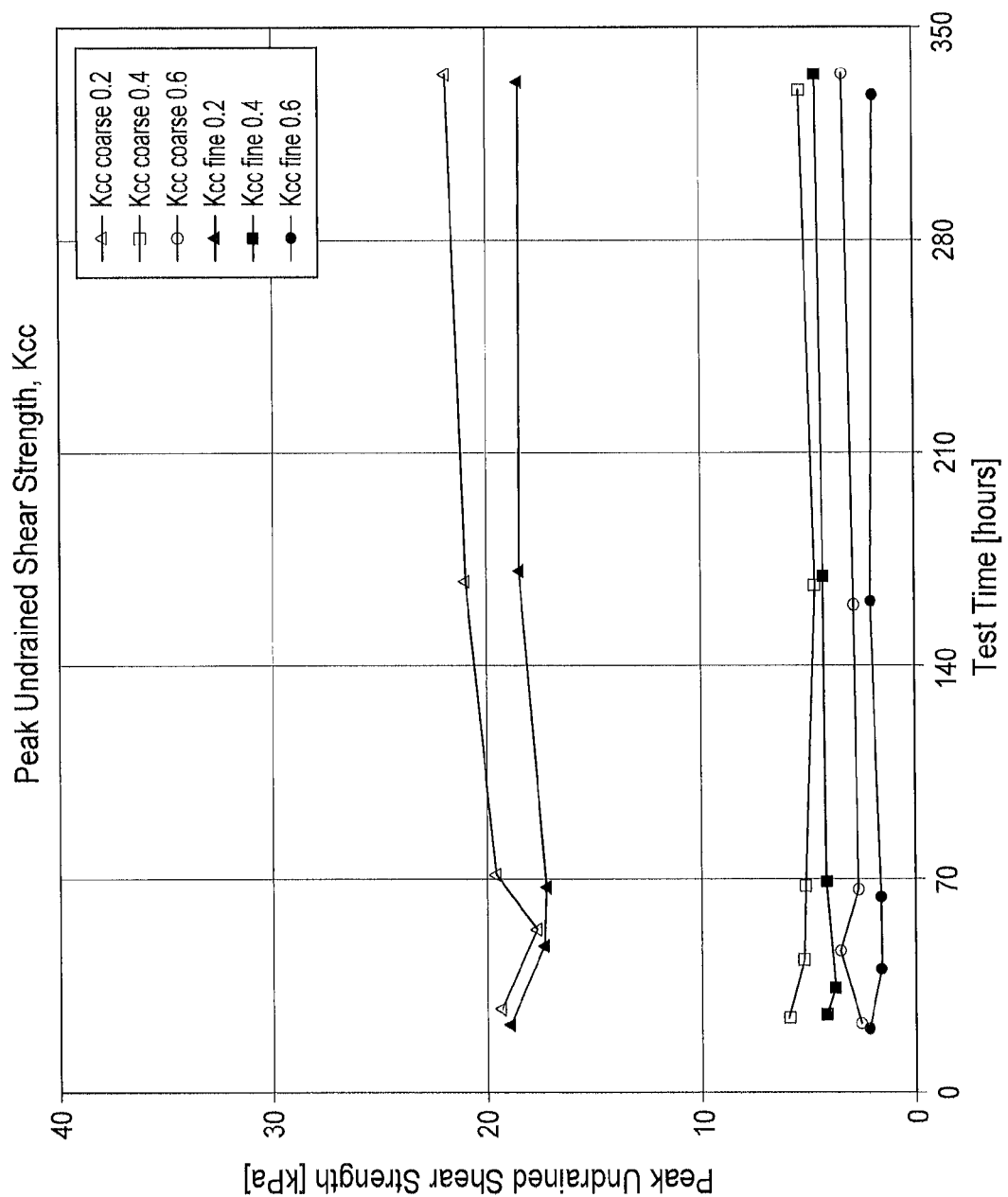
FIG. 8 is a graph showing the peak undrained shear strength over time for fine and coarse samples of the Kcc facies.
Figure 9:
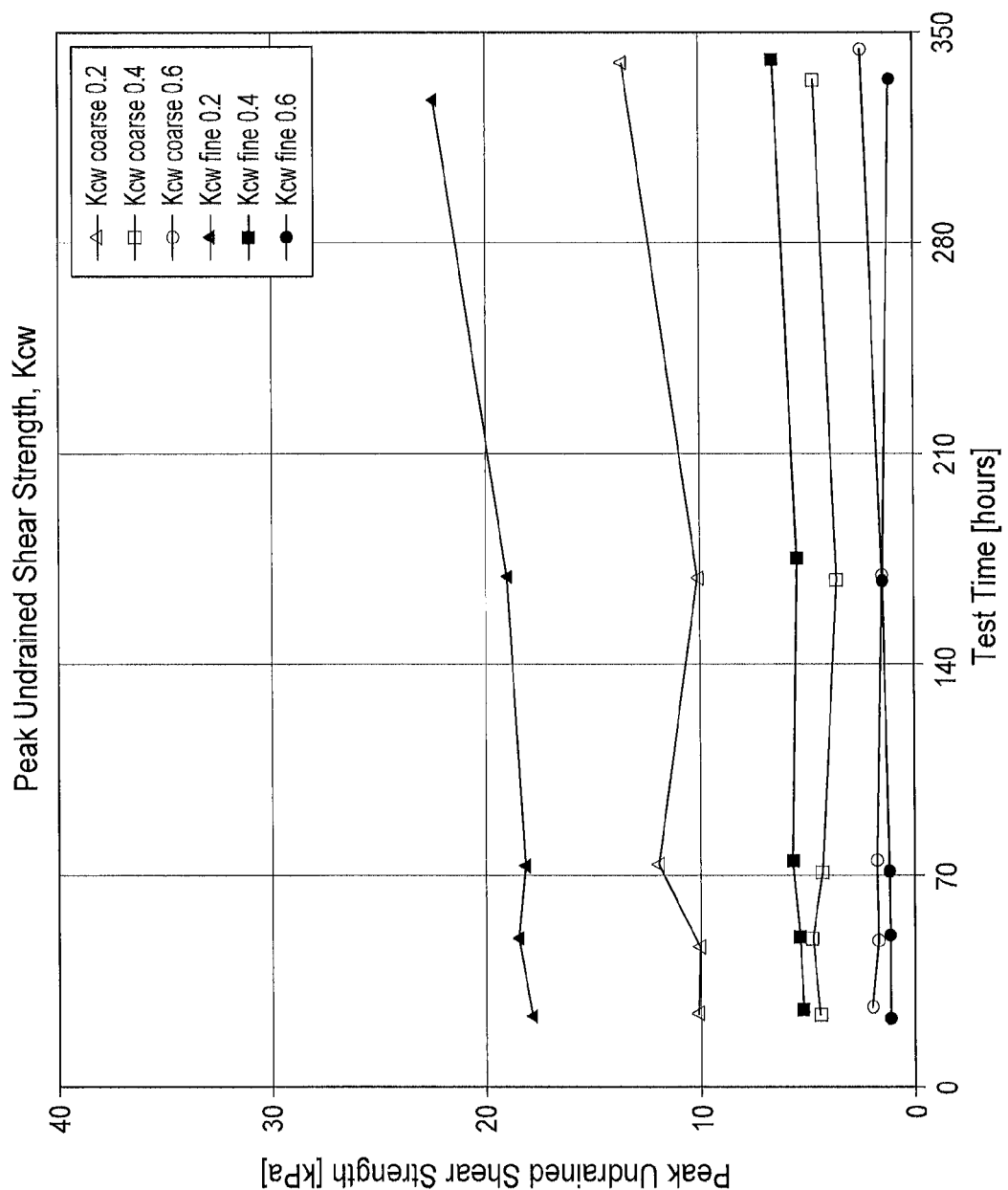
FIG. 9 is a graph showing the peak undrained shear strength over time for fine and coarse samples of the Kcw facies.

Kca exhibits the highest plasticity, while Kcw has the lowest plasticity (FIGS. 4-5). In general, the shale facies and FFT are primarily classified as medium and high plasticity clay. The LL and PI for Kca ranged from 115-139% and 93-117%, respectively. The average LL and PI of Kca was 124% and 103%, respectively. Kcb had a LL and PI ranging from 82-164% and 63-129%, respectively. Similarly, Kcc had a LL and PI varying between 61-79% and 41-61%, respectively. The LL and PI results for Kcw ranged from 40-65% and 25-50%, respectively. The average LL was 124%, 120%, 70%, and 55% for Kca, Kcb, Kcc, and Kcw, respectively. The average PI was 103%, 90%, 51%, and 39% for Kca, Kcb, Kcc, and Kcw, respectively.

The above results indicate a significant capacity for moisture absorption. Kca and Kcb exhibited the highest potential for moisture absorption, where the average moisture content ranged from 18-28%, the average LL varied from 120-124%, and the average Liquidity Index (LI) ranged from −5-7%. Kcc has moderate to high potential for moisture absorption, with an average moisture content of 20%, a LL of 70%, and a LI of 3%. Kcw has the lowest capacity for moisture absorption, with an average moisture content of 15%, a LL of 55%, and a LI of −2%.

Results of plasticity testing and particle size analysis were combined into an activity chart showing the estimated clay mineralogy of the shale facies and FFT (FIG. 5). The shale facies are predominantly composed of montmorillonite with some illite. When compared to the clay mineralogy testing, the results for Kca and Kcb are in general agreement. However, the clay mineralogy test results for Kcc, Kcw, and FFT indicated higher levels of illite, which was not indicated by the activity chart.

iii. Specific Gravity

Three samples of each shale facies and two samples of FFT were tested. The specific gravity of the shale facies fell within a range of 2.68-2.82, with Kcw exhibiting the lowest value and Kca the highest. The specific gravity for Kca ranged from 2.78-2.82 and for Kcw from 2.68-2.79. The specific gravity ranged from 2.74-2.80 and from 2.74-2.77 for Kcb and Kcc, respectively. The average specific gravity was 2.80, 2.77, 2.76, and 2.75 for Kca, Kcb, Kcc, and Kcw, respectively. The FFT samples had a specific gravity of 2.35 and 2.36.

iv. Organic Content

One organic content test was performed for each shale facies and two organic content tests were performed on the FFT. Dean-Stark testing was also performed on the FFT to assess bitumen content. The organic content was about 2-3% for all facies. The FFT had an organic content ranging from 14.1-14.4%, and was composed of 93.0% minerals, 2.9% water, and 4.1% bitumen.

v. Particle Size Distribution

Sieve and hydrometer analysis testing was performed on three samples of each facies and two samples of the FFT. Sand content is defined as particles greater than 0.075 mm; silt as particles between 0.075 mm and 2 μm; and clay as particles less than or equal to 2 μm. The highest clay size fraction was observed in Kca and Kcb, with lower clay content in Kcc and Kcw. Kca contained 1.6% sand, 37.9% silt, and 60.5% clay, on average. For Kcb, the average results indicated 10.1% sand, 33.4% silt, and 56.5% clay. For Kcc, the average results indicated 1.3% sand, 59.2% silt, and 39.5% clay. For Kcw, the average results indicated 29.8% sand, 36.3% silt, and 33.8% clay. For FFT, the average results indicated 1.2% sand, 51.8% silt, and 47.0% clay.

vi. Consolidation

One consolidation test was performed on a sample of the FFT. The sample was moisture conditioned with fans to dry out the material prior to the initial load increment to allow for proper placement of the material into the test mold. The FFT had an initial dry density of 833 kg/m$^3$ (52 pcf), an initial void ratio of 1.849, and exhibited a compression index of 0.43 and a recompression index of 0.13. The coefficient of consolidation was measured for each load increment and was found to vary from $1.1 \times 10^{-5}$ cm$^2$/sec to $8.0 \times 10^{-5}$ cm$^2$/sec.

vii. Surface Area

To evaluate the variability of each shale facies relative to the moisture absorption capacity, one surface area test was performed for each shale facies in accordance with the BET theory using a three point analysis of the dynamic flow technique. The samples were heated while simultaneously flowing gas over the sample to remove impurities. The samples were cooled and monitored for the volume of nitrogen gas absorbed by the sample at three specific pressures (nitrogen gas physisorption). The surface area of Kca was highest and closely followed by Kcb, while that of Kcw was the lowest (Table 3).

TABLE 3

| | Facies | | | |
|---|---|---|---|---|
| | Kca | Kcb | Kcc | Kcw |
| Surface Area [m$^2$/g] | 46.5 | 43.7 | 24.8 | 10.7 |

The results represent the surface area of the entire composition of each shale facies. The surface area results do not correspond directly to specific clay minerals, as the shale facies were found to consist of many different mineral components beyond the primary clay mineral components of kaolinite, chlorite, illite, and montmorillonite.

viii. Methylene Blue Index (MBI)

MBI testing measures the absorption of methylene blue dye by a clay sample. Three samples of each facies were tested. The MBI of Kca and Kcb were highest, while the MBIs of Kcc and Kcw were lowest (Table 4). The MBI results represent the cation exchange capacity of the entire composition of each shale facies. The MBI results do not correspond directly to specific clay minerals, as the shale facies were found to consist of a combination of different clay mineral components.

TABLE 4

| Sample | MBI [meq/100 g] | Average MBI [meq/100 g] |
|---|---|---|
| Kca-1 | 37.5 | 34.7 |
| Kca-2 | 39.5 | |
| Kca-3 | 27.0 | |
| Kcb-1 | 41.0 | 37.8 |
| Kcb-2 | 48.5 | |
| Kcb-3 | 24.0 | |
| Kcc-1 | 16.0 | 18.2 |
| Kcc-2 | 18.0 | |
| Kcc-3 | 20.5 | |
| Kcw-1 | 17.5 | 13.7 |
| Kcw-2 | 16.0 | |
| Kcw-3 | 7.5 | | ix. Mineralogy

One sample of each facies and one sample of the FFT were tested. X-ray diffraction (XRD) tests were completed both on the bulk fraction and clay-sized fraction, where the clay size fraction was defined as the material less than or equal to 3 μm in particle size. The results are set out in Table 5. The clay size fraction of Kca and Kcb was dominated by montmorillonite and to a much lesser extent, illite. The clay size fraction of Kcc and Kcw was primarily illite with some chlorite and kaolinite. The clay size fraction of FFT was predominantly kaolinite with some illite. When compared to the estimated clay mineralogy based on the clay activity chart (FIG. 5), these results compared well for Kca and Kcw. However, when compared to Kcb and Kcc, the clay mineralogy results indicated less montmorillonite than that predicted by the activity chart. One Energy Dispersive X-Ray Spectroscopy (EDX) test was conducted on the sample of Kcb and generally validated the XRD results.

TABLE 5

| Sample | Fraction | Weight [%] | Kaolinite | Chlorite | Illite | Montmorillonite |
|---|---|---|---|---|---|---|
| Kca | Bulk | 82.5 | 7 | 5 | 2 | 23 |
| | Clay | 17.5 | 5 | 4 | 23 | 63 |
| | Bulk & Clay | 100.0 | 6 | 5 | 6 | 30 |
| Kcb | Bulk | 77.5 | 5 | 3 | 4 | 22 |
| | Clay | 22.5 | 12 | 11 | 16 | 58 |
| | Bulk & Clay | 100.0 | 7 | 5 | 7 | 30 |
| Kcc | Bulk | 80.5 | 6 | 5 | 20 | 3 |
| | Clay | 19.5 | 20 | 25 | 30 | 16 |
| | Bulk & Clay | 100.0 | 9 | 9 | 22 | 5 |
| Kcw | Bulk | 87.8 | 3 | 2 | 12 | 2 |
| | Clay | 12.2 | 10 | 12 | 34 | 35 |
| | Bulk & Clay | 100.0 | 4 | 3 | 14 | 6 |
| FFT | Bulk | 83.0 | 34 | 0 | 21 | 0 |
| | Clay | 17.0 | 76 | 0 | 18 | 0 |
| | Bulk & Clay | 100.0 | 41 | 0 | 21 | 0 | x. Bulk Density

Bulk density testing is defined as:

$$\rho_{bulk} = m_{ps}/V_{ps} \qquad (3)$$

where $\rho_{bulk}$=bulk density; $m_{ps}$=mass of processed shale facies; $V_{ps}$=volume of processed shale facies. The bulk density was measured for both lump sizes of each of the four shale facies by measuring the mass of shale required to fill a 1000 mL graduated cylinder (Table 6).

TABLE 6

| Facies | Lump Size | Bulk Density [kg/m³] |
|---|---|---|
| Kca | coarse | 937 |
|  | fine | 1,031 |
| Kcb | coarse | 906 |
|  | fine | 918 |
| Kcc | coarse | 1,048 |
|  | fine | 1,020 |
| Kcw | coarse | 1,096 |
|  | fine | 1,117 | xi. Recycled Mine Water Testing

The recycled mine water had a resistivity of 260 ohm-cm and a pH of 7.9.

In summary, the results of the Atterberg limits, surface area, MBI, and clay mineralogy indicate that Kca and Kcb facies behave differently from Kcc and Kcw. Atterberg limits results indicate higher plasticity in Kca and Kcb, while the same facies exhibit higher surface area than that of Kcc and Kcw. MBI values for Kca and Kcb are notably higher than those of Kcc and Kcw. The mineralogy of Kca and Kcb indicates higher montmorillonite content than that measured in Kcc and Kcw. Without being bound by any theory, the mineralogy of the shale facies (which is related to the plasticity, surface area, and MBI) controls the moisture transfer phenomena and, thus, the strength of the mixtures. The index test results tend to indicate a linear relationship in that higher LL and PI, higher clay size fraction, lower moisture content, and higher surface area correlate to larger absorption capacity, larger MBI, and more montmorillonite content.

EXAMPLE 3

Preparation of Shale/FFT Mixtures

Shale/FFT mixtures were prepared to include specific shale facies, shale lump size, and FFT:shale ratio. The mixing process involved one technician placing the processed shale in a large plastic mixing bin while another poured FFT into the bin. A third technician mixed the shale and FFT using a metal spoon and spatula, while retaining the shale lump size and preventing inadvertent compaction. Portions of the FFT and shale were placed in the sample mixing bin in a total of 8 to 10 lifts to ensure thorough mixing. Mixing was completed in 10-15 minutes in a temperature-controlled room. The sample containers were covered with plastic immediately to minimize moisture loss. Each FFT-shale mixture was placed into a test mold (6 mm thick acrylic cylinder having a diameter of 254 mm and height of 178 mm) for vane shear testing. The mixture was placed into the test mold to a height of 152 mm to allow for 25 mm of splash clearance. The mixture was placed into the test mold in approximately 6 to 8 lifts by one technician, while a second technician carefully used a spatula to spread out each lift and prevent the creation of significant voids in the test mold, while avoiding inadvertent compaction. Lifts were placed maintaining a relatively flat surface and the final lift was used to create a relatively flat surface along the top of the sample. As part of the mixing process, a small sample of the mixture was placed separately into a glass jar (40 mm in diameter and 150 mm in height) for independent suction measurements.

EXAMPLE 4

Testing of Shale/FFT Mixtures i. Shear Strength

The undrained shear strengths of various FFT-shale mixtures were evaluated using vane shear testing. The magnitude, rate, and mechanisms of the undrained shear strength increase that occurs under different mix ratios, shale facies, shale lump size, and time were determined. Three different ratios of FFT:shale (0.2:1.0, 0.4:1.0, and 0.6:1.0 based on bulk volume) were tested. A ratio of 0.5:1.0 was specified for a composite sample formed of 50% Kcc, 30% Kcb, and 20% Kca (by bulk volume). Table 7 provides a summary of the vane shear testing.

TABLE 7

|  | Mix | Coarse Lump Size | | | | | Fine Lump Size | | | | |
|---|---|---|---|---|---|---|---|---|---|---|---|
| Facies | ratio | 1 | 2 | 3 | 7 | 14 | 1 | 2 | 3 | 7 | 14 |
| Kca | 0.2 | x | x | x | x | x | x | x | x | x | x |
|  | 0.4 | x | x | x | x | x | x | x | x | x | x |
|  | 0.6 | x | x | x | x | x | x | x | x | x | x |
| Kcb | 0.2 | x | x | x | x | x | x | x | x | x | x |
|  | 0.4 | x | x | x | x | x | x | x | x | x | x |
|  | 0.6 | x | x | x | x | x | x | x | x | x | x |
| Kcc | 0.2 | x | x | x | x | x | x | x | x | x | x |
|  | 0.4 | x | x | x | x | x | x | x | x | x | x |
|  | 0.6 | x | x | x | x | x | x | x | x | x | x |
| Kcw | 0.2 | x | x | x | x | x | x | x | x | x | x |
|  | 0.4 | x | x | x | x | x | x | x | x | x | x |
|  | 0.6 | x | x | x | x | x | x | x | x | x | x |
| Composite | 0.5 | x | x | x | x | x | x | x | x | x | x |
| Layered | 0.6 | | | N/A | | | | | N/A | | |
| Absorption | N/A | | | N/A | | | | | N/A | | |

Five shear strength tests were performed on each sample to assess the potential shear strength gain over time as moisture was transferred from the FFT to the shale. The vane shear apparatus was a Geomil™ FFL 100 Electrical Vane Shear Tester capable of delivering a maximum torque of 100 N-m under and constant rate of rotation of 0.1 degrees per second. This rate of rotation allowed for measurement of the undrained shear strength, as slower rates of rotation may allow pore pressures to dissipate and not represent undrained conditions. Device control was performed through a computer running Geomilspecific™ Microsoft Excel spreadsheet connected to the vane shear apparatus, and vane torque data were acquired at an approximate frequency of 1 Hz. All tests were performed utilizing a Geomil™ 70 mm×35 mm vane which was selected to allow for proper assessment of the undrained shear strength of the mixture as a function of the shale lump size. The vane was sufficiently large such that the size of the lumps within the sample mixture did not impact the vane shear results. Vane shear tests utilizing vanes that are similar in size to the shale lumps produce erroneous results that generally do not represent the undrained shear strength of the mixture.

Sample molds were placed on a steel table and moved manually to allow for tests in five locations within the mold. The test locations were specified at 72-degree radial spacing within each test mold. Test locations were specified to allow for sufficient spacing to avoid impacts between each test. Test order was specified such that each subsequent test was performed on the opposing side of the test mold to avoid subsequent adjacent tests. Each shale-FFT mixture was tested at five time intervals (1, 2, 3, 7 and 14 days) to determine if the shear strengths of the mixtures might increase over time.

Following completion of the 14 day vane shear test, each mixture was re-compacted to both reduce voids with the material and to simulate field compaction during placement. Compaction was not successfully completed on all samples. Where feasible, two different compaction levels were specified. Samples were placed in standard Proctor density molds and compacted in four lifts. The lower compaction level included 14 blows/lift with a standard Proctor hammer, while the higher compaction level included 28 blows/lift with the same hammer. The energy used to compact each sample was 139 kN-m/m$^3$ (2,896 ft-lbf/ft$^3$) and 277 kN-m/m$^3$ (5,792 ft-lbf/ft$^3$) for the low and high compaction levels, respectively. Vane shear tests were completed on compacted samples immediately following compaction.

Each vane shear test was performed to a sufficient amount of rotation beyond the peak value (90-180°) to allow for adequate determination of the peak undrained shear strength of the mixture. The results are shown in FIGS. 6-16 which indicate the peak undrained shear strength measured in each test. FIGS. 6-10 show the variation in peak undrained shear strength over time following mixing, FIGS. 11-14 indicate the change in peak undrained shear strength under varying levels of compaction on mixtures where compaction was feasible.

Figure 15:
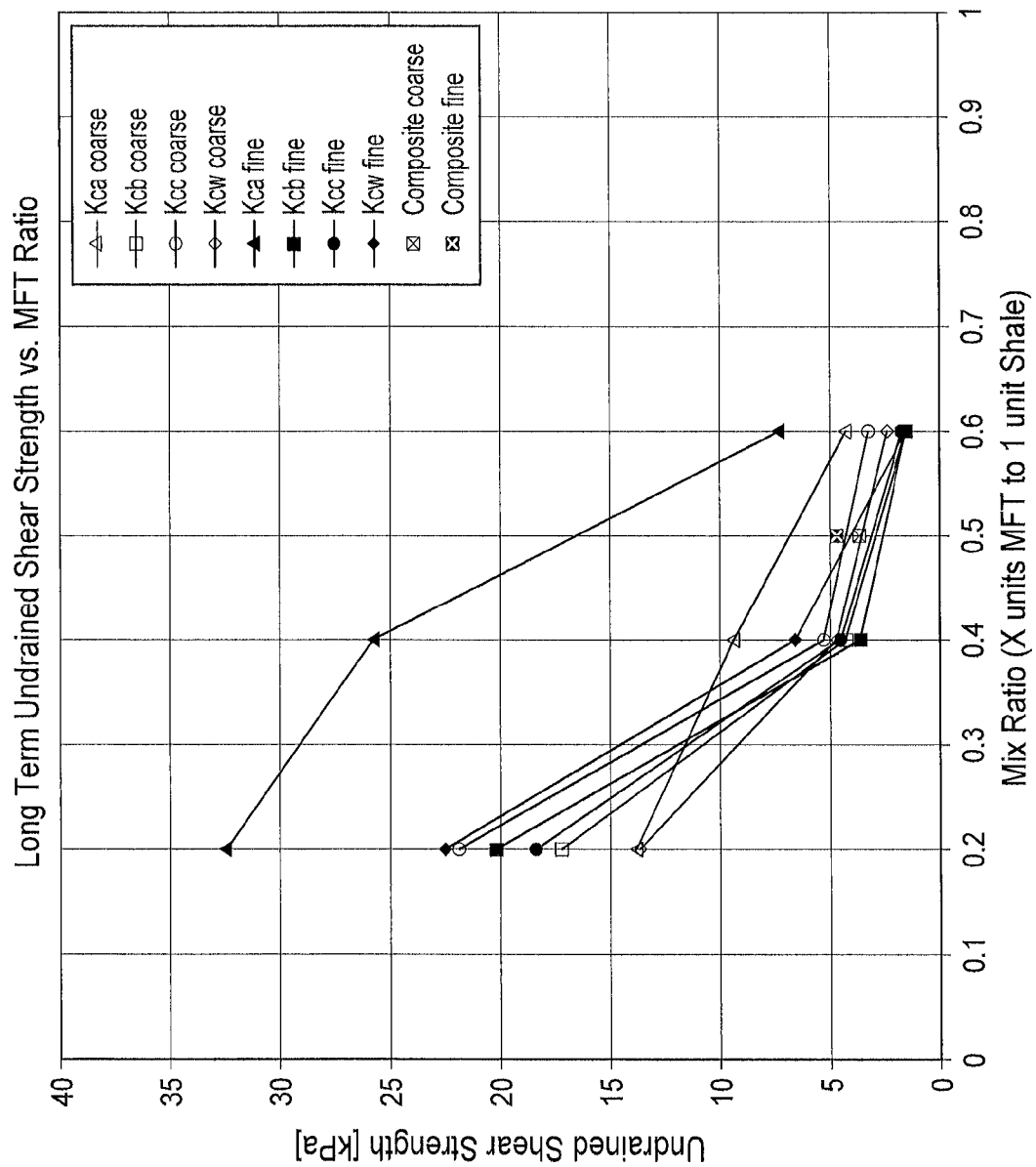
FIG. 15 is a graph showing the effect of the mixture ratio on long term undrained shear strength.

The results of the peak undrained shear strength indicated that the undrained shear strength was consistently higher for samples with lower mixing ratio (i.e. lower FFT content). The samples containing 0.2 units of FFT exhibited the highest undrained shear strength (14-33 kPa), while those with 0.6 units of FFT had the lowest undrained shear strength (1-7 kPa). The undrained shear strength of the 0.4 unit FFT (4-26 kPa) was only slightly higher than those of the 0.6 unit FFT. The most significant increase in undrained shear strength was observed when comparing 0.4 FFT to 0.6 FFT. FIG. 15 shows the relationship between FFT content and the corresponding undrained shear strength at 14 days following mixing.

An undrained shear strength of 5 kPa was achieved for all Kca samples, with the exception of the 0.6 FFT, coarse shale mixture. Similarly, 5 kPa was achieved for Kcb, Kcc, and Kcw at 0.2 FFT for both fine and coarse shale lumps. This requirement was also achieved in the Kcc, 0.4, coarse and Kcw, 0.4, fine mixtures. These results generally indicate that a mixing ratio of 0.2 will achieve an undrained shear strength of at least 5 kPa. Conversely, a mixing ratio of 0.6 is unlikely to exhibit at least 5 kPa undrained shear strength.

Figure 16:
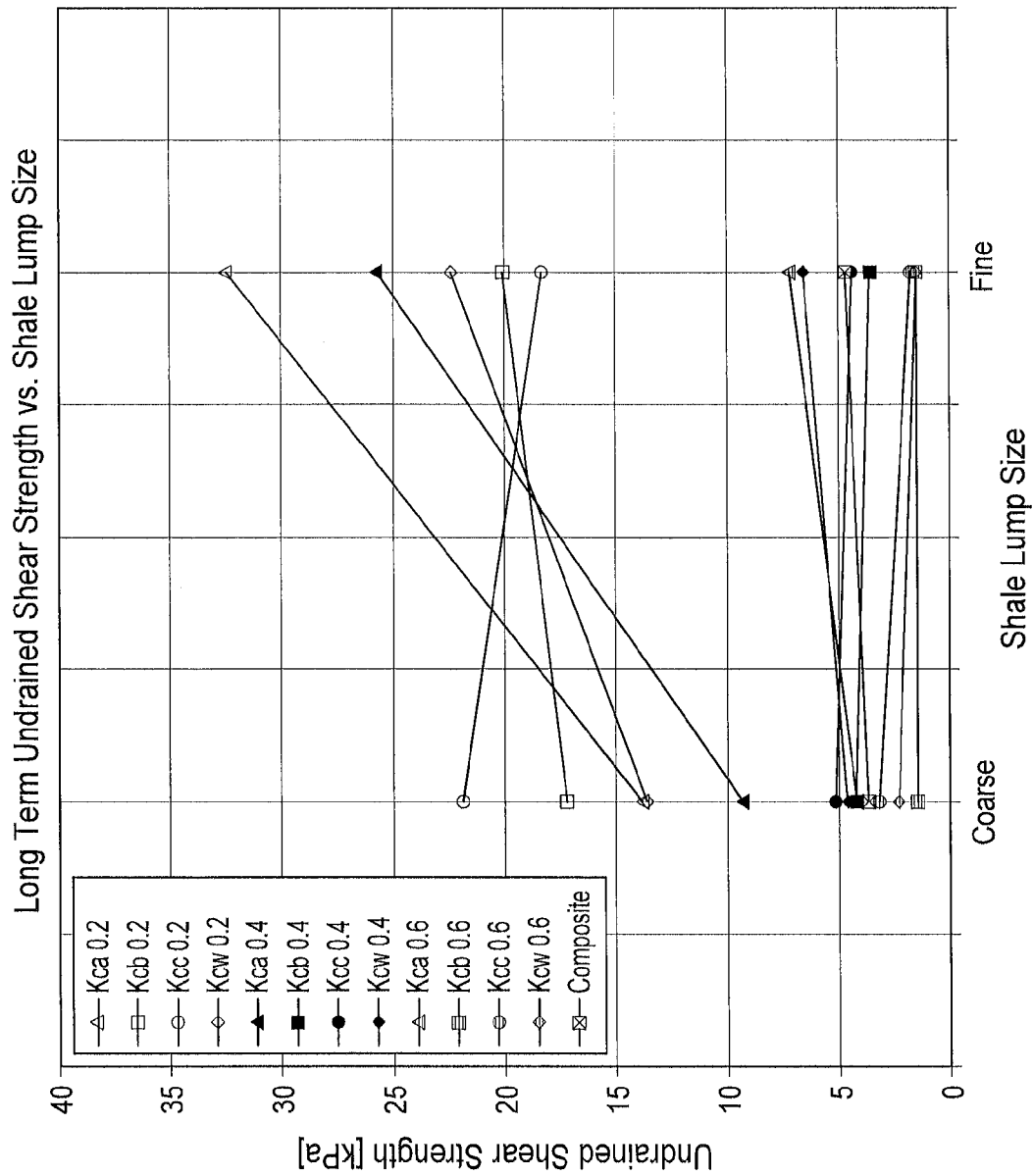
FIG. 16 is a graph showing the effect of shale lump size on long term undrained shear strength.

The mixtures with Kca exhibited the highest overall undrained shear strength (33 kPa, 0.2 FFT, fine). The results were somewhat mixed for samples with 0.2 units FFT, while results for samples with 0.4 and 0.6 units FFT generally indicated that the Kca mixtures yielded the highest undrained shear strengths. FIGS. 15-16 show the peak undrained shear strength for each of the shale facies.

Of the samples containing 0.2 units FFT and fine shale lumps, the mixtures with Kca had the highest undrained shear strength at 33 kPa, followed by Kcw, Kcb, and Kcc (22 kPa, 20 kPa, and 18 kPa, respectively). Conversely, of the samples with 0.2 units FFT and coarse shale lumps, Kcc exhibited the highest undrained shear strength at 22 kPa, followed by Kcb (17 kPa), and Kca and Kcw (14 kPa).

For those samples with 0.4 and 0.6 units FFT, Kca exhibited the highest undrained shear strength for both fine and coarse shale lumps. The results were generally mixed for the remaining shale facies, with no significant trend for a specific facies outperforming other facies, aside from Kca. At 0.4 units FFT and fine shale lumps, the highest undrained strength was observed for the sample with Kca at 26 kPa, while the remaining shale facies had undrained shear strengths between 4-7 kPa.

Similarly, coarse shale lumps and 0.4 units FFT yielded the highest undrained shear strength in Kca (9 kPa), while the other shale facies exhibited undrained shear strengths ranging from 4-5 kPa. At 0.6 units FFT and fine shale lumps, the highest undrained strength was observed for the sample with Kca at 7 kPa, while the remaining shale facies had undrained shear strengths between 1-2 kPa.

Similarly, coarse shale lumps and 0.4 units shale yielded the highest undrained shear strength in Kca (4 kPa), while the other shale facies exhibited undrained shear strengths ranging from 2-3 kPa.

When correlated to the clay mineralogy, the results of Kca generally tend to indicate that a higher montmorillonite content correlates to a higher undrained shear strength, likely since a high montmorillonite content corresponds to a high ability to hold water. This trend is partially validated by the results of Kcc and Kcw, where the montmorillonite content is low and the undrained shear strength is lower (relative to Kca). However, this is contradicted by the results of Kcb, which has a high montmorillonite content (close to Kca), but does not exhibit the same high undrained shear strengths of Kca. This phenomenon is closely mirrored in the clay surface area, where high surface area generally correlates to high undrained shear strength and vice versa. Similarly, the trend is not observed with Kcb, where the surface area is relatively high and but undrained shear strength is lower than that of Kca. This discrepancy may be due to the effects of other factors such as mixture moisture content, which may dominate the overall behavior of the material.

The size of shale lumps had a mixed effect on the undrained shear strength of the mixtures. For samples with 0.2 units FFT, a higher undrained shear strength was observed for the fine shale lumps of all facies except Kcc. A noticeable increase in undrained shear strength was also observed in the fine Kca, 0.4 FFT sample. Of the remaining samples, no significant increase in the undrained shear strength was observed for the fine shale lumps versus the coarse shale lumps. In general, the results indicated that smaller shale lumps result in a noticeable increase in the undrained shear strength for those samples with less FFT (0.2 units). The smaller shale lumps had no significant effect (increase) in the undrained shear strength for most of the samples containing 0.4 and 0.6 units FFT. FIG. 16 shows the relationship between shale lump size and the corresponding undrained shear strength.

Of the samples containing fine shale lumps, all of the 0.2 FFT mixtures and Kca and Kcc of the 0.4 FFT mixtures exhibited undrained shear strengths of at least 5 kPa. For mixtures with coarse shale lumps, all of the 0.2 FFT mixtures, the 0.4 FFT mixtures of Kca and Kcw, and the 0.6 FFT mixture of Kca exhibited undrained shear strengths of at least 5 kPa.

When correlated to the surface area, the results do not provide a clear correlation to strength. This discrepancy could be due to the effects of other factors such as mixture moisture content, which may dominate the overall behavior of the material.

Plots of the undrained shear strength variation over time are included in FIGS. 6-10. In a majority of mixtures, the results indicated that no significant increase in the undrained shear strength was observed throughout the time interval tested. A slight increase in undrained shear strength was observed in both the fine and coarse shale lumps of the 0.2 FFT mixtures for Kca and Kcw. However, the undrained shear strength increase observed in these cases was not significant and it is possible that the observed increase is simply associated with the noise in the data. Although no significant undrained shear strength increase was observed in a majority of the mixtures, it is likely that a majority of the shear strength increase occurred within the initial 24 hours following mixing.

The results of the undrained shear strength variation with compaction are included in FIGS. 11-14. Compaction was most successful on the Kca mixtures, with all three mix ratios and both shale lump sizes successfully compacted. Compaction was successfully performed on the remaining shale facies on both the coarse and fine shale lumps of the 0.2 and 0.4 FFT ratios. The higher level of compaction was accomplished on the 0.2 FFT ratio (fine and coarse) for all four shale facies and on the 0.4 FFT ratio of the fine Kca. In general, compaction was most effective on mixtures with low FFT content, small shale lumps, and higher plasticity shale.

The undrained shear strength was successfully increased through compaction of the 0.2 and 0.4 FFT ratios of Kca (both coarse and fine). Strength improvement was also observed for the coarse and fine shale lumps of the 0.2 FFT ratio for the remaining shale facies. Additional strength improvement was observed with the higher level of compaction on the 0.2 (coarse and fine) and 0.4 (fine) mixtures of Kca. No additional strength improvement was observed at the higher compaction level for the remaining shale facies.

Standard Proctor tests were performed on two samples of the Kca fine 0.2 and Kcw coarse 0.4 mixtures to determine the dry density moisture content relationship, and the maximum dry density and optimum moisture content. The Kca fine 0.2 mixture had a moisture content of 29%, an optimum moisture content of 26%, and a maximum dry density of 1,493 kg/m$^3$ (93 pcf). The Kcw coarse 0.4 mixture had a moisture content of 35%, an optimum moisture content of 17%, and a maximum dry density of 1,690 kg/m$^3$ (106 pcf). The Kca fine 0.2 mixture had much higher undrained shear strength (33 kPa) than did the Kcw coarse 0.4 mixture (5 kPa).

Figure 10:
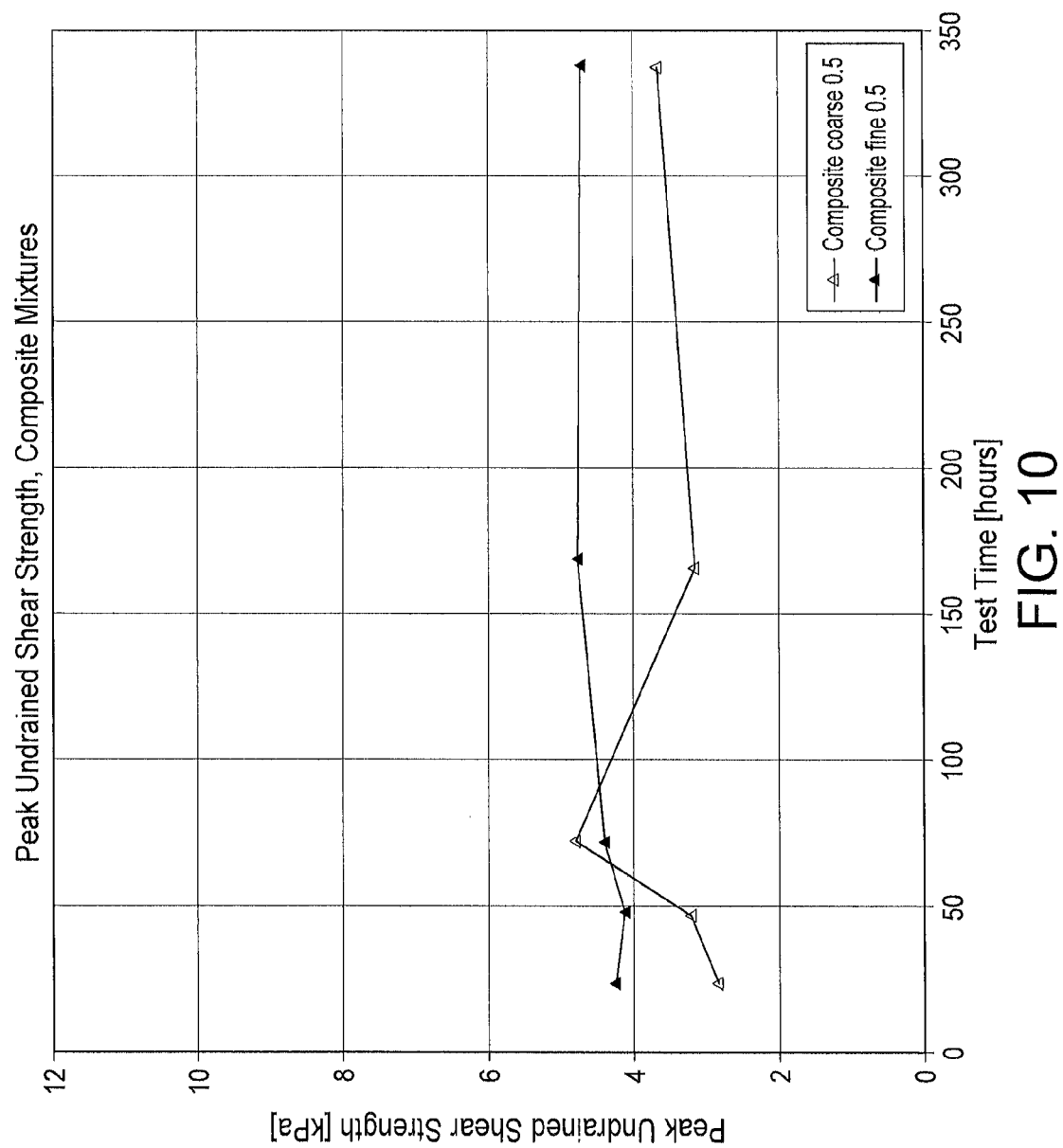
FIG. 10 is a graph showing the peak undrained shear strength over time for fine and coarse composite mixtures.
Figure 11:
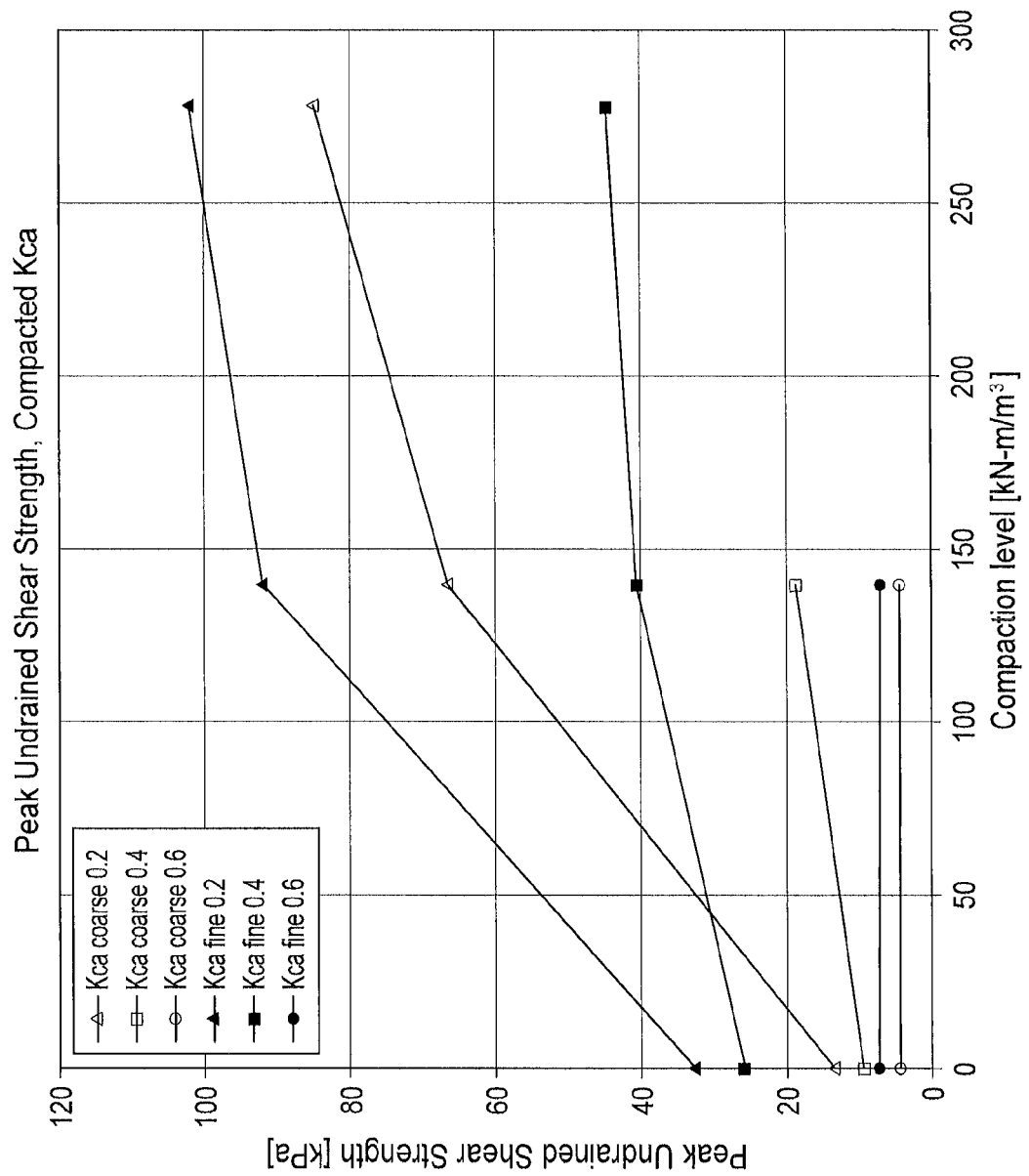
FIG. 11 is a graph showing the peak undrained shear strength over time for compacted fine and coarse samples of the Kca facies.
Figure 12:
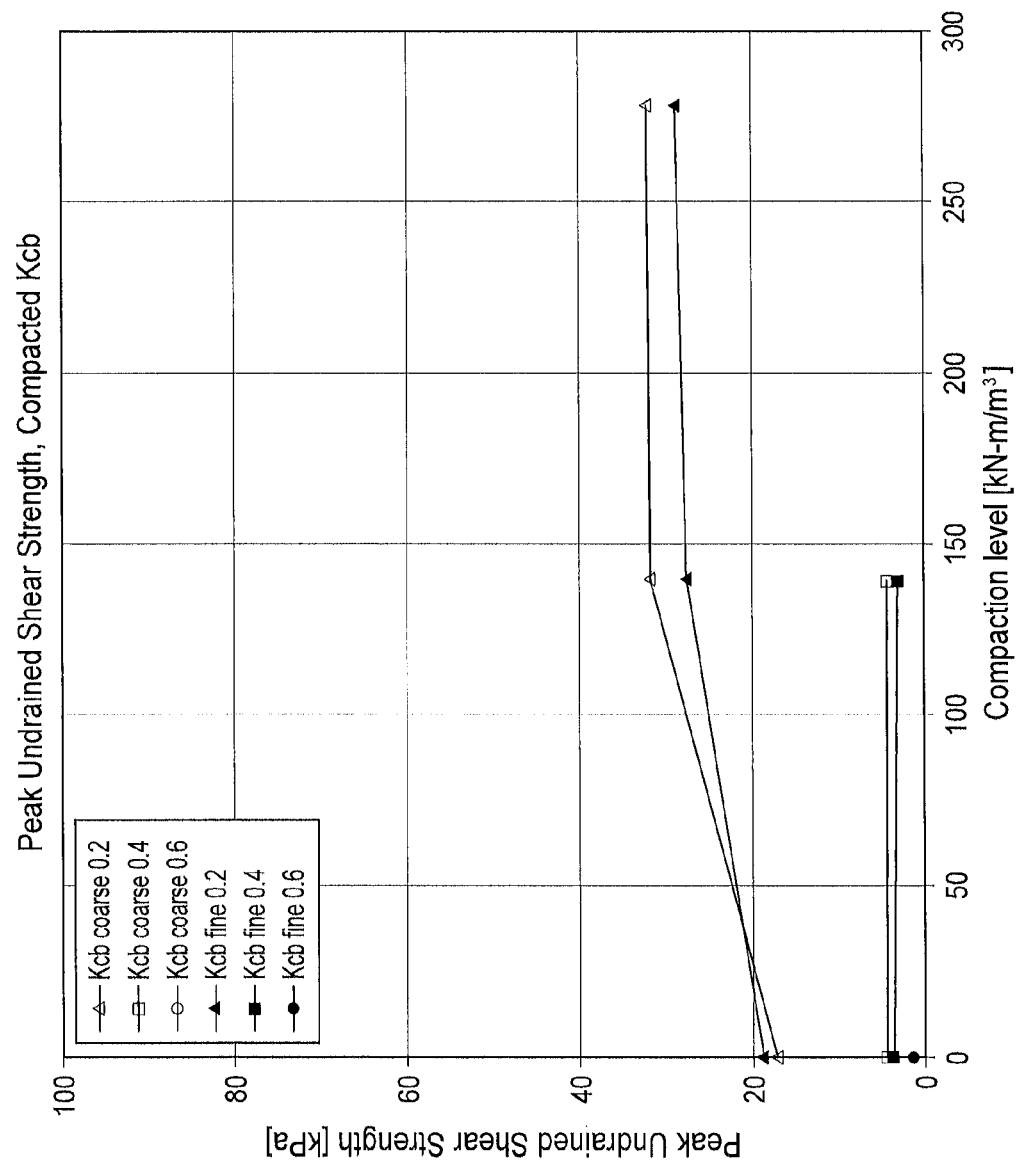
FIG. 12 is a graph showing the peak undrained shear strength over time for compacted fine and coarse samples of the Kcb facies.
Figure 13:
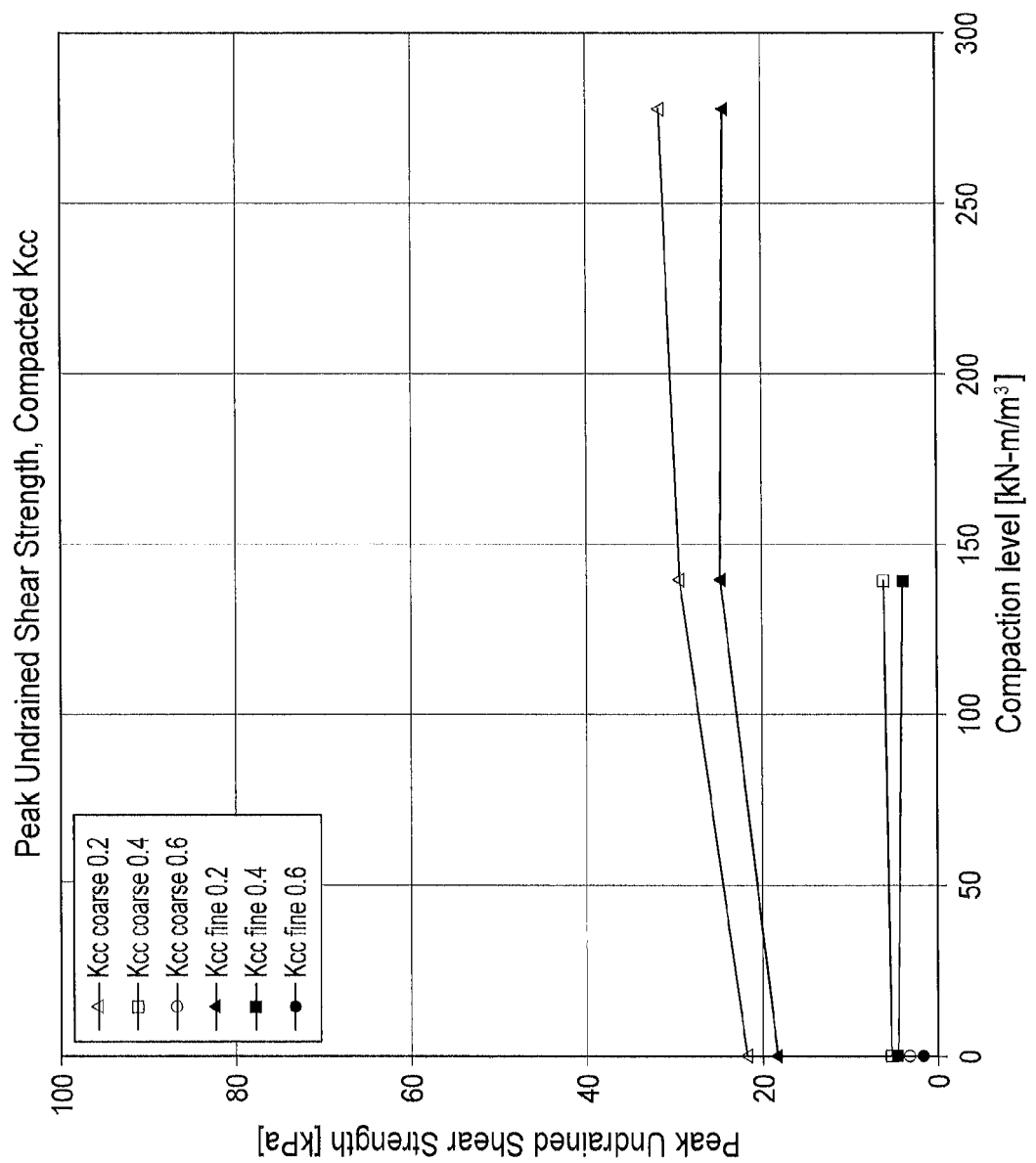
FIG. 13 is a graph showing the peak undrained shear strength over time for compacted fine and coarse samples of the Kcc facies.
Figure 14:
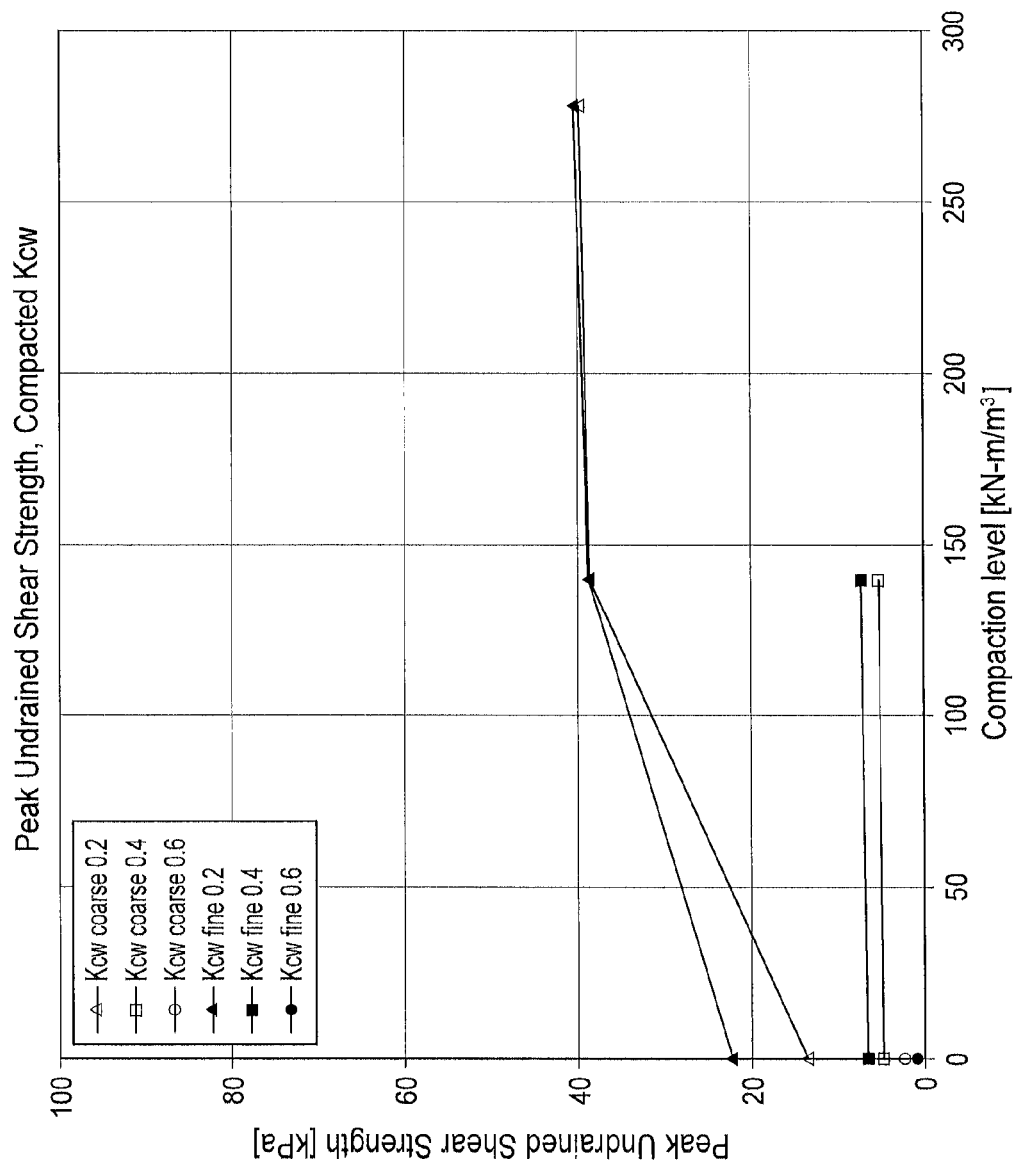
FIG. 14 is a graph showing the peak undrained shear strength over time for compacted fine and coarse samples of the Kcw facies.

Composite mixtures were created from Kca (20%), Kcb (30%), and Kcc (50%) to understand the effects of both coarse and fine shale lumps at a ratio of 0.5 units FFT. The results indicate a long-term undrained shear strength of approximately 4.7 kPa (fine) and 3.7 kPa (coarse) (FIGS. 10, 15 and 16). These results were, in general, less than those of Kca and Kcc and very similar to those of Kcb at a OA FFT ratio. Similarly, the results of the composite sample were less than Kca, but greater than Kcb and Kcc at a 0.6 FFT ratio. While the results on the composite samples did not yield an undrained shear strength of at least 5 kPa, they did indicate promise that this requirement may be met with slightly lower FFT ratios with the same shale composition.

ii. Moisture Transfer Measurement

The Liquid Limit is an index property of a soil that indicates the ability of the soil/clay particles to hold water. Since the FFT has a moisture content (132%) higher than the Liquid Limit (72%), it has excess water which leads to a soft consistency and little strength. Conversely, the shale has a high Liquid Limit (60-130%) and lower moisture content (15-28%). As a result, the shale exists with a deficit of water and has the ability to absorb water. The moisture transfer from FFT to shale was evaluated with respect to shale facies, lump size, FFT mix ratio, and time.

FFT moisture content tests were conducted at intervals of 0, 1, 2, 3, 4, 8, 12, and 24 hours during the initial 24-hour period following mixing. FFT moisture contents were collected daily or twice daily. FFT/shale mixture moisture contents were collected on daily or twice daily. The moisture content was measured utilizing three different methods. Methods 1 and 2 performed moisture content tests directly on the vane shear test mixtures. Method 3 performed moisture content tests on the FFT, but on separate samples developed specifically to elucidate the moisture transfer between the FFT and shale. Method 4 assessed the absorption capacity of the shale lumps/facies. Table 8 summarizes the moisture transfer testing.

TABLE 8

| Facies | Mix ratio | Coarse | Fine |
|---|---|---|---|
| Kca | 0.2 | X$^2$ | X$^2$ |
|  | 0.4 | X$^{1,2}$ | X$^2$ |
|  | 0.6 | X$^{1,2}$ | X$^2$ |
| Kcb | 0.2 | X$^2$ | X$^2$ |
|  | 0.4 | X$^2$ | X$^2$ |
|  | 0.6 | X$^2$ | X$^2$ |
| Kcc | 0.2 | X$^2$ | X$^2$ |
|  | 0.4 | X$^2$ | X$^2$ |
|  | 0.6 | X$^2$ | X$^2$ |
| Kcw | 0.2 | X$^{1,2}$ | X$^2$ |
|  | 0.4 | X$^{1,2}$ | X$^2$ |
|  | 0.6 | X$^{1,2}$ | X$^2$ |
| Composite | 0.5 |  |  |
| Layered | 0.6 | X$^3$ | X$^3$ |
| Absorption | N/A | X$^4$ | X$^4$ |

[1]Method 1,
[2]Method 2,
[3]Method 3,
[4]Method 4

Method 1—FFT Moisture Content

Figure 19:
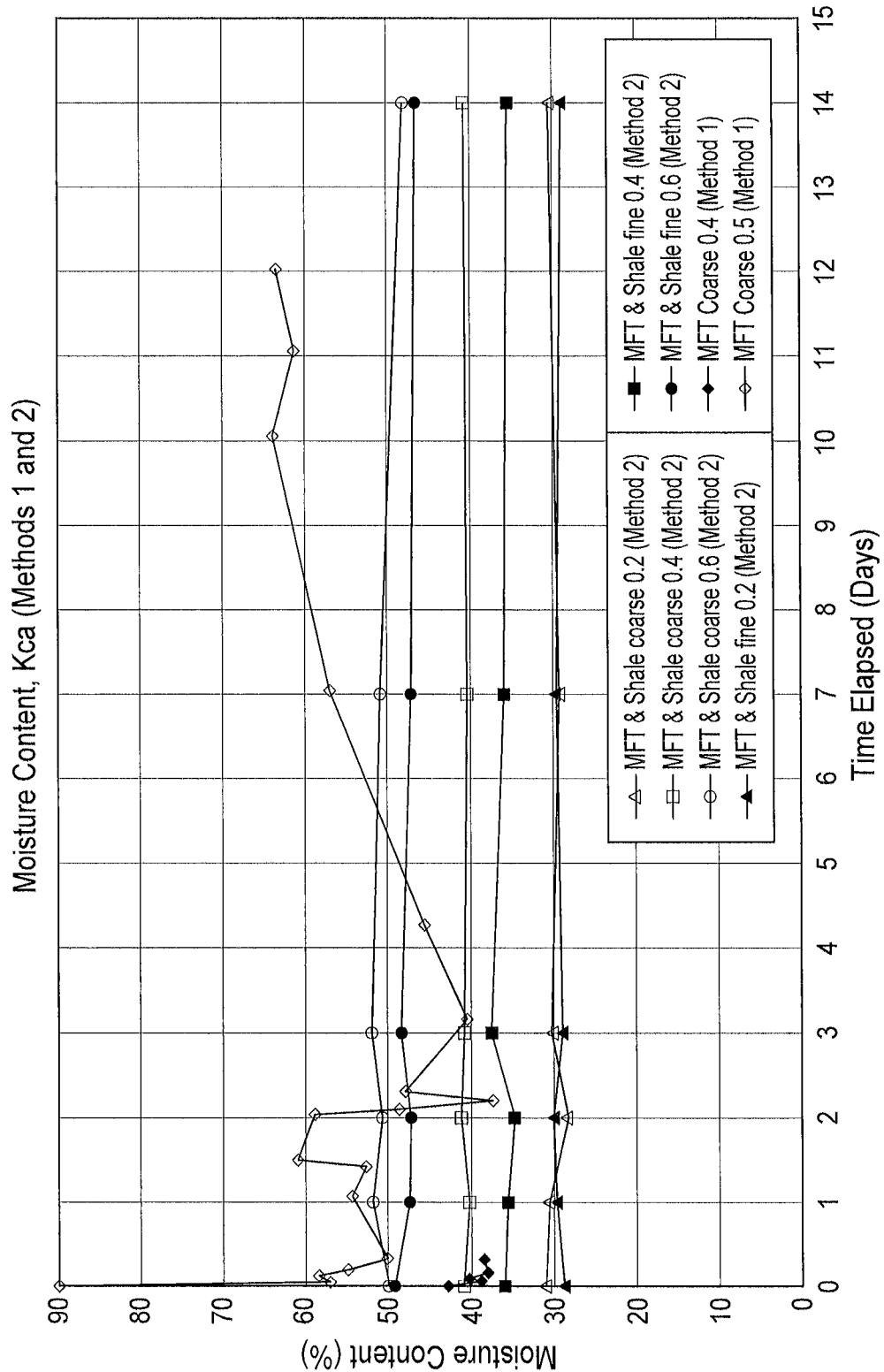
FIG. 19 is a graph showing the moisture content over time for facies Kca as determined by Methods 1 and 2.
Figure 22:
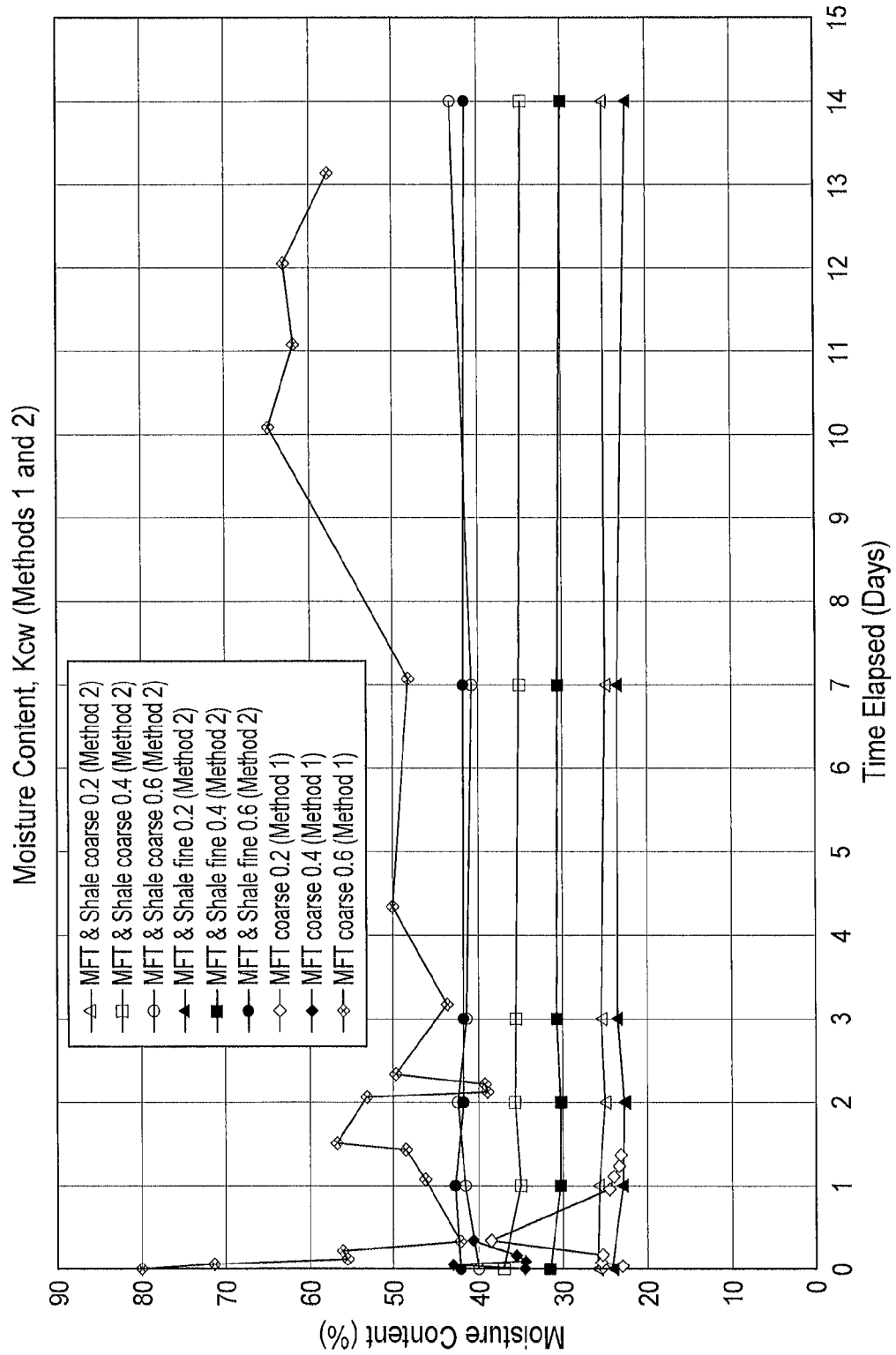
FIG. 22 is a graph showing the moisture content over time for facies Kcw as determined by Methods 1 and 2.

Samples of the FFT/shale mixture were collected manually from the primary vane shear test molds. Attempts were made to remove the shale lumps from the mixture sample until only FFT appeared to remain. The remaining FFT sample was then tested for moisture content. FFT moisture content tests were initially planned to be performed on all samples. However due to difficulties associated with collecting a pure FFT sample, the moisture content tests on mixtures with fine shale lumps were eliminated as the shale lumps could not be removed from the mixture for the test samples. Results of FFT moisture content testing for Kca and Kcw (coarse) are shown in FIGS. 19 and 22. The results were generally erratic and the remaining FFT moisture content tests (Method 1) were removed. However, data in FIGS. 19 and 22 show that the moisture content of the mixture does not change significantly over time indicating that the temperature and humidity controlled room and procedure were successful in maintaining the moisture of the mix.

Method 2—FFT/Shale Moisture Content

Figure 20:
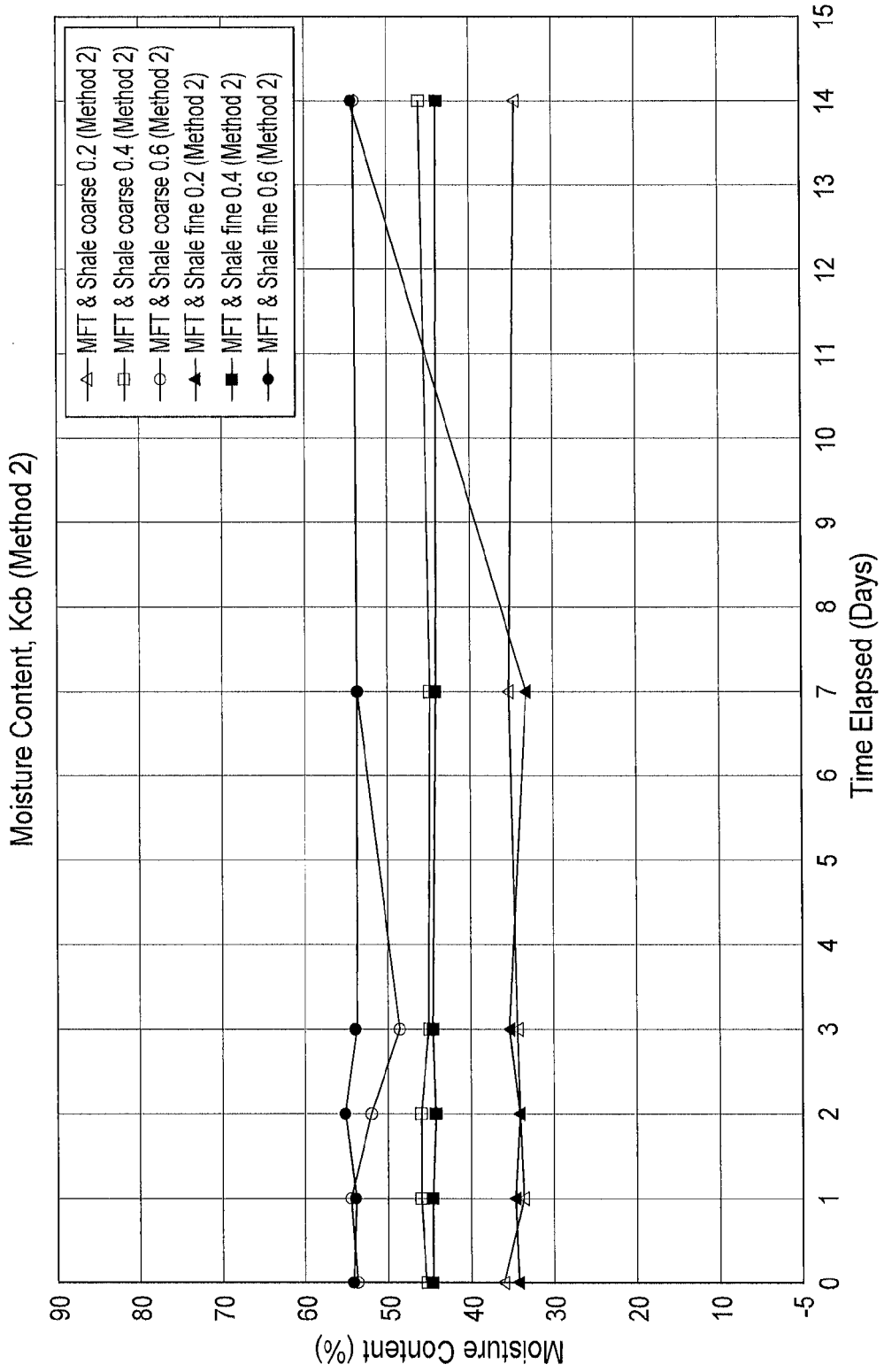
FIG. 20 is a graph showing the moisture content over time for facies Kcb as determined by Method 2.
Figure 21:
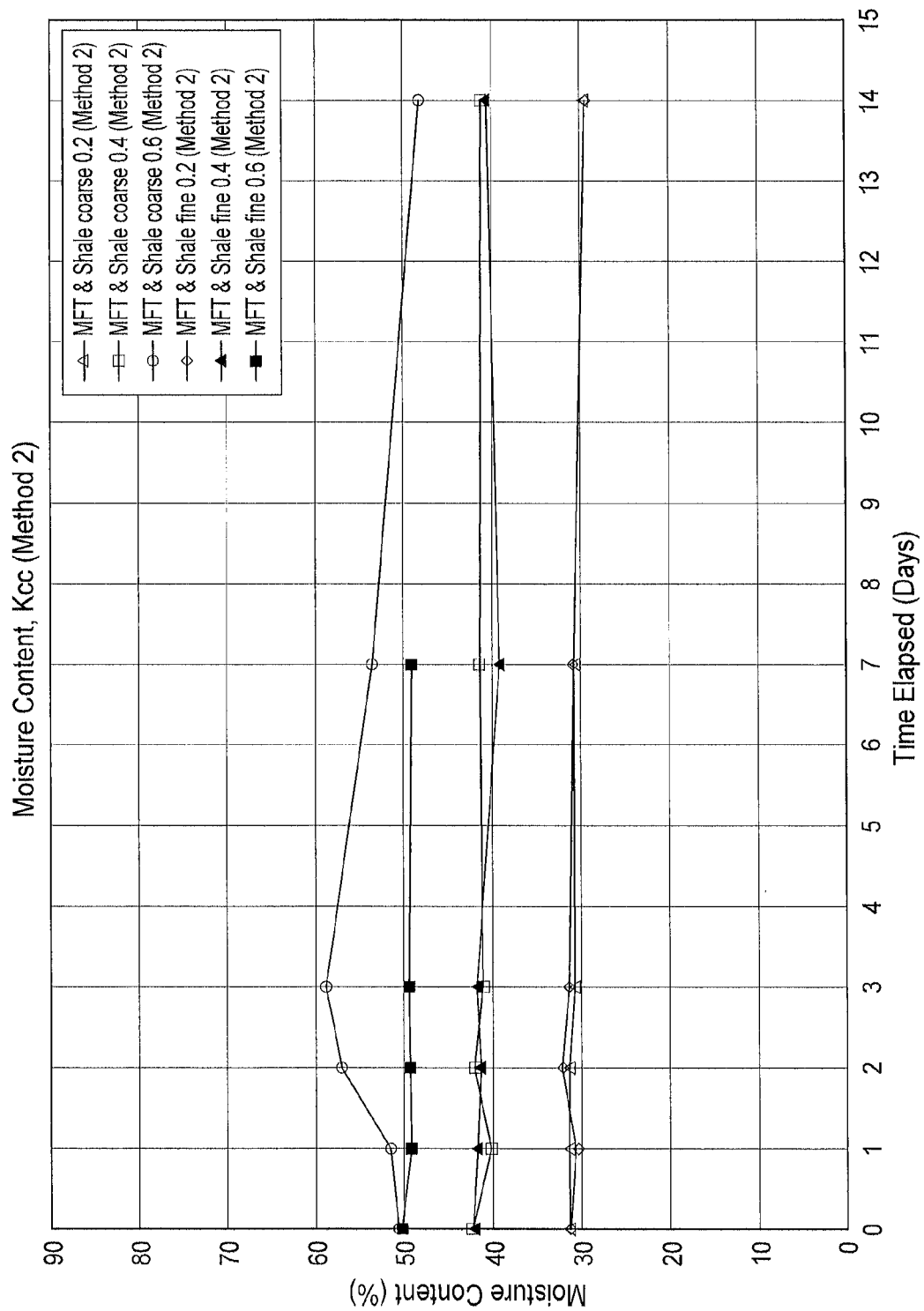
FIG. 21 is a graph showing the moisture content over time for facies Kcc as determined by Method 2.

Samples of the FFT/shale mixture were collected from the primary vane shear test molds, The FFT/shale samples were then tested for moisture content. The results indicate that the moisture content was constant for each mixture (FIGS. 19-20). This provided an indication that laboratory conditions (i.e. temperature control, plastic seal) helped to minimize drying of the samples.

Method 3—FFT Moisture Content and Solids Content

Due to the difficulties associated with collecting reliable samples for Method 1, an alternate procedure was developed for determining the level of moisture within the FFT portion of the mixture. The testing was limited to coarse shale lumps of Kca and Kcw at a 0.6 FFT ratio. The samples were prepared using the same acrylic test molds as were used in the vane shear testing program. However, the FFT was placed in approximately 12 lifts of equal thickness with layers of shale placed in between the FFT layers. The shale was deposited in a manner to create a generally homogenous mixture of shale and FFT. Samples of the FFT were collected for moisture content testing using a 5 mm diameter rod.

Method 4—Shale Moisture Absorption Testing

Absorption testing was performed to assess the rate of moisture absorption and the overall moisture capacity. Samples of the shale facies (fine and coarse lump sizes) were placed on filter paper bearing on plastic mesh containers. Each shale sample weighed approximately 45-50 g and was spread evenly across the containers such that the shale was no more than 2-4 mm thick and 100 mm in diameter. Samples were placed in a humidity chamber maintaining a constant level of 100% humidity. One control sample consisting of filter paper and a plastic mesh container was also placed in the humidity chamber. Samples were measured for total mass to determine the associated sample moisture content at 0, 0.5, 1, 1.5, 2, 3, 4, 8, 12, 24, 36, 48, 60, and 72 or 144 hours. Moisture content of the shale lumps was determined. Moisture content results from the shale absorption testing utilizing Method 4 are included in FIGS. 27-28.

iii. Solids Content

Solids content is defined as:

$$S_c = 1/1 + w \quad (4)$$

where $S_c$=solids content and w=geotechnical moisture content. Results of the FFT moisture content and solids content tests utilizing Method 3 are shown in FIGS. 23-26.

In summary, Method 1 was found to be unreliable (FIGS. 19 and 22). Multiple measurements via Method 2 were unnecessary. Since no moisture was allowed to evaporate from the samples, the moisture content of the mixture did not vary (FIGS. 19-22). Some of the results from Method 2 indicated a potential correlation between the moisture content of the mixture and the corresponding optimum moisture content. The Kca fine 0.2 mixture had a moisture content of 29% and an optimum moisture content of 26%, while the Kcw coarse 0.4 mixture had a moisture content of 35% and an optimum moisture content of 17%. The Kca fine 0.2 mixture had a much higher undrained shear strength (33 kPa) than did the Kcw coarse 0.4 mixture (5 kPa). These findings indicate a potential correlation between the moisture content of the mixture and corresponding optimum moisture content. Mixtures having moisture content close to the optimum moisture content resulted in higher undrained shear strength than those with moisture contents significantly above the optimum moisture content. Mixtures placed near the optimum moisture content could achieve higher levels of compaction in a mine application.

Figure 23:
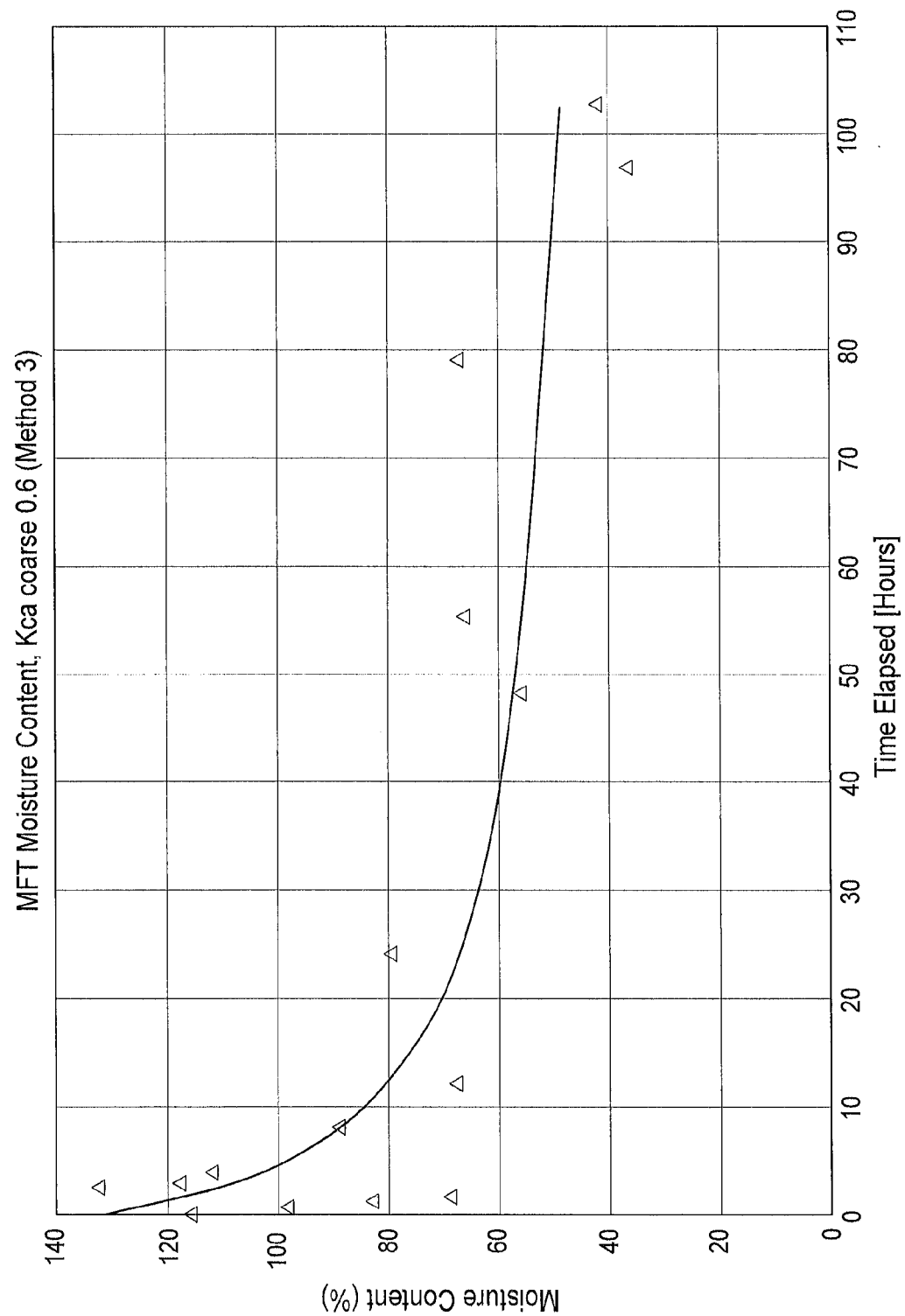
FIG. 23 is a graph showing the FFT moisture content over time for Kca coarse 0.6 as determined by Method 3.
Figure 24:
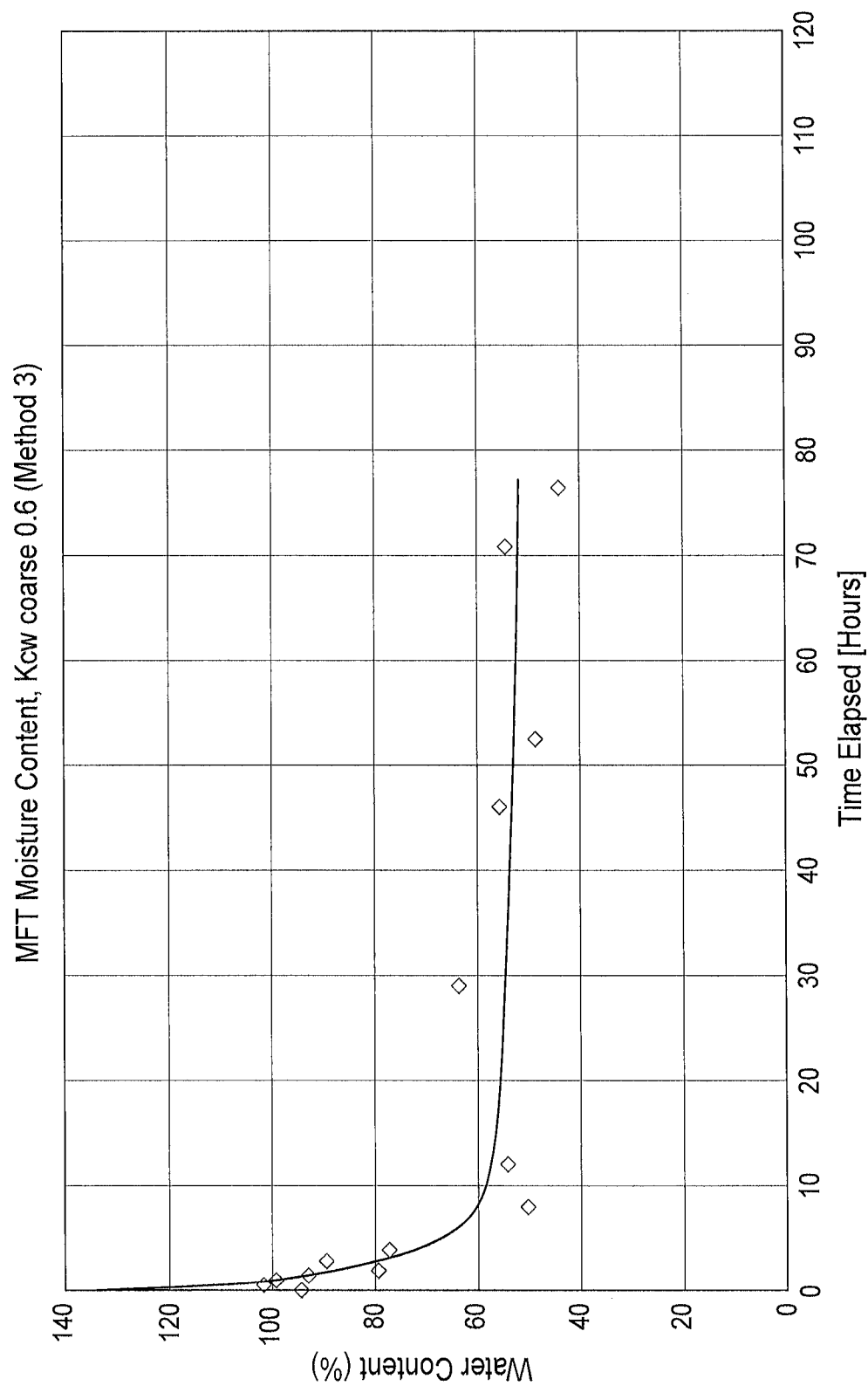
FIG. 24 is a graph showing the FFT moisture content over time for Kcw coarse 0.6 as determined by Method 3.
Figure 25:
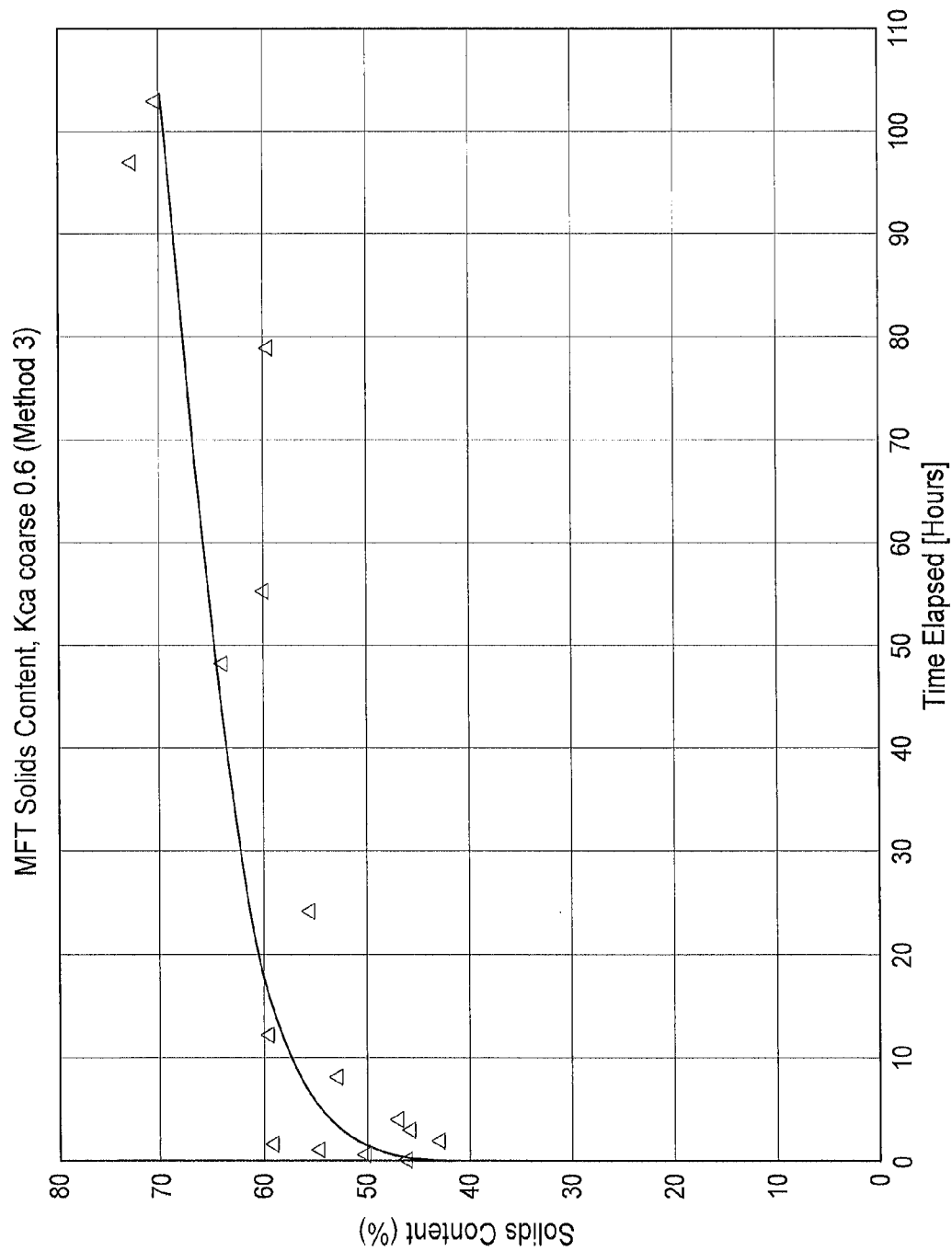
FIG. 25 is a graph showing the FFT solids content over time for Kca coarse 0.6 as determined by Method 3.
Figure 26:
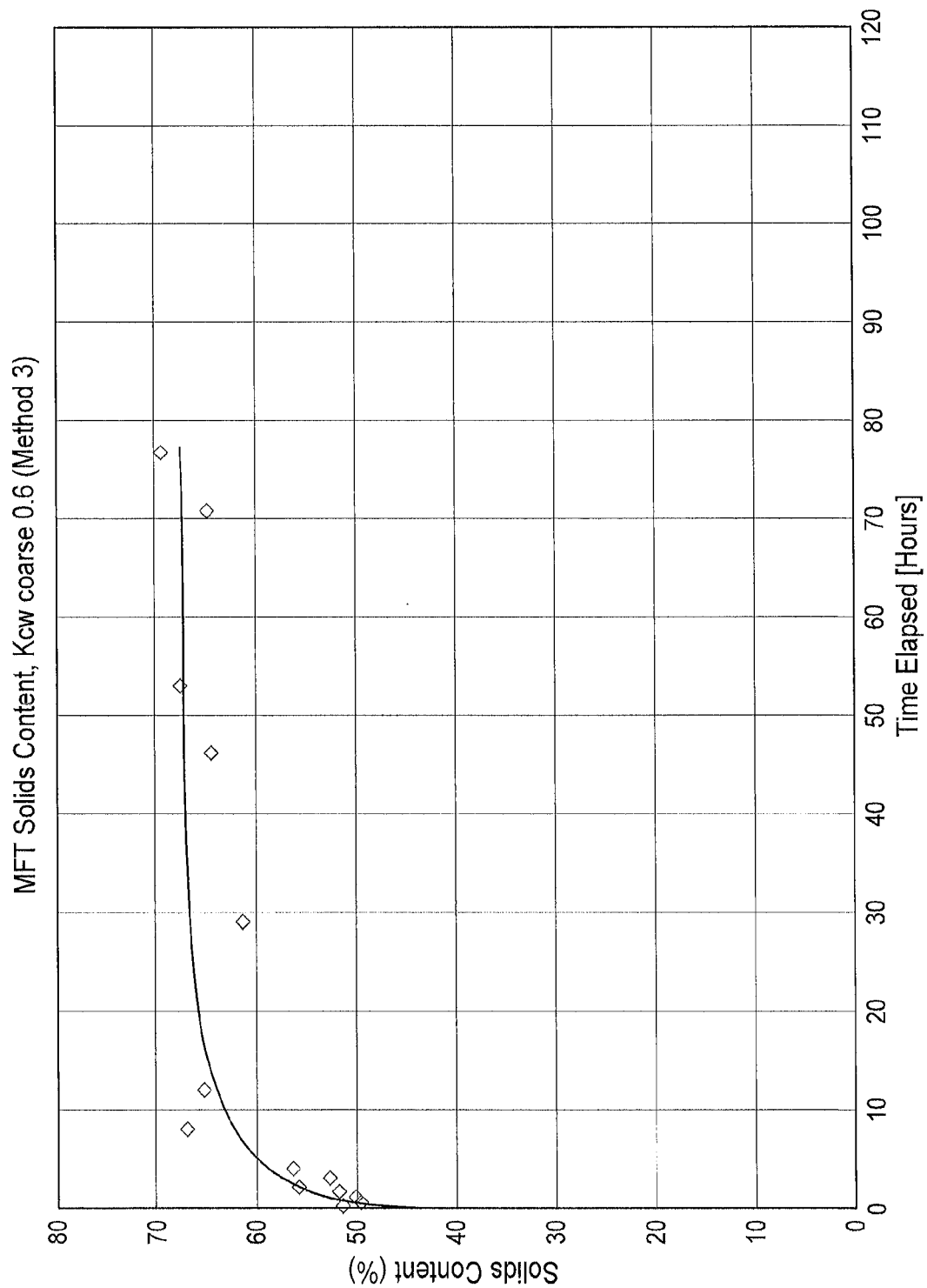
FIG. 26 is a graph showing the FFT solids content over time for Kcw coarse 0.6 as determined by Method 3.

In contrast, the results of Method 3 indicated a consistent reduction in the FFT moisture content. Method 3 specifically focused on the moisture transfer mechanism and the mixtures were not used for laboratory vane shear testing. Two samples were tested using Method 3, Kca and Kcw both coarse shale lumps at a 0.6 FFT ratio. The variation in FFT moisture content over time is shown in FIGS. 23-24, while FIGS. 25-26 show the associated variation in FFT solids content over time. The results showed a FFT moisture content reduction of approximately 80% for both Kca and Kcw. The corresponding FFT solids content increased roughly 25% to 67-70% for both Kca and Kcw. A majority of the moisture content reduction occurred in the initial 24-hour period following mixing, which generally agrees well with the suction results. No significant difference was observed between the two shale facies tested utilizing Method 3 which was only employed on mixtures with coarse shale particles and high FFT content. Similar success may not be achievable on mixtures with smaller shale particles with low FFT content.

Figure 27:
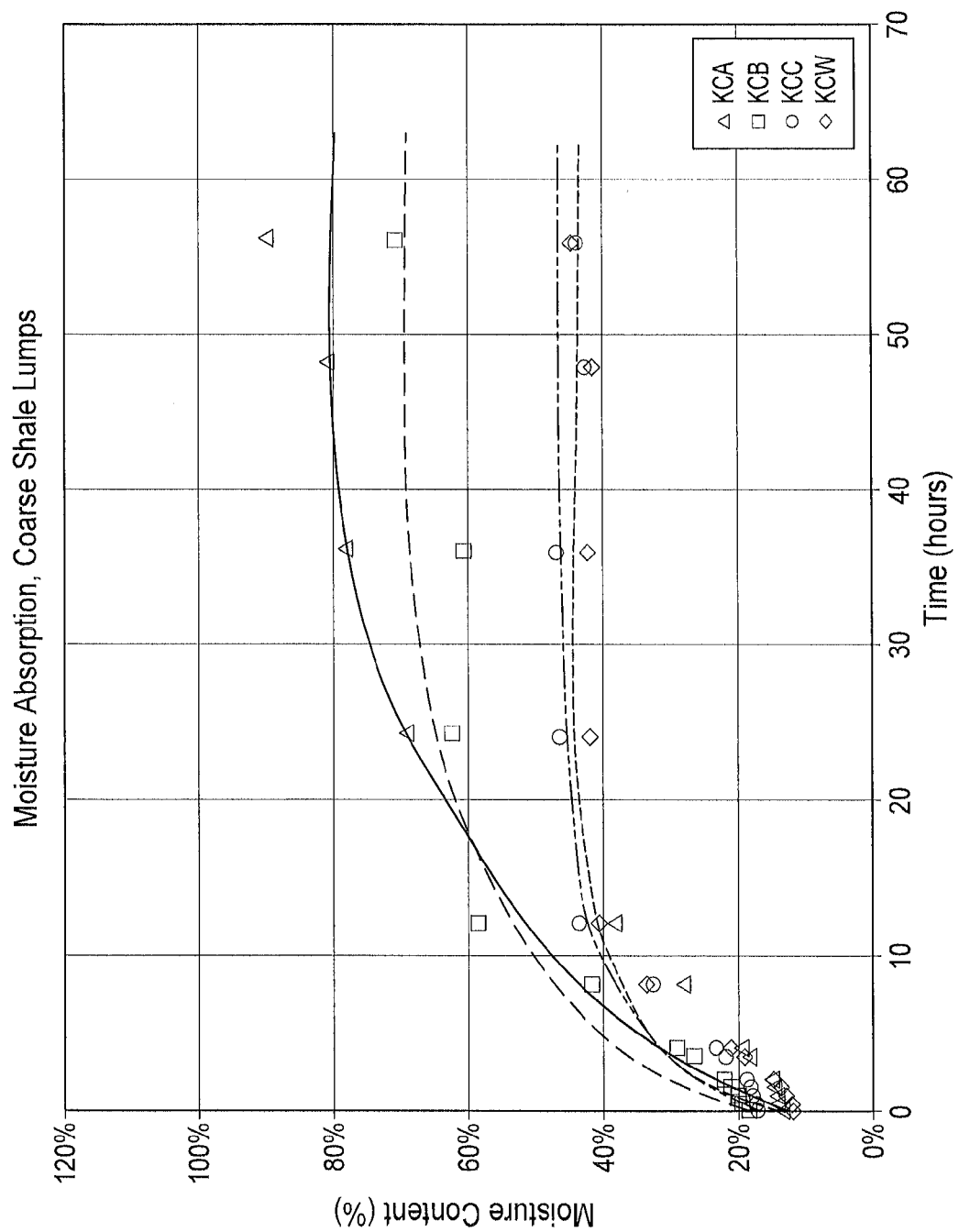
FIG. 27 is a graph showing the moisture absorption over time for facies having coarse shale lumps.
Figure 28:
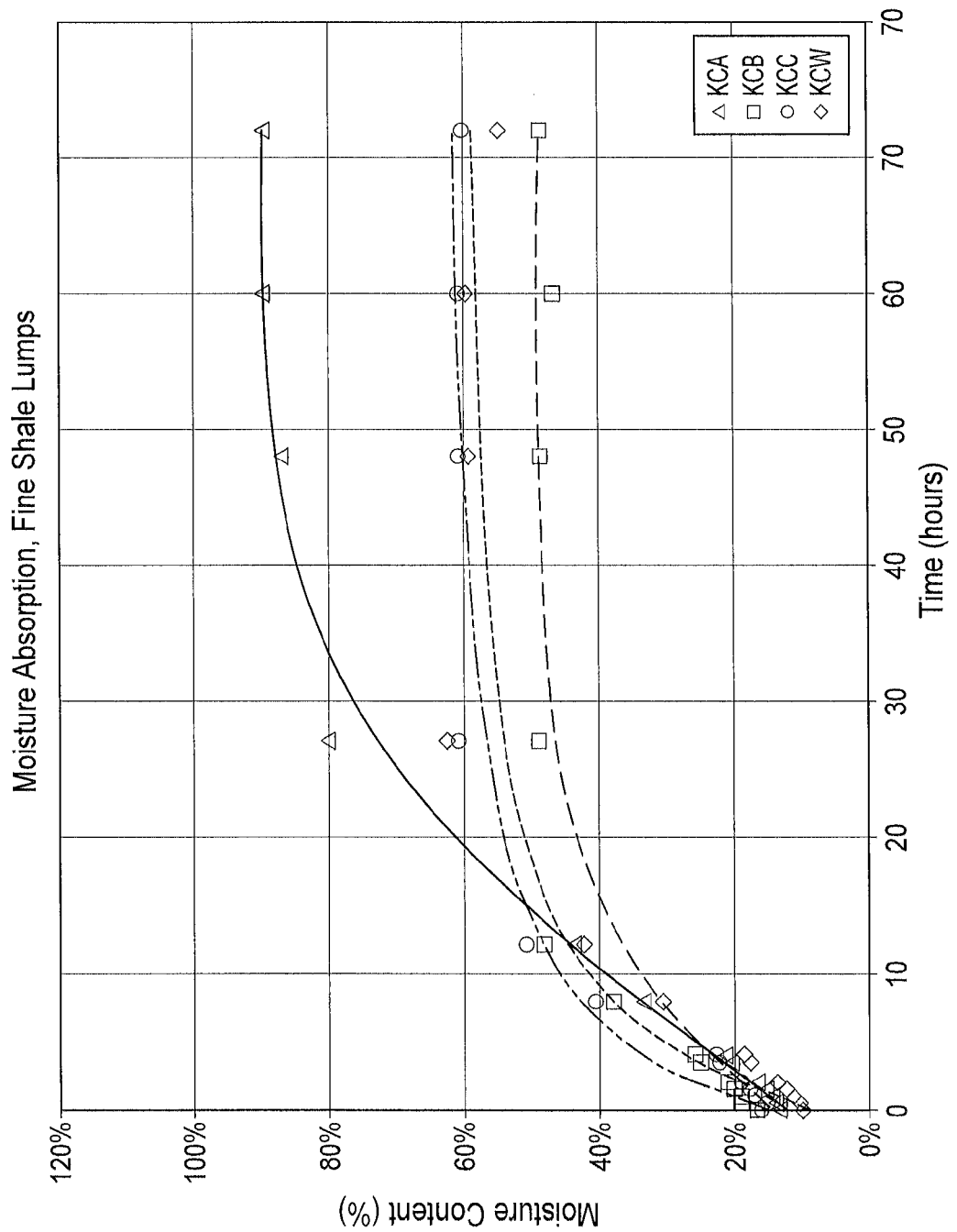
FIG. 28 is a graph showing the moisture absorption over time for facies having fine shale lumps.

To assess the moisture capacity of the shale particles, absorption testing was performed using Method 4. This method did not use FFT and instead focused on an evaluation of the shale moisture content while in a humidity chamber. Tests were performed on all four shale facies, evaluating both coarse and fine lump sizes. The results of the shale absorption tests are shown in FIGS. 27-28. The results indicated that Kca consistently had the highest capacity to absorb moisture, exhibiting approximately 80% moisture with coarse lumps and 90% moisture with fine lumps. For the coarse shale lumps, Kcb exhibited the next highest moisture capacity at 60% moisture, but had the lowest capacity at 50% moisture in the fine lumps. The Kcc and Kcw were similar in each test, with approximately 45% moisture with coarse lumps (the lowest of the results on coarse shale lumps) and 60% moisture with fine lumps. In general, the results indicated a 10-15% increase in moisture capacity with a reduction in lump size, although the results of Kcb indicated the reverse of this trend. While these results could not be directly correlated to the FFT moisture content results of Method 3, they did indicate the shale absorbs a majority of the moisture within the initial 24-hour period, which agrees well with the results of Method 3 and the suction measurements. The results also showed that Kcb, Kcc, and Kcw exhibited the highest rate of increase in moisture content during the initial 24 hours of the test, while Kca increased in moisture at a slightly slower rate but reached a higher capacity at the end of the test.

iv. Suction

Suction testing was performed to assess the moisture tension that developed within the FFT/shale mixture under non-saturated conditions using tensiometers inserted into the sample mixtures. Tensiometer measurements were collected on a continuous basis during the initial 24-hour period following mixing for each sample. After the 24-hour period, spot tensiometer measurements were collected on some of the samples on a daily or twice daily basis. Moisture tension measurements were performed to correlate the moisture transfer within the FFT-shale mixture. Tension measurements were completed on a separate sample of each mixture prepared during the primary mixing process. Table 9 summarizes the suction testing.

TABLE 9

| Facies | Mix ratio | Coarse Lump Size | | | | | Fine Lump Size | | | | |
|---|---|---|---|---|---|---|---|---|---|---|---|
| | | 1 | 2 | 3 | 7 | 14 | 1 | 2 | 3 | 7 | 14 |
| Kca | 0.2 | x | x | x | x | x | x | x | x | x | x |
| | 0.4 | x | x | x | x | x | x | x | x | x | x |
| | 0.6 | x | x | x | x | x | x | x | x | x | x |
| Kcb | 0.2 | x | x | x | x | x | x | x | x | x | x |
| | 0.4 | x | x | x | x | x | x | x | x | x | x |
| | 0.6 | x | x | x | x | x | x | x | x | x | x |
| Kcc | 0.2 | x | x | x | x | x | x | x | x | x | x |
| | 0.4 | x | x | x | x | x | x | x | x | x | x |
| | 0.6 | x | x | x | x | x | x | x | x | x | x |
| Kcw | 0.2 | x | x | x | x | x | x | x | x | x | x |
| | 0.4 | x | x | x | x | x | x | x | x | x | x |
| | 0.6 | x | x | x | x | x | x | x | x | x | x |
| Composite | 0.5 | x | x | x | x | x | x | x | x | x | x |
| Layered | 0.6 | | x | | | | | x | | | |
| Absorption | N/A | | N/A | | | | | N/A | | | |

The moisture tension measurements were performed using Decagon™ T5x tensiometers connected to a Campbell Scientific CR1000datalogger. The T5x tensiometers used in this study had a tip diameter of 5 mm and shaft length of 100 mm.

Figure 17:
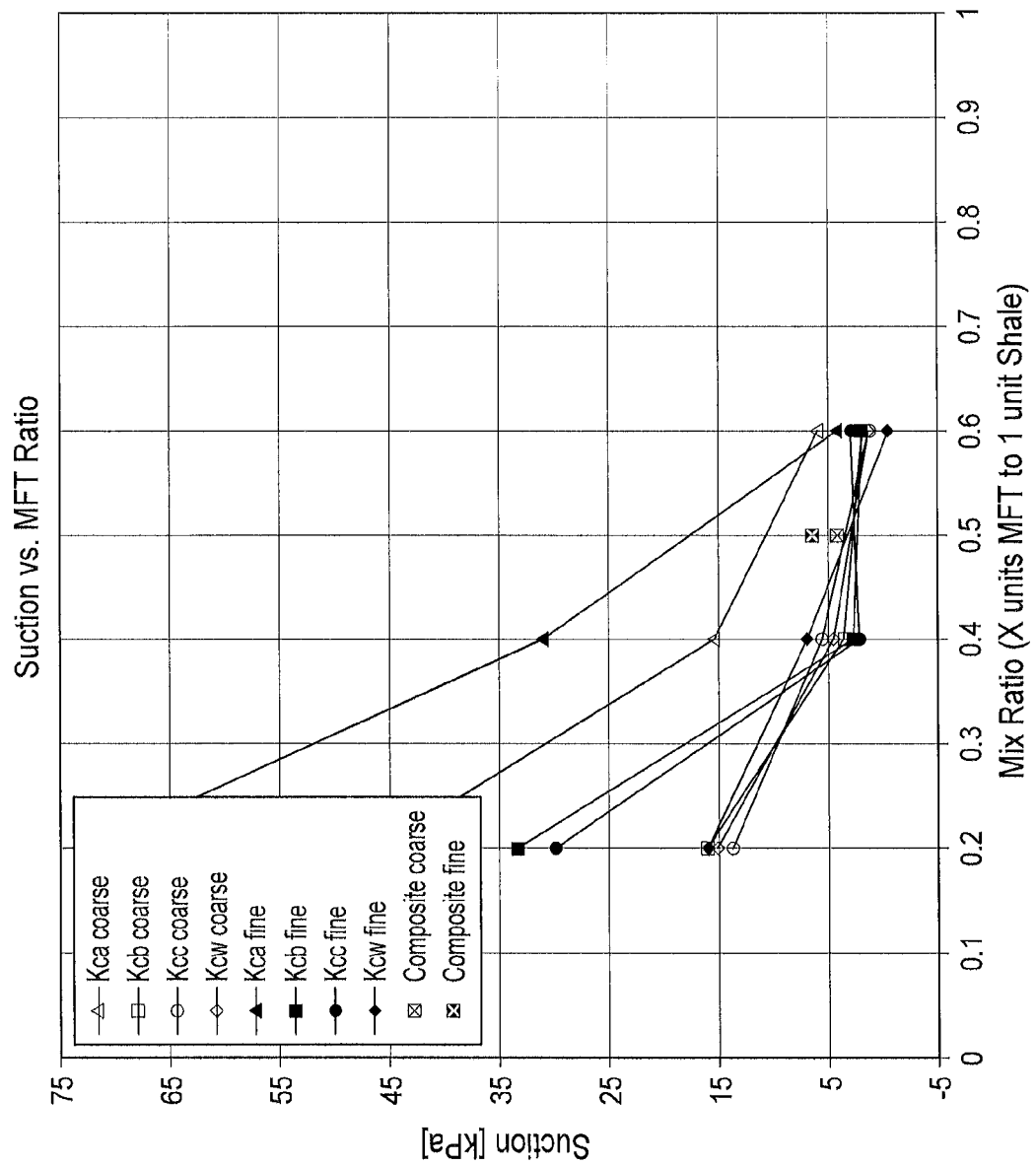
FIG. 17 is a graph showing the effect of the mixture ratio on suction.
Figure 18:
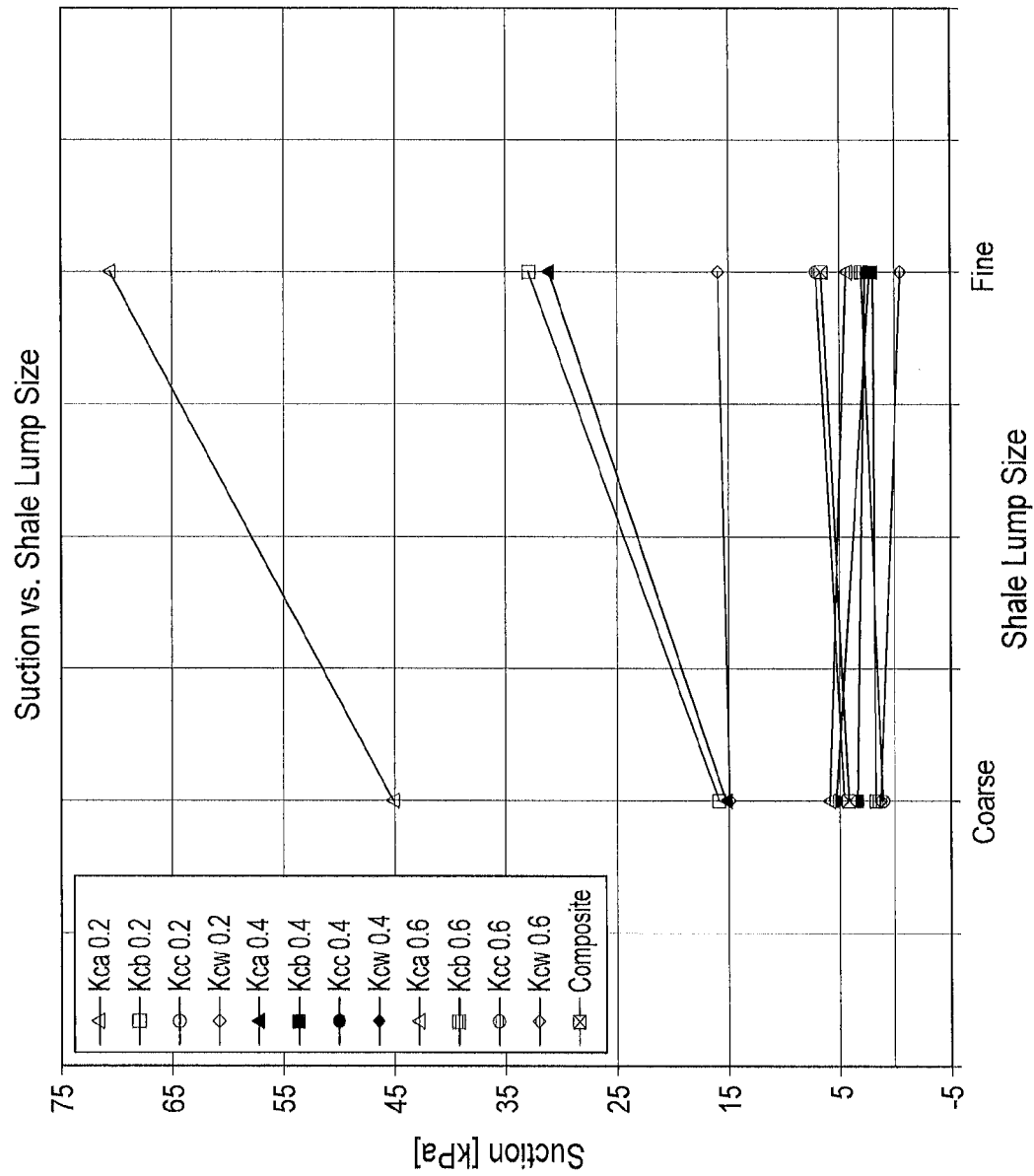
FIG. 18 is a graph showing the effect of shale lump size on suction.

Device control was performed through a computer running Campbell Scientific software connected to the datalogger. Tensiometer measurements were collected every 5 minutes for the initial 24-hour period following mixing. Suction measurements were performed on all primary mixtures, the composite sample mixtures, and on the layered samples developed as part of moisture transfer Method 4. FIGS. 17-18 show the long term or maximum suction observed in each primary and composite mixture during the initial 24-hour period of continuous data collection.

In all cases, the highest levels of suction were observed in the samples with the lowest FFT content. Higher suction was also generally observed in the finer shale lumps. Kca consistently yielded the highest levels of suction, while Kcw tended to create the least amount of suction. Suction at the 0.2 FFT ratio ranged from 14 kPa (Kcc, coarse) to 71 kPa (Kca, fine). This high level of suction is primarily due to a high surface area relative to the level of FFT within the samples. The 0.2 FFT ratio mixtures yielded unsaturated soil conditions and the finer shale lumps created a higher ratio of surface area to volume. The results of the suction testing on the 0.4 FFT ratio mixtures indicated significantly reduced suction, with results ranging from 2 kPa (Kcc, coarse) to 31 kPa (Kca, fine). The lowest suction results were observed in the 0.6 FFT ratio mixtures, with results ranging from −0.6 kPa (Kcw, fine—likely data noise) to 6 kPa (Kca, coarse). The highest suction levels were observed in Kca and these results are likely attributed to the significant moisture capacity that exists primarily within Kca.

In general, the suction increased significantly within the initial 12 to 24 hour period following mixing. Suction was generally constant or exhibited a constant rate of increase 24 hours after mixing. These results indicate that a majority of the moisture transfer occurs within the initial 12 to 24 hours after sample mixing. This phenomenon agreed well with the observation that no substantial increase in undrained shear strength was observed after 24 hours following mixing.

EXAMPLE 5

Testing of Larger Shale Lumps/FFT Mixtures

Testing was conducted using clay-shale lumps (samples of Kca, Kcb, Kcc and Kcw facies) of large size (+19.00 mm and −19.00+4.75 mm) and small size (−4.75+2.00 mm and −2.00 mm). Samples of FFT, recycle water, and saline water were also collected. Index tests were performed to assess various properties of the shale facies and FFT, namely moisture content, solids content, organic content, bulk density, specific gravity, particle size distribution by hydrometer, surface area with nitrogen as adsorbate, Methylene Blue Index, and X-Ray Diffraction. Results are summarized in Tables 10 and 11. The FFT samples had approximately 43 wt % of solids content and 98% fines (less than 44 μm). The solids content of the FFT sample was slightly higher than the solids content of samples used in the previous tests.

TABLE 10

| Material | Moisture content (%) | Liquid Limit | Plastic Limit | Plasticity Index | True Density (kg/m³) | Bulk Density (kg/m³) 4.75-2 mm | Bulk Density (kg/m³) −2 mm | Fines (%) −44 μm | Clay (%) −2 μm |
|---|---|---|---|---|---|---|---|---|---|
| Kca | 18.5 | 124.1 | 23.4 | 100.7 | 2,800 | 937 | 1,031 | 97.0 | 60.0 |
| Kcb | 28.5 | 115.5 | 23.2 | 92.3 | 2,770 | 906 | 918 | 85.0 | 54.0 |
| Kcc | 20.1 | 70.1 | 18.9 | 51.2 | 2,757 | 1,048 | 1,020 | 99.0 | 40.0 |
| Kcw | 14.8 | 55.1 | 16.0 | 39.1 | 2,750 | 1,096 | 1,117 | 62.0 | 34.0 |
| FFT | 132.5 | 71.8 | 22.5 | 49.4 | N/A | N/A | N/A | 98.0 | 46.0 |

TABLE 11

| Clay-shale Soil Unit | Sample Number | Oil (%) | Water (%) | Solids (%) | Liquid Limit | Plastic Limit | Plasticity Index | Gravel (%) +4.75 mm | Sand (%) 4.75-2 mm | Silt (%) 2-0.002 mm | Clay (%) −2 μm | Natural Moisture Content (%) |
|---|---|---|---|---|---|---|---|---|---|---|---|---|
| Kca | 1 | 1.20 | 12.52 | 86.28 | 101.1 | 23.1 | 78.0 | 0.3 | 5.2 | 39.9 | 54.6 | 19.6 |
|  | 2 |  |  |  | 95.1 | 22.0 | 73.1 | 0.0 | 1.6 | 40.9 | 57.5 | 22.9 |
|  | 3 |  |  |  | 101.5 | 24.6 | 76.9 | 0.0 | 0.8 | 47.4 | 51.8 | 24.6 |
| Kcb | 1 |  |  |  | 107.4 | 23.4 | 83.9 | 0.0 | 8.4 | 38.3 | 53.3 | 22.3 |
|  | 2 |  |  |  | 67.6 | 21.3 | 46.2 | 0.0 | 5.7 | 42.1 | 52.2 | 22.8 |
|  | 3 |  |  |  | 117.4 | 29.7 | 87.7 | 0.0 | 0.4 | 30.6 | 69.0 | 29.7 |
| Kcc | 1 |  |  |  | 70.5 | 21.7 | 49.3 | 0.3 | 2.2 | 57.0 | 40.5 | 18.5 |
|  | 2 |  |  |  | 74.8 | 21.3 | 54.0 | 0.0 | 0.8 | 49.2 | 50.0 | 21.7 |
|  | 3 |  |  |  | 92.0 | 25.4 | 66.6 | 0.0 | 0.2 | 46.8 | 53.0 | 23.6 |
| Kcw | 1 | 2.44 | 8.83 | 88.71 | 42.4 | 17.4 | 25 | 0.4 | 35.3 | 35.6 | 28.8 | 16.5 |
|  | 2 | 5.70 | 13.24 | 81.06 | 52.3 | 18.3 | 34 | 0.1 | 31.9 | 36.6 | 31.5 | 17.4 |
|  | 3 |  |  |  |  |  |  |  |  |  |  |  |

The recycle water sample was analyzed for pH and electrical resistivity. The water chemistry of the saline water was analyzed (Table 12).

TABLE 12

| | |
|---|---|
| pH | 7.4 |
| Conductivity | 5660 μS/cm |
| Total Dissolved Solids | 3792.2 ppm |
| Chloride | 1130 mg/L |
| Sulfate | 488 mg/L |
| Bicarbonate | 1179 mg/L |
| Carbonate | 966.4 mg/L |
| Calcium | 165 mg/L |
| Potassium | 18.8 mg/L |
| Sodium | 1033 mg/L |

Shale/FFT mixtures were prepared as described in Example 3 to include specific shale facies, shale lump size, and FFT:shale ratio (0.2:1.0, 0.4:1.0, and 0.6:1.0).

i. Moisture Transfer Measurement

Figure 29:
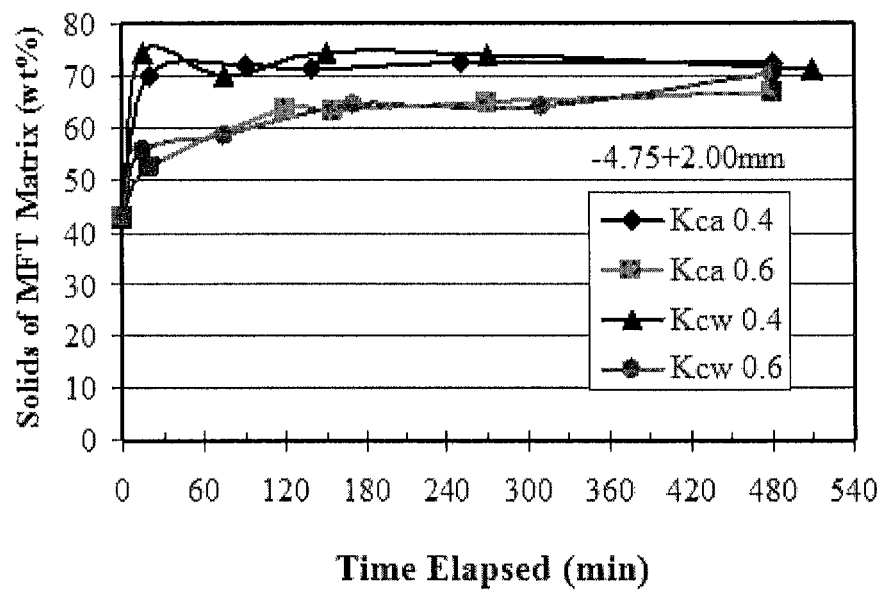
FIG. 29 is a graph showing the FFT solids content over time for facies Kca and Kcw at mixture ratios of 0.4 and 0.6.
Figure 30:
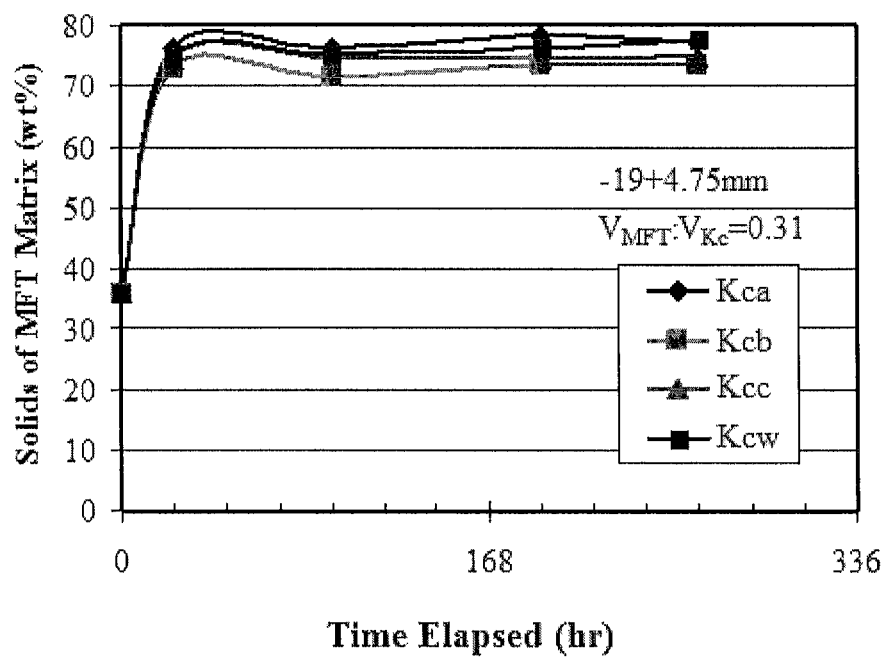
FIG. 30 is a graph showing the FFT solids content over time for facies Kca, Kcb, Kcc and Kcw.
Figure 31:
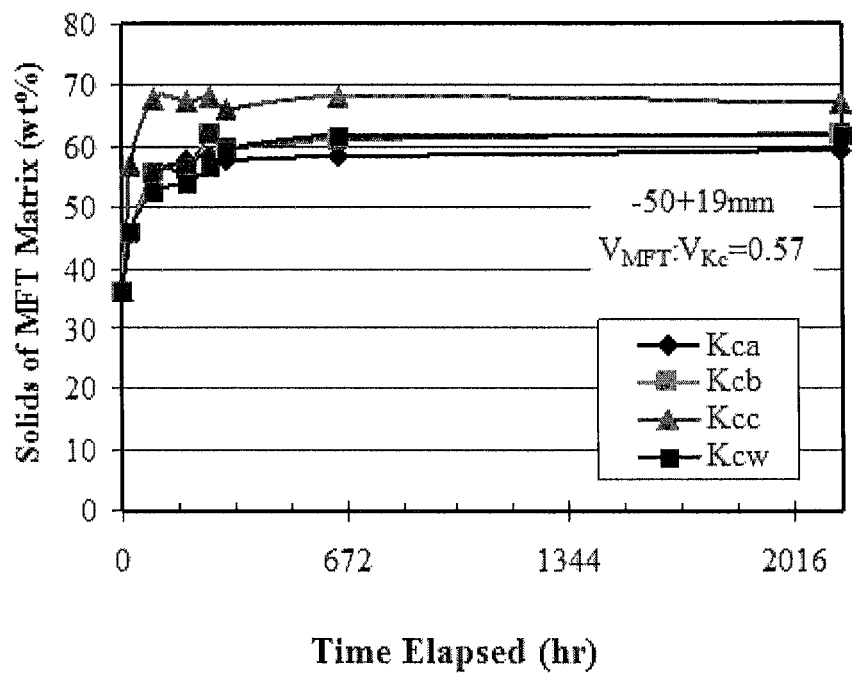
FIG. 31 is a graph showing the FFT solids content over time for facies Kca, Kcb, Kcc and Kcw.
Figure 32:
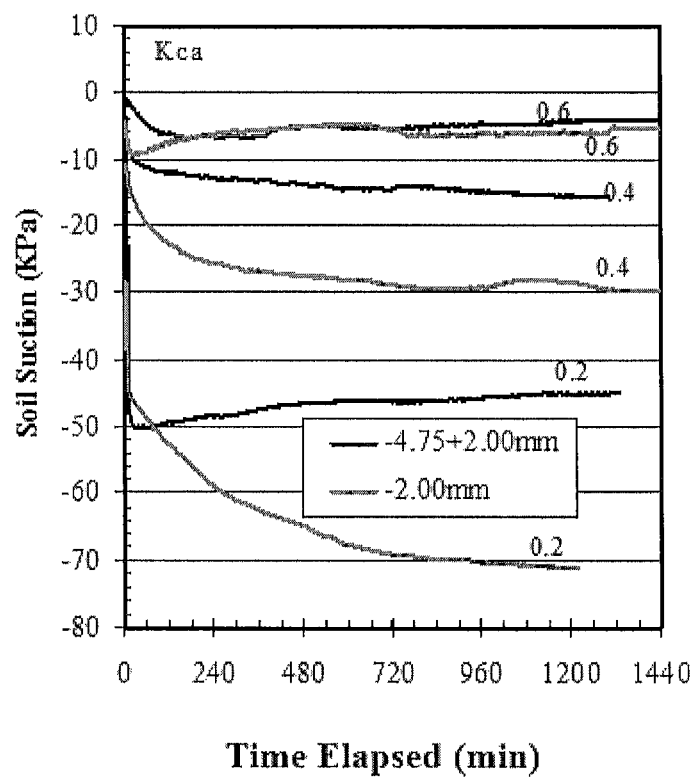
FIG. 32 is a graph showing the effect of the mixture ratio on suction over time for Kca-FFT mixtures.
Figure 33:
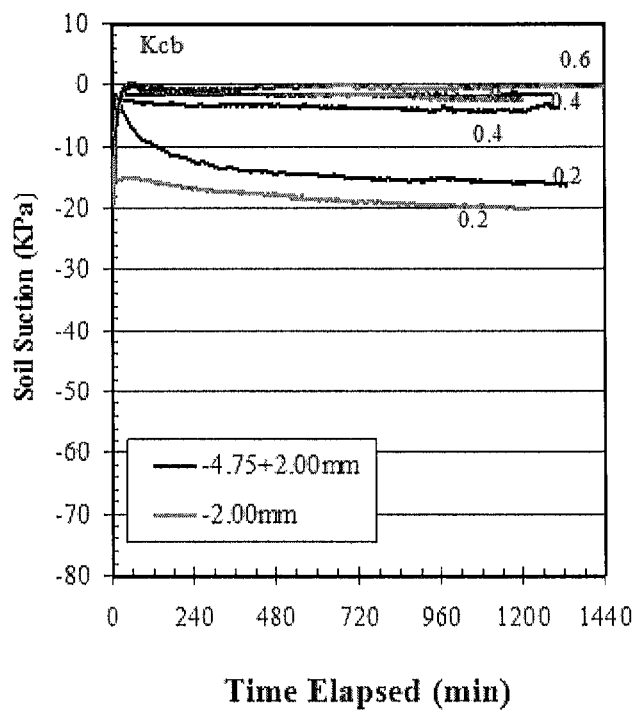
FIG. 33 is a graph showing the effect of the mixture ratio on suction over time for Kcb-FFT mixtures.
Figure 34:
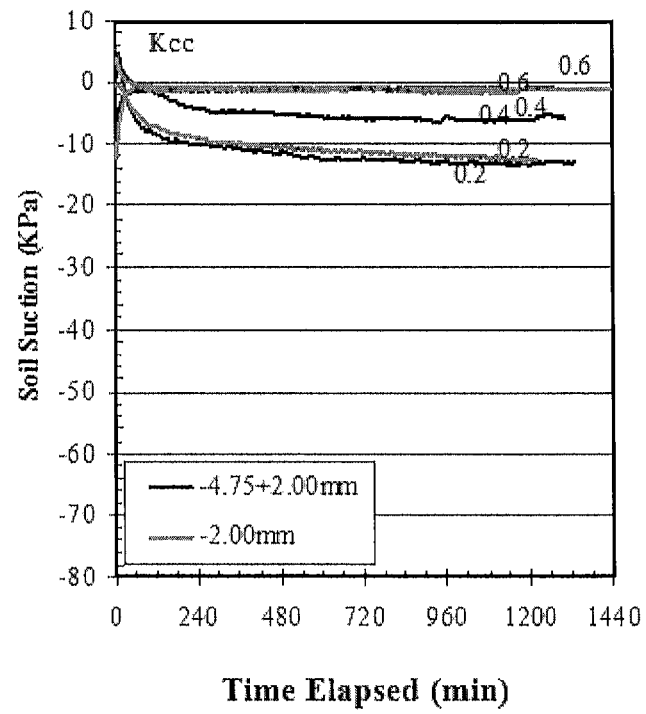
FIG. 34 is a graph showing the effect of the mixture ratio on suction over time for Kcc-FFT mixtures.
Figure 35:
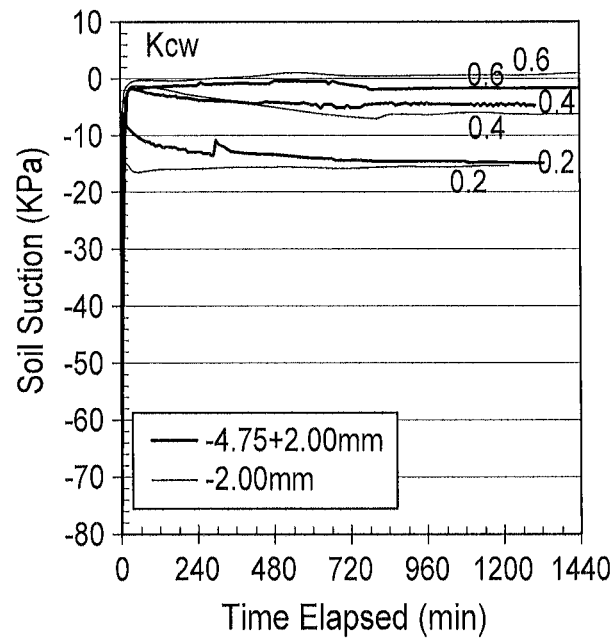
FIG. 35 is a graph showing the effect of the mixture ratio on suction over time for Kcw-FFT mixtures.
Figure 36:
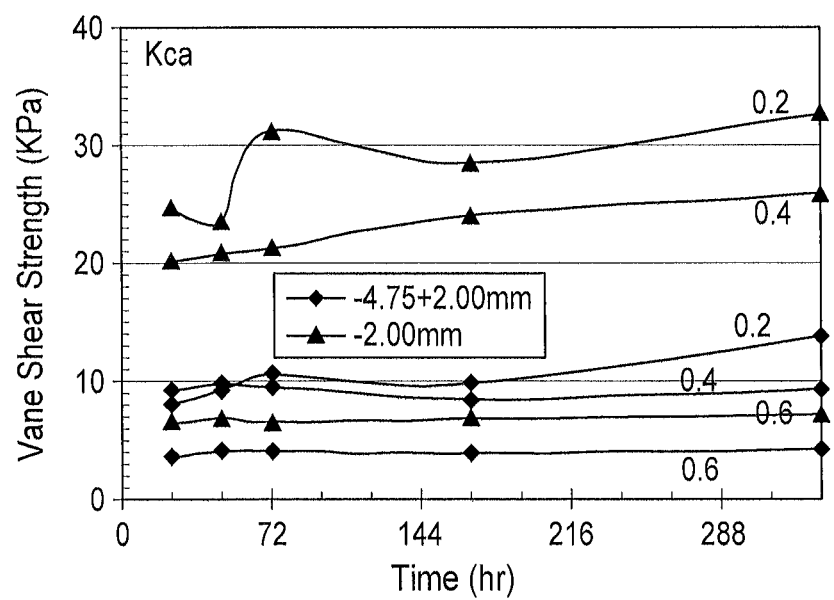
FIG. 36 is a graph showing the undrained vane shear strength over time for Kca-FFT mixtures.
Figure 37:
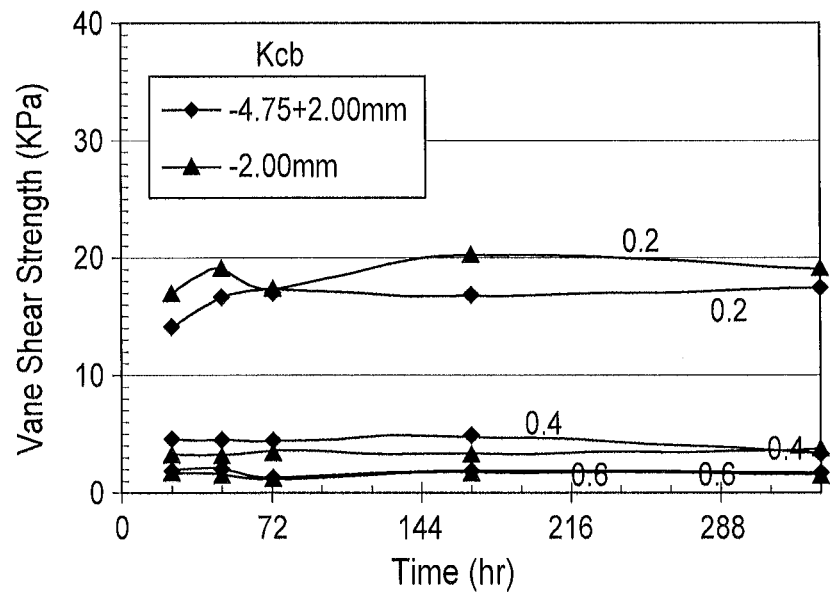
FIG. 37 is a graph showing the undrained vane shear strength over time for Kcb-FFT mixtures.
Figure 38:
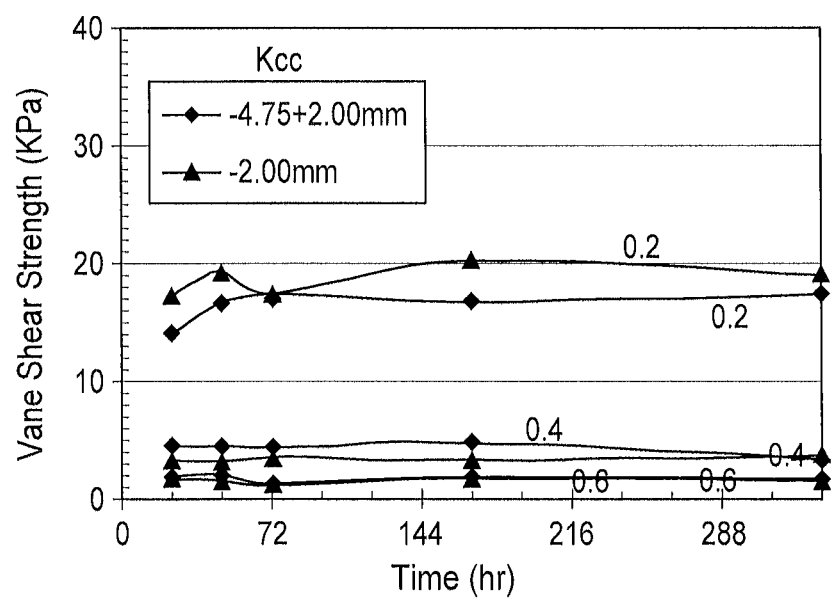
FIG. 38 is a graph showing the undrained vane shear strength over time for Kcc-FFT mixtures.
Figure 39:
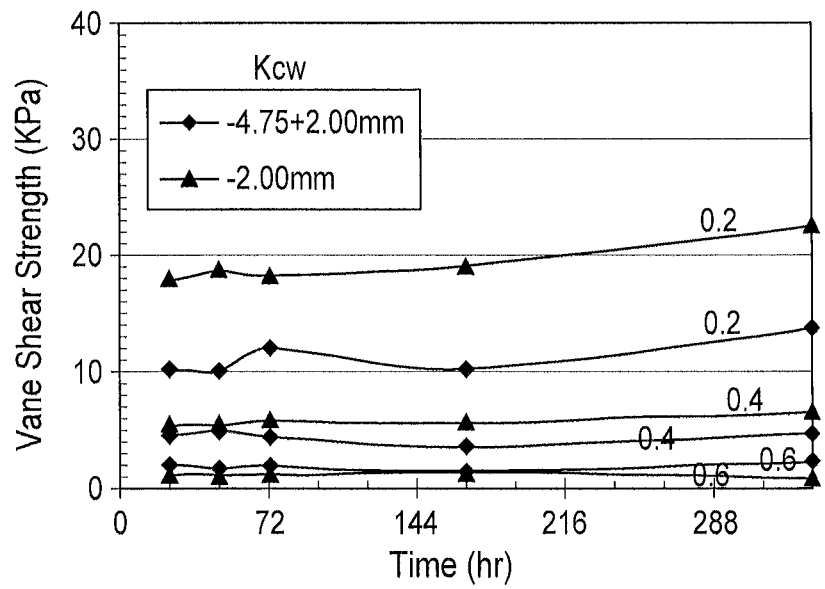
FIG. 39 is a graph showing the undrained vane shear strength over time for Kcw-FFT mixtures.
Figure 40:
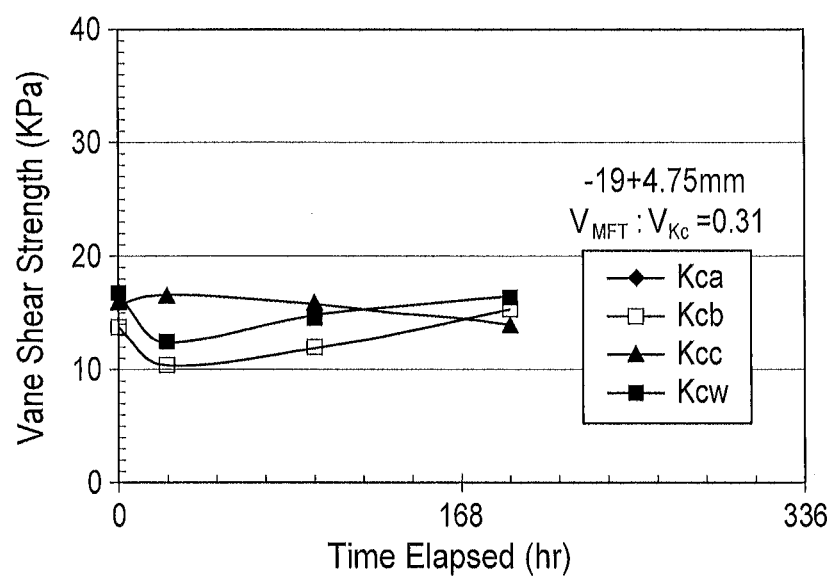
FIG. 40 is a graph showing the undrained vane shear strength over time for facies Kca, Kcb, Kcc and Kcw.
Figure 41:
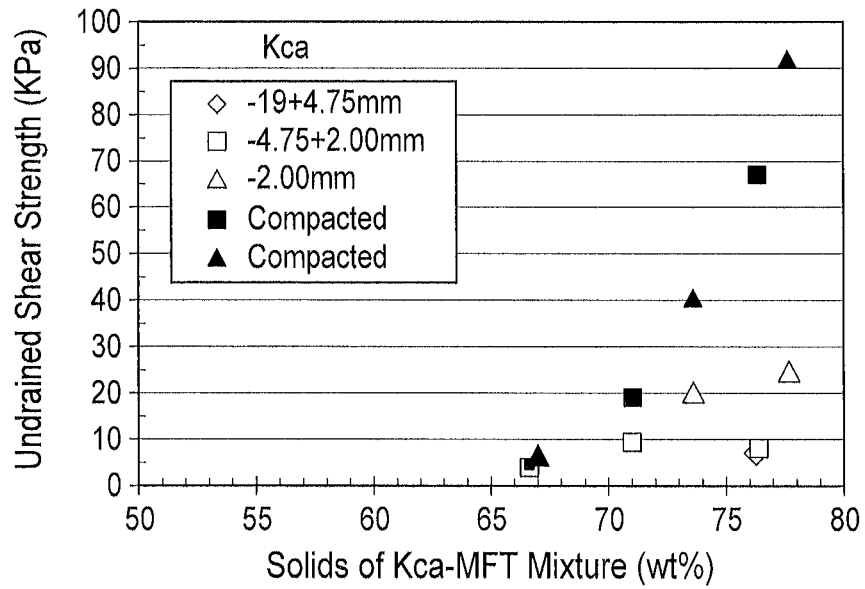
FIG. 41 is a graph showing the effect of compaction on shear strength of Kca-FFT mixtures.
Figure 42:
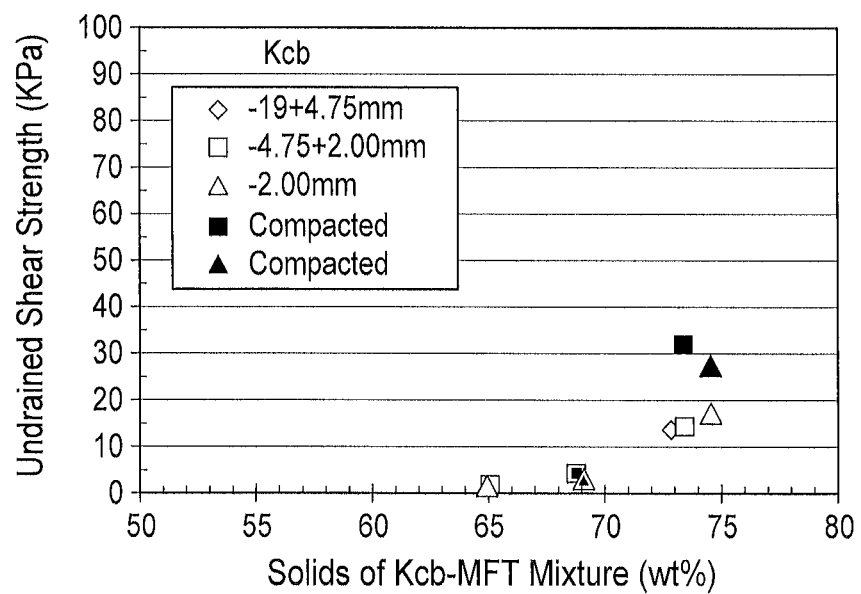
FIG. 42 is a graph showing the effect of compaction on shear strength of Kcb-FFT mixtures.
Figure 43:
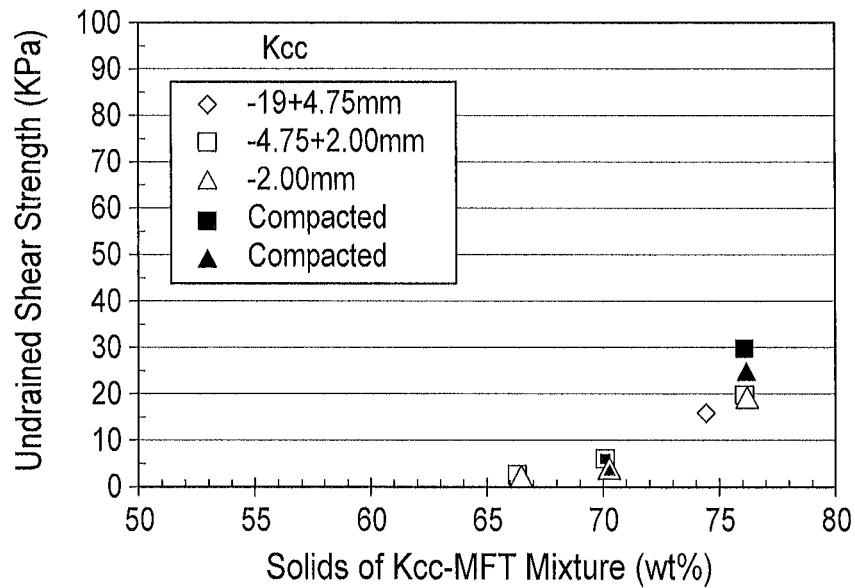
FIG. 43 is a graph showing the effect of compaction on shear strength of Kcc-FFT mixtures.
Figure 44:
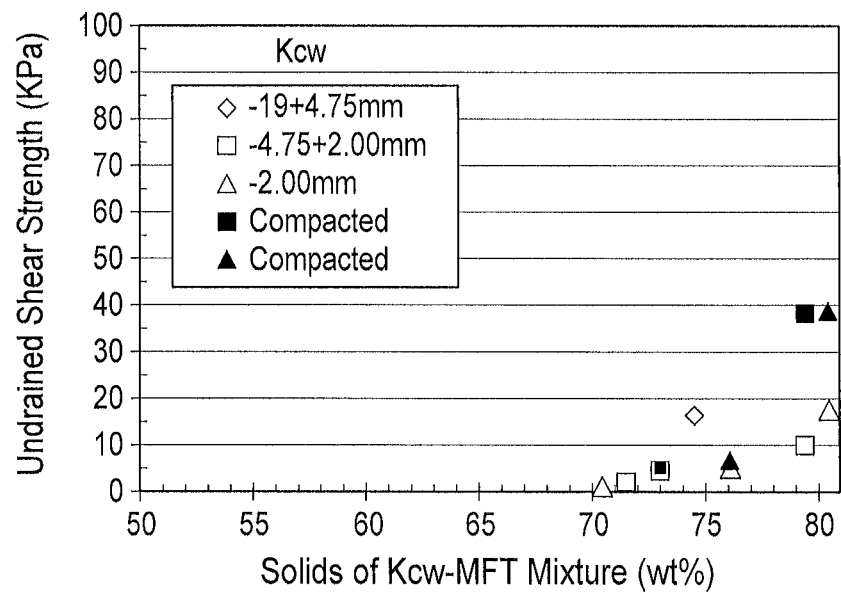
FIG. 44 is a graph showing the effect of compaction on shear strength of Kcw-FFT mixtures.

The moisture transfer of water vapour to the clay-shale lumps was based upon the variation in the solids content (wt %) of FFT over time. The clay-shale particles and FFT fines were distinguishable when larger sizes of clay-shale lumps were used. Regardless of the size of the clay-shale lumps, the solids content of the FFT increased significantly within the initial 24 hours and then increased moderately, eventually reaching a maximum after one week (FIGS. 29-31). Since plastic film was used to prevent moisture loss from the samples, it is believed that the increase in the solids content of FFT was a consequence of moisture transfer. FIG. 31 shows the solids content of the FFT over a three month period. As the solids content of FFT hardly increased one week after the mixing, a longer retention time did not appear to promote the moisture transfer from the FFT to the clay-shale lumps.

ii. Suction

Suction testing was performed to assess the moisture tension that developed within the FFT/shale mixture under non-saturated conditions using a tensiometer (UMS T5x Tensiometer) inserted into the sample mixtures. Similar to the solids content of the FFT, the suction increased significantly following mixing, and leveled off within the initial 24 hours after mixing, suggesting that moisture transfer from the FFT to the clay lumps occurred within the initial 24 hours (FIGS. 32-35). Suction is the force needed for absorption of moisture from surrounding materials. A positive suction pressure indicates the presence of free pore water. Although the suction was negative, the suction increased with the volumetric mixing ratio. At a 0.6 FFT ratio, the suction was close to zero, indicating the possibility of the presence of free pore water in the FFT and clay-shale mixtures when the ratio is increased above 0.6. A FFT ratio between 0.2 and 0.4 is thus preferable.

iii. Shear Strength

The undrained shear strengths of various FFT-shale mixtures were evaluated using vane shear testing (35 mm diameter, 70 mm height lab vane; and a 10 mm diameter, 17.6 mm height lab vane). For each mixture, the first vane shear testing was conducted 24 hours after mixing. The shear strength did not increase over time, suggesting that moisture transfer from the FFT to the clay lumps occurred within the initial 24 hours (FIGS. 36-40). For Kcb, Kcc and Kcw, the shear strengths were close to or below 5 KPa when the FFT ratio was greater than or equal to 0.4.

The mixtures were compacted to reduce voids within the material, with a Proctor compaction test performed two weeks after mixing. FIGS. 41-44 show the effect of compaction on shear strength. The energy used to compact each sample was 2,896 ft-lbf/ft$^3$. A higher compacting energy hardly increased the shear strength. At the FFT ratios of 0.2 and 0.4, compaction significantly increased the shear strength of the mixtures above 5 KPa. The effect of compaction was negligible at the FFT ratio of 0.6. The Kca-FFT mixture exhibited the highest suction and the greatest gain in shear strength after compaction.

iv. Testing of a Composite Clay-Shale Sample

Figure 45:
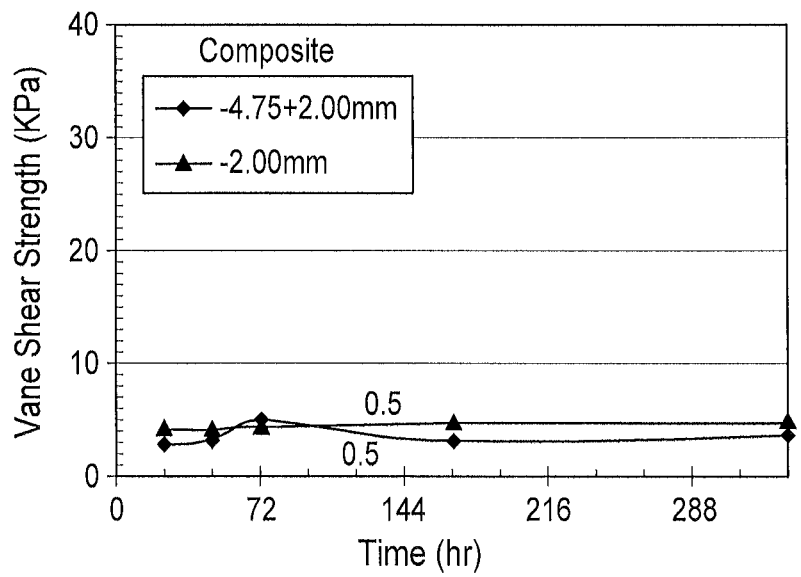
FIG. 45 is a graph showing the undrained vane shear strength over time of composite mixtures.

A composite sample was formed of 20% Kca, 30% Kcb and 50% Kcc (bulk volume), with the ratio representing the approximate thickness of clay-shale overburden for each facies in a mine. The composite clay-shale lumps were mixed with the FFT at a higher FFT ratio (0.5). The shear strength of the mixtures did not change over time, suggesting that moisture transfer from the FFT to the composite clay-shale lumps occurred within the initial 24 hours (FIG. 45). The shear strength was slightly less than 5 KPa. As the composite mixtures at a 0.5 FFT ratio were too wet to compact, no gain in the shear strength could be obtained.

v. Use of Saline Water

Figure 46:
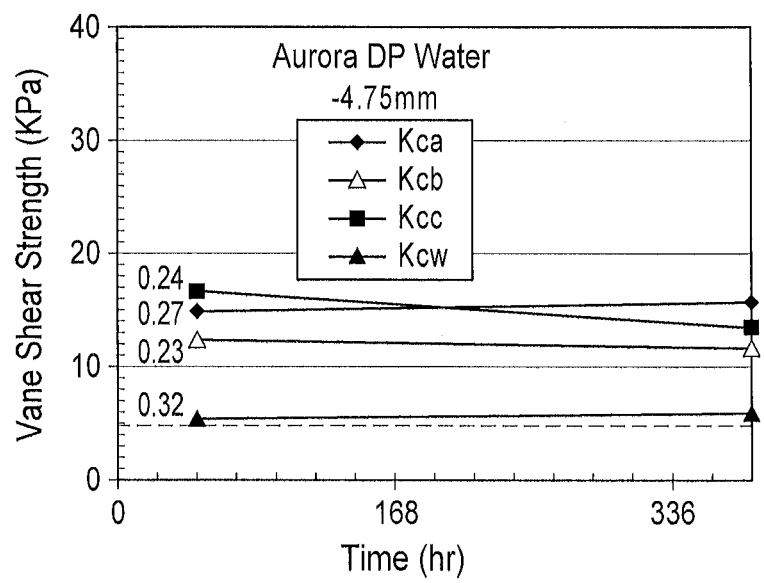
FIG. 46 is a graph showing the undrained vane shear strength over time of saline water and facies Kca, Kcb, Kcc and Kcw.

A saline water sample was used to determine the feasibility of applying co-mixing to the sequestration of saline aqueous fluid waste. FIG. 46 shows the undrained shear strength of the composite saline water and clay-shale mixtures. When mixed at FFT ratios less than 0.4, the composite mixtures achieved undrained shear strengths above 5 KPa within 48 hours without compaction, suggesting that co-mixing has the potential to sequestrate saline aqueous fluid waste inside the clay-shale overburden waste dump.

vi. Moisture Absorption Capacity of Clay-Shale

To assess the moisture capacity of the shale particles, absorption testing was performed using two methods, namely use of a humidity chamber to observe the increase in the mass of clay-shale lumps (Example 4), and determination of an increase in the solids content of the FFT into which large-sized clay-shale lumps (−50+19 mm) were immersed.

Figure 47:
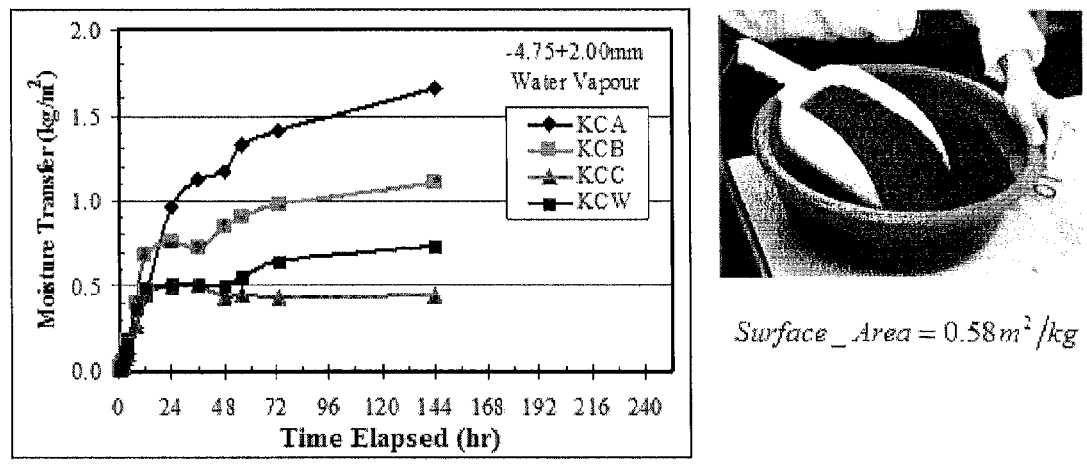
FIG. 47 is a graph showing the moisture transfer of water vapour to small clay-shale lumps over time.
Figure 48:
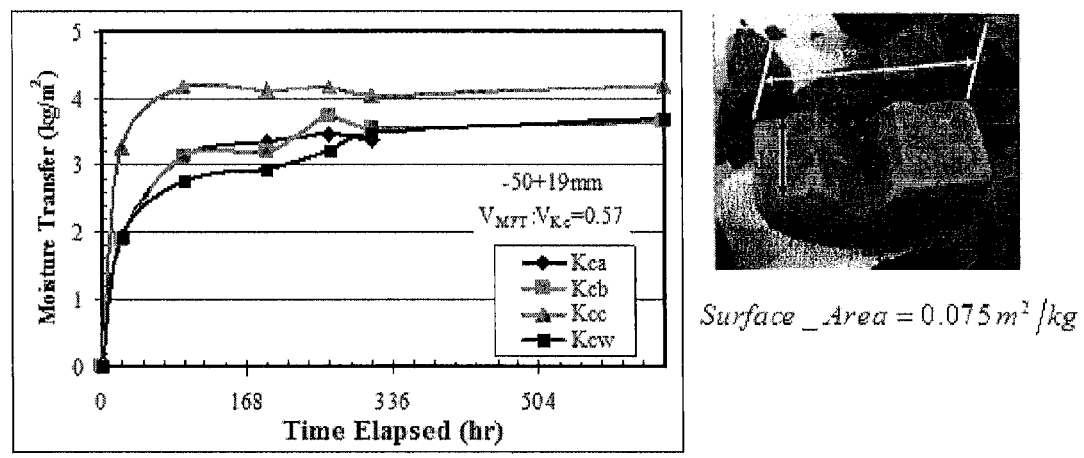
FIG. 48 is a graph showing the moisture transfer of water vapour to large clay-shale lumps over time.

FIGS. 47 and 48 show the moisture absorption capacity based on the surface area of the clay-shale lumps, assuming the clay-shale lumps (−4.75+2.00 mm) are identical spheres of 3.375 mm diameter. The absorption of FFT pore water onto the clay lumps slowly occurs only on the surface of the clay lumps. The moisture transfer capacity varied between 0.5 and 1.7 kg/m$^2$ depending on the facies with Kca having the highest value. The majority of the moisture transfer to the clay lumps occurred within the initial 24 hours.

The results of the humidity chamber testing in which the small clay-shale lumps were exposed to water vapor indicated a slightly smaller moisture absorption capacity per net surface area as compared with results of large clay-shale lumps soaked into the FFT. The discrepancy may have resulted from the difference in the sizes of the clay-shale lumps.

Figure 49:
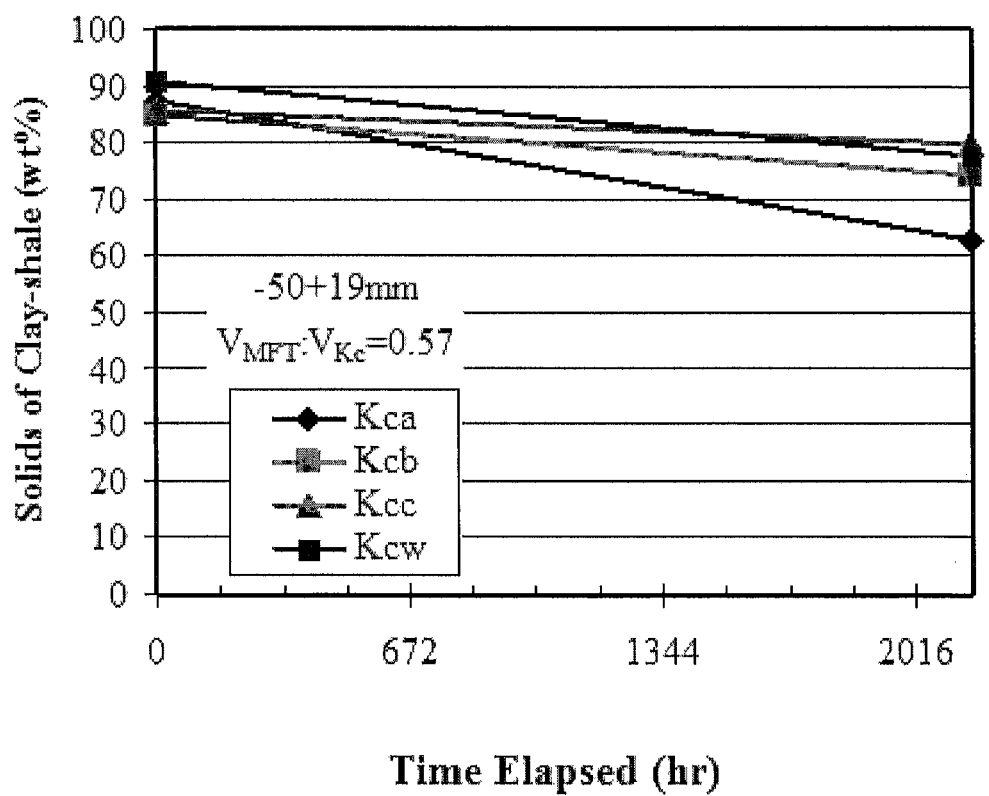
FIG. 49 is a graph showing the solids content over time for facies Kca, Kcb, Kcc and Kcw.

FIG. 49 shows the decrease in the solids content at the centre of the large clay-shale lumps, indicating the moisture transfer may reach at least 1 inch deep into the clay-shale lumps. The clay-shale samples used in the humidity chamber test may have been too small for the determination of the moisture absorption capacity. The moisture absorption capacity obtained from the large clay-shale testing varied from 3.5 to 4.2 kg/m$^2$. This result also suggests that it may not be necessary to crush clay-shale overburden to less than 2 inches.

EXAMPLE 6

Overburden (Kca) Added to FFT Centrifuge Cake

Figure 50:
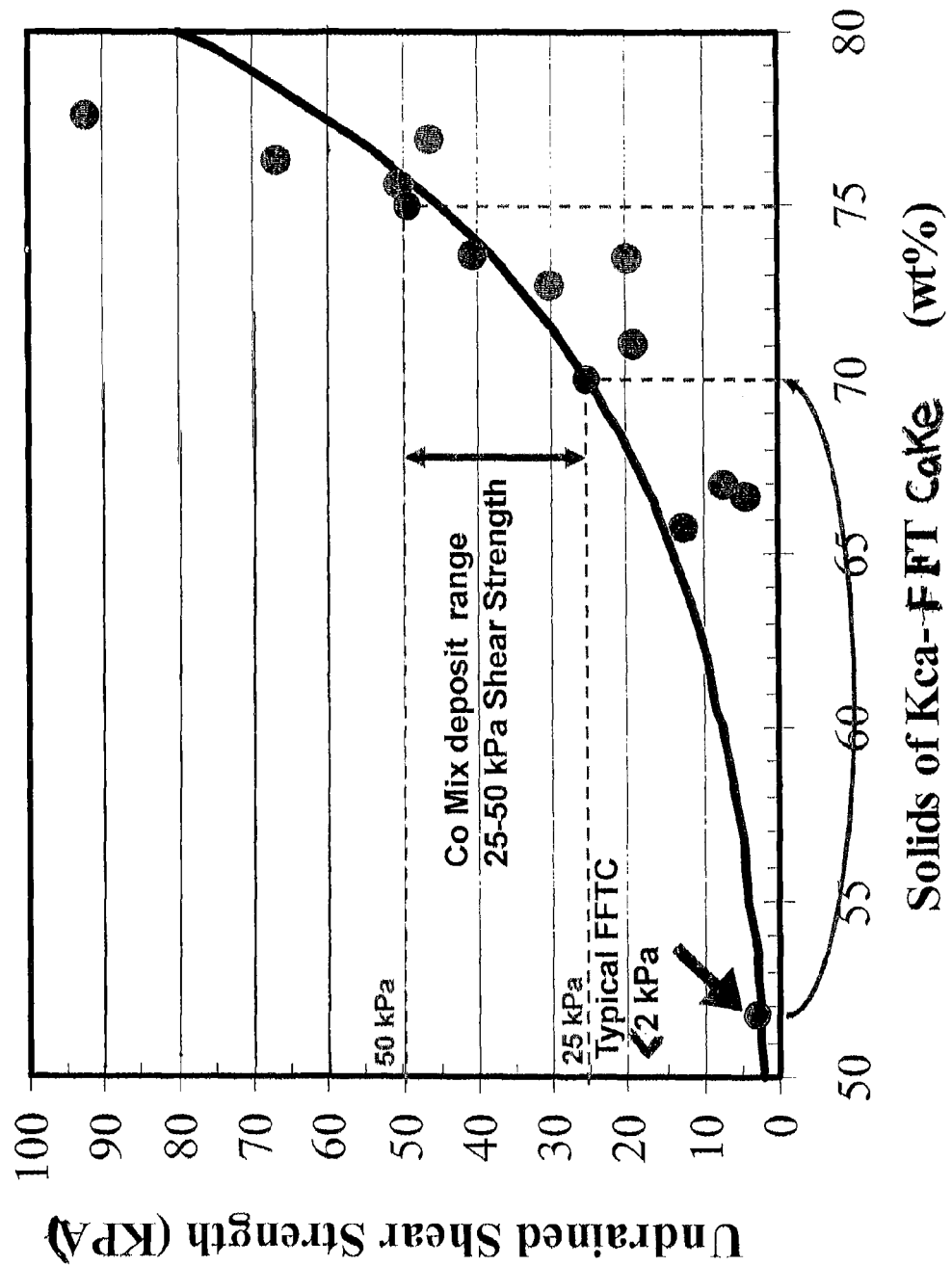
FIG. 50 is a graph showing the undrained shear strength (kPa) of FFT Cake (FFTC) when overburden (Kca) is added to FFTC.

FIG. 50 shows the increase in undrained shear stress (KPA) of the overburden/FFT centrifuge cake mixture versus the weight percent of the solids in the mixture. It can be seen in FIG. 50 that increasing the proportion of overburden (i.e., increasing the wt % of solids) resulted in a significant increase in undrained shear strength.

The overburden/FFT centrifuge cake deposit may be collected and transported via a conveyor, pump or transport truck to a disposal area. At the disposal area, the overburden/FFT centrifuge cake deposit is stacked to maximize dewatering by natural processes including consolidation, desiccation and freeze thaw via 1 to 2 m, or greater than 2 m thick annual lifts to deliver a trafficable surface that can be reclaimed.

In another embodiment, the overburden/FFT centrifuge cake deposit may be placed in layers which alternate with layers of compacted lifts. In one embodiment, the compacted lifts comprise sand. Such a configuration of layers not only delivers a trafficable surface but also facilitates drainage. In another embodiment, poldering can be used. A polder is a low-lying tract of land enclosed by embankments (barriers) known as dikes that forms an artificial hydrological entity.

From the foregoing description, one skilled in the art can easily ascertain the essential characteristics of this invention, and without departing from the spirit and scope thereof, can make various changes and modifications of the invention to adapt it to various usages and conditions. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims.

REFERENCES

The following references are incorporated herein by reference (where permitted) as if reproduced in their entirety. All references are indicative of the level of skill of those skilled in the art to which this invention pertains.

BGC Engineering Inc., 2010. Review of Reclamation Options for Oil Sands Tailings Substrates. Oil Sands Research and Information Network, University of Alberta, School of Energy and the Environment, Edmonton, Alberta. OSRIN Report No. TR-2. 59 pp.

Chapman, D., Barbour, S. L. and O'Kane, M., 2006. Hydrogeology of South Bison Hill. 7$^{th}$ International Conference on Acid Rock Drainage (ICARD), Mar. 26-30, 2006.

Chapman, D. E., 2008. Hydrogeologic Characterization of a Newly Constructed Saline-Sodic Clay Overburden Hill. University of Saskatchewan Thesis.

Isaac, B. A., Dusseault, M. B., Lobb, G. D., and Root, J. D. 1982. Characterization of the Lower Cretaceous Overburden for Oil Sands Surface Mining Within Syncrude Canada Ltd. Leases, Northeast Alberta, Canada. Proceedings 4th Congress International Association of Engineering Geology. New Delhi, India, 1982, 14 p.

Lord, E. R. and Isaac, B. A., 1989. Geotechnical Investigations of Dredged Overburden at the Syncrude Oil Sand Mine in Northern Alberta, Canada. Canadian Geotechnical Journal, 26, 132-153.

Lord, E. R. F., Maciejewski W., 1995. Codisposal of fine tails and overburden utilizing pipelining techniques. Mine Planning and Equipment Selection 1995: Proceedings of the Fourth International Symposium on Mine Planning and Equipment Selection/Calgary/Canada/31 Oct.-3 Nov. 1995, Page 973-987.

Mellon, G. B. and Wall, J. H. 1956. Geology of the McMurray Formation. Research Council of Alberta, Report No. 72, Mimura, D. W., 1990, Shear Strength of Hydraulically Placed Clay Shale. M. Sc. Thesis, Dept. Civil Engineering, University of Alberta, 257 p.

Mimura, D. W. and Lord, E. R., 1991. Oil Sand Fine Tails Absorption into Overburden Clay Shales—A Dry Landscape Alternative. Petroleum Society of CIM and AOSTRA, Paper No. 91-128, 10 p.

Morgenstern, N. R. and Scott, D. J., 1997. Oil Sand Geotechnique. Geotechnical News, Special 1997, Pages 102-109.

Terzaghi, K., Peck, R. B. and G. Mesri, 1996. Soil Mechanics in Engineering Practice, 3rd Edition, John Wiley & Sons, Inc., New York.

We claim:

1. A process for enhancing the solidification of tailings comprising:
   a) providing overburden having a moisture content ranging from about 15 wt % to about 25 wt % and comminuting the overburden to form comminuted overburden;
   b) providing tailings having a solids content ranging from about 1 wt % to about 70 wt %;
   c) combining the tailings with the comminuted overburden at a tailings:overburden ratio ranging from about 0.2:1.0 (bulk volume) to about 0.4:1.0 (bulk volume) to form treated overburden; and
   d) depositing the treated overburden to produce a substantially solidified deposit.

2. The process of claim 1, wherein the tailings are added to the overburden at a tailings:overburden ratio of about 0.2:1.0 (bulk volume).

3. The process of claim 1, wherein in step (a), the comminuted overburden has a lump size of about 600 mm or less.

4. The process of claim 1, wherein the deposit has an undrained shear strength greater than the undrained shear strength of the tailings alone.

5. The process of claim 4, wherein the deposit has an undrained shear strength greater than about 5 kPa.

6. The process of claim 1, wherein the deposit has a solids content of at least about 70 wt %.

7. The process of claim 1, further comprising compacting the treated overburden prior to depositing the treated overburden to produce the substantially solidified deposit.

8. The process of claim 1, further comprising disposing the deposit in an area using a dry stacking mode of disposal, or dewatering the deposit by consolidation, drying and/or desiccation using 1 to 2 meter lifts, or greater than 2 meter lifts.

9. The process of claim 1, further comprising disposing the deposit in layers to alternate with layers of compacted lifts.

10. The process of claim 9, wherein the compacted lifts comprise sand.

11. The process of claim 1, wherein the tailings are oil sands fluid fine tailings.

12. The process of claim 1, wherein the tailings are treated with an additive selected from a coagulant or a flocculant prior to addition to the overburden.

13. The process as claimed in claim 1, wherein the tailings are oil sands fluid fine tailings that have been subjected to centrifugation to form a centrifuge cake.

14. The process as claimed in claim 13, whereby an initial mass strength of the substantially solidified deposit is about 25 to about 50 kPa.

15. The process as claimed in claim 1, wherein the tailings have a solids content ranging from about 10 wt % to about 60 wt %.

16. The process as claimed in 13, wherein the oil sand fluid fine tailings are treated with an additive selected from a coagulant or a flocculant or both prior to centrifugation.

* * * * *